US007196879B2

(12) United States Patent
Hasegawa et al.

(10) Patent No.: US 7,196,879 B2
(45) Date of Patent: Mar. 27, 2007

(54) EXCHANGE COUPLING FILM AND MAGNETORESISTIVE ELEMENT USING THE SAME

(75) Inventors: Naoya Hasegawa, Niigata-ken (JP); Masamichi Saito, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/303,361

(22) Filed: Dec. 16, 2005

(65) Prior Publication Data

US 2006/0098357 A1 May 11, 2006

Related U.S. Application Data

(63) Continuation of application No. 09/900,992, filed on Jul. 9, 2001, now Pat. No. 7,119,996.

(30) Foreign Application Priority Data

Jul. 11, 2000 (JP) ............................ 2000-209462
Dec. 1, 2000 (JP) ............................ 2000-366972

(51) Int. Cl.
G11B 5/39 (2006.01)

(52) U.S. Cl. ............................ 360/324.11; 360/324.12; 428/811; 428/811.5

(58) Field of Classification Search ............... 360/324.11–324.12; 428/811, 811.5
See application file for complete search history.

(56) References Cited

U.S. PATENT DOCUMENTS

| 5,648,885 | A | 7/1997 | Nishioka et al. |
| 5,731,936 | A | 3/1998 | Lee et al. |
| 5,910,868 | A | 6/1999 | Kurosawa et al. |
| 6,055,135 | A | 4/2000 | Fukamichi et al. |
| 6,303,218 | B1 | 10/2001 | Kamiguchi et al. |
| 6,387,548 | B1 | 5/2002 | Hasegawa et al. |
| 6,456,469 | B1 | 9/2002 | Gill |
| 6,650,512 | B1 | 11/2003 | Gill |
| 6,678,128 | B2 | 1/2004 | Saito et al. |

FOREIGN PATENT DOCUMENTS

| JP | 10-214716 | 8/1998 |
| JP | 11-191647 | 7/1999 |
| JP | 2000-150235 | 5/2000 |

*Primary Examiner*—Angel Castro
*Assistant Examiner*—Christopher R. Magee
(74) *Attorney, Agent, or Firm*—Brinks Hofer Gilson & Lione

(57) ABSTRACT

A PtMn alloy film known as an antiferromagnetic material having excellent corrosion resistance is used for an antiferromagnetic layer. However, an exchange coupling magnetic field is decreased depending upon the conditions of crystal grain boundaries. Therefore, in the present invention, the crystal grain boundaries formed in an antiferromagnetic layer (PtMn alloy film) and the crystal grain boundaries formed in a ferromagnetic layer are made discontinuous in at least a portion of the interface between both layers. As a result, the antiferromagnetic layer can be appropriately transformed to an ordered lattice by heat treatment to obtain a larger exchange coupling magnetic field than a conventional element.

8 Claims, 20 Drawing Sheets

FILM STRUCTURE: Si SUBSTRATE/ALUMINA/Ta(3nm)/NiFe
(3nm)/PtMn(15nm)/Co
(1.5nm)/Ru(0.8nm)/Co
(2.5nm)/Cu(2.3nm)/Co
(1nm)/NiFe(3nm)/Cu(1.5nm)/Ta(3nm)

EXCHANGE COUPLING FILM AND MAGNETORESISTIVE ELEMENT USING THE SAME

This application is a continuation application of application Ser. No. 09/900,992, filed on Jul. 9, 2001, now U.S. Pat. No. 7,119,996 which claims the benefit of priority to Japanese Patent Application No. 2000-209462, filed Jul. 11, 2000 and Japanese Patent Application No. 2000-366972, filed Dec. 1, 2000, which are incorporated herein by reference.

BACKGROUND OF THE INVENTION

1. Field of the Invention

The present invention relates to an exchange coupling film comprising an antiferromagnetic film and a ferromagnetic film so that the magnetization direction of the ferromagnetic layer is pinned in a predetermined direction by an exchange coupling magnetic field produced between the antiferromagnetic layer and the ferromagnetic layer. Particularly, the present invention relates to an exchange coupling film which produces a large exchange coupling magnetic field, and a magnetoresistive element (a spin valve thin film element or an AMR element) using the exchange coupling magnetic field, and a thin film magnetic head using the magnetoresistive element.

2. Description of the Related Art

A spin valve thin film element is a GMR (giant magnetoresistive) element utilizing a giant magnetoresistive effect, for detecting a recording magnetic field from a recording medium such as a hard disk or the like.

The spin valve thin film element has some advantages that the structure is relatively simple as compared with other GMR elements, and the resistance changes with a weak magnetic field.

The simplest structure of the spin valve thin film element comprises an antiferromagnetic layer, a pinned magnetic layer, a nonmagnetic intermediate layer and a free magnetic layer.

The antiferromagnetic layer and the pinned magnetic layer are formed in contact with each other so that the pinned magnetic layer is put into a single domain state and the magnetization direction thereof is pinned in a predetermined direction by an exchange coupling magnetic field produced at the interface between the antiferromagnetic layer and the pinned magnetic layer.

Magnetization of the free magnetic layer is oriented in the direction crossing the magnetization direction of the pinned magnetic layer by bias layers formed on both sides of the free magnetic layer.

The antiferromagnetic layer generally comprises a Fe—Mn (iron-manganese) alloy film, a Ni—Mn (nickel-manganese) alloy film, or a Pt—Mn (platinum-manganese) alloy film. Particularly, the Pt—Mn alloy film has various advantages of the high blocking temperature, excellent corrosion resistance, etc., and thus gets into the spotlight.

The inventors found that even with an antiferromagnetic layer comprising a PtMn alloy film, an exchange coupling magnetic field produced between the antiferromagnetic layer and a pinned magnetic layer cannot be increased depending upon conditions.

With the antiferromagnetic layer comprising a PtMn alloy film, the antiferromagnetic layer is transformed from a disordered lattice to an ordered lattice by heat treatment after the antiferromagnetic layer and the pinned magnetic layer are laminated, thereby producing an exchange coupling magnetic field.

However, it was found that when the interface between the antiferromagnetic layer and the ferromagnetic layer is put into a coherent state in which the atoms of the constituent antiferromagnetic material of the antiferromagnetic layer have one-to-one correspondence with the atoms of the constituent soft magnetic material of the pinned magnetic layer, the antiferromagnetic layer is not appropriately transformed to the ordered lattice, thereby failing to produce a large exchange coupling magnetic field.

SUMMARY OF THE INVENTION

The present invention has been achieved for solving the above problem, and an object of the present invention is to provide an exchange coupling film which can produce a large exchange coupling magnetic field when an antiferromagnetic material containing element X (a platinum group element) and Mn is used as an antiferromagnetic layer, a magnetoresistive element using the exchange coupling film, and a thin film head using the magnetoresistive element.

In order to achieve the object of the present invention, there is provided an exchange coupling film comprising an antiferromagnetic layer and a ferromagnetic layer, which are formed in contact with each other so that the magnetization direction of the ferromagnetic layer is pinned in a predetermined direction by an exchange coupling magnetic field produced at the interface between the antiferromagnetic layer and the ferromagnetic layer, wherein the antiferromagnetic layer is made of an antiferromagnetic material comprising element X (at least one element selected from Pt, Pd, Ir, Rh, Ru, and Os) and Mn, and in a section of the exchange coupling film in parallel with the thickness direction thereof, the crystal grain boundaries formed in the antiferromagnetic layer and the crystal grain boundaries formed in the ferromagnetic layer are discontinuous in at least a portion of the interface.

In the present invention, the crystal grain boundaries mean boundaries where two crystal grains contact each other while maintaining different crystal orientations, and include boundaries (so-called twin boundaries) where the atomic arrangements of two crystal grains have mirror symmetry. In "Physics of Metal Material" (Nikkan Kogyo Shinbun (issued on Feb. 28, 1992)), p 58, a twin boundary is described as an example of "special boundaries", and it is defined that crystal grain boundaries include twin boundaries.

In the present invention, with respect to the crystal orientations of the antiferromagnetic layer and the ferromagnetic layer, different crystal planes may be preferentially oriented in parallel with the film plane, but the same equivalent crystal planes are preferably preferentially oriented.

More specifically, in the antiferromagnetic layer and the ferromagnetic layer according to the present invention, equivalent crystal planes represented by a {111} plane are preferentially oriented in parallel with the interface. The {111} plane is a general term for equivalent crystal planes in a single crystal structure and is represented by using Miller indices. The equivalent crystal planes include a (111) plane, a (−111) plane, a (1−11) plane, a (11−1) plane, (−1−11) plane, a (1−1−1) plane, a (−11−1) plane, and a (−1−1−1) plane.

In another aspect of the present invention, an exchange coupling magnetic film comprises an antiferromagnetic layer and a ferromagnetic layer, which are formed in contact with each other so that the magnetization direction of the ferromagnetic layer is pinned in a predetermined direction by an exchange coupling magnetic field produced at the interface between the antiferromagnetic layer and the ferromagnetic layer, wherein in the antiferromagnetic layer, an equivalent crystal plane represented by a {111} plane is preferentially oriented in parallel with the interface, and a twin crystal is formed in at least a portion of the antiferromagnetic layer so that the twin boundaries of the twin crystal are formed in nonparallel with the interface.

In the present invention, in the antiferromagnetic layer, the equivalent crystal plane represented by the {111} plane is preferentially oriented in parallel with the interface. In order to orient the {111} plane of the antiferromagnetic layer, it is effective to form a seed layer below the antiferromagnetic layer.

In the present invention, the inner angle between each of the twin boundaries and the interface is preferably 68° to 76°. With the inner angle in this range, the {111} plane of the antiferromagnetic layer is preferentially oriented in parallel with the interface.

Furthermore, in the present invention, the equivalent crystal plane represented by the {111} plane of the ferromagnetic layer is preferably preferentially oriented in parallel with the interface.

As in the present invention, in cases in which the equivalent crystal planes represented by the {111} plane of both the antiferromagnetic layer and the ferromagnetic layer are preferentially oriented in parallel with the interface, a high rate of change in resistance can be obtained.

In the present invention, the antiferromagnetic layer is preferably made of an antiferromagnetic material comprising element X (at least one element selected from Pt, Pd, Ir, Rh, Ru, and Os) and Mn.

In the present invention, a seed layer is formed below the antiferromagnetic layer so that the equivalent crystal planes represented by the {111} plane of the antiferromagnetic layer and the ferromagnetic layer are oriented in parallel with the film plane, as described above.

The exchange coupling film of the present invention preferably comprises the antiferromagnetic layer and the ferromagnetic layer which are laminated in this order from the bottom, and the seed layer formed below the ferromagnetic layer and having a crystal structure mainly comprising a face-centered cubic crystal in which an equivalent crystal plane represented by the {111} plane is preferentially oriented in parallel with the interface.

In the present invention, the seed layer is provided below the antiferromagnetic layer, as describe above, so that the equivalent crystal planes represented by the {111} plane of the antiferromagnetic layer and the ferromagnetic layer are preferentially oriented in parallel with the film plane.

In the present invention, the seed layer is preferably made of a NiFe alloy, Ni, a Ni—Fe—Y alloy (wherein Y is at least one element selected from Cr, Rh, Ta, Hf, Nb, Zr, and Ti), or a Ni—Y alloy.

The seed layer is represented by the composition formula $(Ni_{1-x}Fe_x)_{1-y}Y_y$ (x and y are atomic ratios) wherein atomic ratio x is preferably 0 to 0.3, and atomic ratio y is preferably 0 to 0.5. The seed layer is preferably nonmagnetic at room temperature.

In the present invention, an underlying layer comprising at least one element selected from Ta, Hf, Nb, Zr, Ti, Mo and W is preferably formed below the seed layer.

Furthermore, in the present invention, at least a portion of the interface between the antiferromagnetic layer and the seed layer is preferably in an incoherent state. The incoherent state means that the constituent atoms of the antiferromagnetic layer do not have one-to-one correspondence with the constituent atoms of the ferromagnetic layer (the seed layer nonmagnetic at room temperature) at the interface therebetween. On the other hand, the coherent state means that the atoms have one-to-one correspondence at the interface.

In the present invention, the crystal grain boundaries formed in the antiferromagnetic layer and the crystal grain boundaries formed in the ferromagnetic layer are discontinuous in at least a portion of the interface, as described above. However, this crystal structure is preferably also formed in the interface between the antiferromagnetic layer and the seed layer.

Namely, in the present invention, the crystal grain boundaries formed in the antiferromagnetic layer and the crystal grain boundaries formed in the seed layer are discontinuous in at least a portion of the interface. As a result, the antiferromagnetic layer is appropriately transformed to the ordered lattice without being restrained by the crystal structure of the seed layer during heat treatment, whereby a large exchange coupling magnetic field can be obtained.

In the present invention, the antiferromagnetic layer may be made of a X—Mn—X' alloy (wherein X' represents at least one element selected from Ne, Ar, Kr, Xe, Be, B, C, N, Mg, Al, Si, P, Ti, V, Cr, Fe, Co, Ni, Cu, Zn, Ga, Ge, Zr, Nb, Mo, Ag, Cd, Ir, Sn, Hf, Ta, W, Re, Au, Pb, and the rare earth elements). In this case, the X—Mn—X' alloy is an interstitial solid solution in which element X' enters the interstices between space lattices composed of the element X and Mn, or a substitution solid solution in which the lattice points of crystal lattices composed of the element X and Mn are partially substituted by the element X'. This can increase the lattice constant of the antiferromagnetic layer to permit the formation of an atomic arrangement in which atoms do not have one-to-one correspondence with the atoms of the ferromagnetic layer at the interface with the ferromagnetic layer.

In the present invention, the composition ratio of the element X or elements (X+X') is preferably 45 at % to 60 at %. The experimental results described below indicate that with a composition ratio of the element X or elements (X+X') in the above range, an exchange coupling magnetic field of at least $1.58 \times 10^4$ (A/m) can be obtained. The composition ratio of the element X or elements (X+X') is more preferably 49 at % to 56.5 at %.

In the present invention, at least a portion of the interface between the antiferromagnetic layer and the ferromagnetic layer is preferably incoherent.

In the present invention, the above-described exchange coupling film can be applied to various magnetoresistive elements.

A magnetoresistive element of the present invention comprises an antiferromagnetic layer, a pinned magnetic layer formed in contact with the antiferromagnetic layer so that the magnetization direction is pinned by an exchange coupling magnetic field with the antiferromagnetic layer, a free magnetic layer formed on the pinned magnetic layer with a nonmagnetic intermediate layer provided therebetween, and a bias layer for orienting the magnetization direction of the free magnetic layer in a direction crossing the magnetization direction of the pinned magnetic layer, wherein the antiferromagnetic layer and the pinned magnetic layer formed in contact with the antiferromagnetic layer comprise the above-described exchange coupling film.

A magnetoresistive element of the present invention may comprise an antiferromagnetic layer, a pinned magnetic layer formed in contact with the antiferromagnetic layer so that the magnetization direction is pinned by an exchange coupling magnetic field with the antiferromagnetic layer, a free magnetic layer formed on the pinned magnetic layer with a nonmagnetic intermediate layer provided therebetween, and antiferromagnetic exchange bias layers formed on or below the free magnetic layer with a space corresponding to a track width Tw, wherein the exchange bias layers and the free magnetic layer comprise the above-described exchange coupling film, and magnetization of the free magnetic layer is pinned in a predetermined direction.

A magnetoresistive element of the present invention may comprise nonmagnetic layers laminated on and below a free magnetic layer, pinned magnetic layers located on one of the nonmagnetic intermediate layers and below the other nonmagnetic intermediate layer, antiferromagnetic layers located on one of the pinned magnetic layers and below the other pinned magnetic layer, for pinning the magnetization direction of each of the pinned magnetic layers in a predetermined direction by an exchange coupling magnetic field, and a bias layer for orienting the magnetization direction of the free magnetic layer in a direction crossing the magnetization direction of the pinned magnetic layers, wherein the antiferromagnetic layers and the pinned magnetic layers respectively formed in contact with the antiferromagnetic layers comprise the above-described exchange coupling film.

An magnetoresistive element of the present invention may comprise a magnetoresistive layer and a soft magnetic layer which are laminated with a nonmagnetic layer provided therebetween, and antiferromagnetic layers formed on or below the magnetoresistive layer with a space therebetween corresponding to a track width Tw, wherein the antiferromagnetic layers and the magnetoresistive layer comprise the above-described exchange coupling film.

A thin film head of the present invention comprises the above-described magnetoresistive element, and shield layers formed on and below the magnetoresistive element with gap layers provided therebetween.

DESCRIPTION OF THE PREFERRED EMBODIMENTS

Figure 1:
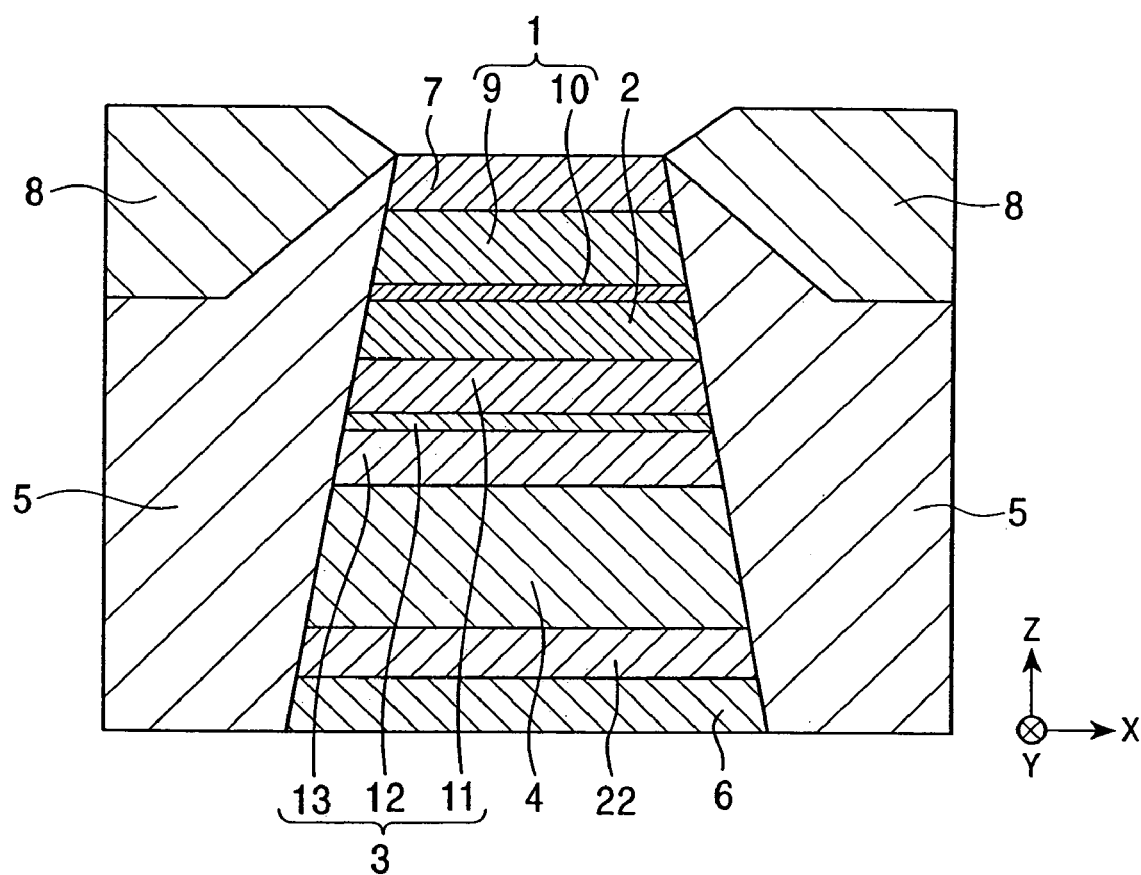
FIG. 1 is a sectional view of the structure of a single spin valve magnetoresistive element in accordance with a first embodiment of the present invention, as viewed from the ABS side.

FIG. 1 is a sectional view of a single spin valve magnetoresistive element according to a first embodiment of the present invention, as viewed from the ABS side. FIG. 1 shows only the central portion of the element in the X direction.

The single spin valve magnetoresistive element is provided at the trailing side end of a flying slider provided on a hard disk device, for detecting a recording magnetic field from a hard disk or the like. The movement direction of the magnetic recording medium such as the hard disk or the like coincides with the Z direction, and the direction of a leakage magnetic field from the magnetic recording medium coincides with the Y direction.

In FIG. 1, an underlying layer 6 made of a nonmagnetic material composed of at least one element selected from Ta, Hf, Nb, Zr, Ti, Mo and W is formed at the bottom. The underlying layer 6 is provided for preferentially orienting, in parallel with the film plane, an equivalent crystal plane represented by a {111} plane of a seed layer 22 formed on the underlying layer 6. The underlying layer 6 is formed to a thickness of, for example, about 50 Å.

The seed layer 22 is mainly composed of a face-centered cubic crystal in which an equivalent crystal plane represented by the {111} plane is preferentially oriented in parallel with the interface with an antiferromagnetic layer 4. The seed layer 22 is preferably made of a NiFe alloy, Ni, a Ni—Fe—Y alloy (wherein Y is at least one element selected from Cr, Rh, Ta, Hf, Nb, Zr and Ti), or a Ni—Y alloy.

The seed layer 22 is preferably represented by the composition formula $(Ni_{1-x}Fe_x)_{1-y}Y_y$ (x and y are atomic ratios) wherein the atomic ratio x is preferably 0 to 0.3, and the atomic ratio y is preferably 0 to 0.5. This can increase the degree of preferential orientation of the {111} plane in each of the antiferromagnetic layer 4 and layers formed thereon, thereby increasing the rate ΔR/R of change in resistance.

The term "equivalent crystal planes" represents crystal lattice planes indicated by Miller indices, and the equivalent crystal planes represented by the {111} plane include a (111) plane, a (−111) plane, a (1−11) plane, a (11−1) plane, a (−1−11) plane, a (1−1−1) plane, a (−11−1) plane and a (−1−1−1) plane.

Namely, in the seed layer 22 of the present invention, the (111) plane, or the (1−11) plane or the like equivalent thereto is preferentially oriented in parallel with the film plane.

In the present invention, the seed layer 22 is preferably nonmagnetic at room temperature. With the seed layer 22 nonmagnetic at room temperature, deterioration in asymmetry of a waveform can be prevented, and the resistivity of the seed layer 22 can be increased by the effect of the element Y (described below) added for making the layer nonmagnetic, thereby suppressing a shunt of a sensing current flowing from a conductive layer to the seed layer 22. When the sensing current is easily shunted to the seed layer 22, a decrease in the rate (ΔR/R) of change in resistance and Barkhausen noise undesirably occur.

In order to make the seed layer 22 nonmagnetic, a Ni—Fe—Y alloy or Ni—Y alloy (wherein Y is at least one element selected from Cr, Rh, Ta, Hf, Nb, Zr and Ti) can be selected from the above materials. These materials preferably have a face-centered cubic crystal structure in which an equivalent crystal plane represented by the {111} plane is preferentially oriented in parallel with the film plane. The seed layer 22 is formed to a thickness of, for example, about 30 Å.

The antiferromagnetic layer 4 is formed on the seed layer 22. The antiferromagnetic layer 4 is preferably made of an antiferromagnetic material comprising element X (at least one element selected from Pt, Pd, Ir, Rh, Ru, and Os) and Mn.

A X—Mn alloy comprising such a platinum group element is an excellent antiferromagnetic material having the excellent properties that it has excellent corrosion resistance and a high blocking temperature, and the exchange coupling magnetic field (Hex) can be increased. Particularly, Pt among the platinum group elements is preferred. For example, a binary-system PtMn alloy can be used.

In the present invention, the antiferromagnetic layer 4 may be made of an antiferromagnetic material comprising the element X, element X' (X' is at least one element selected from Ne, Ar, Kr, Xe, Be, B, C, N, Mg, Al, Si, P, Ti, V, Cr, Fe, Co, Ni, Cu, Zn, Ga, Ge, Zr, Nb, Mo, Ag, Cd, Ir, Sn, Hf, Ta, W, Re, Au, Pb, and the rare earth elements), and Mn.

Preferably, a type of element capable of entering into interstices in the lattice formed by X and Mn and making an interstitial solid solution or a type of element capable of displacing some of the lattice points in the crystal lattice formed by X and Mn and making a substitutional solid solution is used as the element X'. Herein, "solid solution" refers to a solid in which components thereof are homogeneously mixed within a single crystal phase.

In an interstitial solid solution or substitution solid solution, the lattice constant of the X—Mn—X' alloy can be increased, as compared with the lattice constant of the X—Mn alloy film. Therefore, the difference from the lattice constant of the pinned magnetic layer 3 which will be described below can be increased, thereby easily bringing the interfacial structure between the antiferromagnetic layer and the pinned magnetic layer 3 into an incoherent state. Particularly, in use of the element X' which dissolves in the substitution solid solution, with an excessively high composition ratio of element X', the antiferromagnetic properties deteriorate to decrease the exchange coupling magnetic field produced at the interface with the pinned magnetic layer 3. Particularly, in the present invention, a rare gas element (at least one of Ne, Ar, Kr and Xe) of inert gas is preferably used as the element X' in the interstitial solid solution. Such a rare gas element is an inert gas element, and thus has less effect on the antiferromagnetic properties even when the rare gas element is contained in the film. Furthermore, Ar or the like is a gas conventionally introduced as a sputtering gas into a sputtering apparatus, and can easily be entered in the film only by appropriately controlling the gas pressure.

When a gaseous element is used as the element X', it is difficult to contain a large amount of element X' in the film. However, in use of a rare gas, the exchange coupling magnetic field produced by heat treatment can be significantly increased by entering only a small amount of gas in the film.

In the present invention, the composition ratio of the element X' is preferably in the range of 0.2 at % to 10 at %, and more preferably in the range of 0.5 at % to 5 at %. Furthermore, the element X is preferably Pt, and thus a Pt—Mn—X' alloy is preferably used.

The pinned magnetic layer 3 comprising a three-layer film is formed on the antiferromagnetic layer 4.

The pinned magnetic layer 3 comprises a Co film 11, a Ru film 12 and a Co film 13, in which the magnetization directions of the Co films 11 and 13 are put into an antiparallel state by an exchange coupling magnetic field at the interface with the antiferromagnetic layer 4 and RKKY antiferromagnetic coupling between the Co films 11 and 13 through the Ru film 12. This is referred to as a "ferrimagnetic coupling state". This construction can stabilize magnetization of the pinned magnetic layer 3, and increase the exchange coupling magnetic field produced at the interface between the pinned magnetic layer 3 and the antiferromagnetic layer 4.

For example, the Co film 11 is formed to a thickness about 20 Å, the Ru film 12 is formed to a thickness of about 8 Å, and the Co film 13 is formed to a thickness of about 15 Å.

The pinned magnetic layer 3 may comprise a three-layer film or a single layer film. Each of the films 11, 12 and 13 may be made of a material other that the above magnetic materials. For example, each of the layers 11 and 13 may be made of CoFe other than Co.

A nonmagnetic intermediate layer 2 is formed on the pinned magnetic layer 3. The nonmagnetic intermediate layer 2 is made of, for example, Cu. When the magnetoresistive element of the present invention is a tunnel magnetoresistive element (TMR element) using a tunnel effect, the nonmagnetic intermediate layer 2 is made of an insulating material, for example, $Al_2O_3$ or the like.

Furthermore, a free magnetic layer 1 comprising a two-layer film is formed on the nonmagnetic intermediate layer 2.

The free magnetic layer 1 comprises two films including a NiFe alloy film 9 and a Co film 10. As shown in FIG. 1, the Co film 10 is formed on the side in contact with the nonmagnetic intermediate layer 2 to prevent diffusion of metal elements at the interface with the nonmagnetic intermediate layer 2, thereby increasing ΔR/R (the rate of change in resistance).

The NiFe alloy film 9 is composed of, for example, 80 at % of Ni and 20 at % of Fe. For example, the thickness of the NiFe alloy film 9 is about 45 Å, and the thickness of the Co film 10 is about 5 Å.

As shown in FIG. 1, a protecting film 7 made of a nonmagnetic material comprising at least one element selected from Ta, Hf, Nb, Zr, Ti, Mo and W is formed on the free magnetic layer 1.

Furthermore, hard bias layers 5 and conductive layers 8 are formed on both sides of a laminate ranging from the underlying film 6 to the protecting film 7. The magnetization of the free magnetic layer 1 is oriented in the track width direction (the X direction shown in the drawing) by a bias magnetic field from the hard bias layers 5.

The hard bias layers 5 are made of, for example, a Co—Pt (cobalt-platinum) alloy, a Co—Cr—Pt (cobalt-chromium-platinum) alloy, or the like, and the conductive films 8 are made of α-Ta, Au, Cr, Cu (copper), W (tungsten), or the like. In the tunnel magnetoresistive element, the conductive layers 8 are respectively formed below the free magnetic layer 1 and above the antiferromagnetic layer 4.

In the present invention, a backed layer made of a metal material or a nonmagnetic metal such as Cu, Au, or Ag may be formed on the free magnetic layer 1. For example, the backed layer is formed to a thickness of about 12 to 20 Å.

The protecting layer 7 is preferably made of Ta or the like, and comprises an oxide surface layer.

By forming the backed layer, the mean free path of +spin (up spin) electrons which contribute to the magnetoresistive effect is extended to obtain a high rate of change in resistance by a so-called spin filter effect in a spin valve magnetic element, whereby the magnetic element can cope with a higher recording density.

In the present invention, heat treatment is performed after each of the layers is deposited to produce an exchange coupling magnetic field (Hex) at the interface between the antiferromagnetic layer 4 and the pinned magnetic layer 3 so that the magnetization direction of the pinned magnetic layer 3 is pinned in the height direction (the Y direction shown in the drawing). However, after heat treatment, the spin valve thin film element has the following crystal orientation.

The crystal orientation will be described on the basis of the exchange coupling film mainly comprising the antiferromagnetic layer and the ferromagnetic layer (pinned magnetic layer).

As described above, in the present invention, the seed layer 22 is formed below the antiferromagnetic layer 4. The seed layer 22 is formed so that the equivalent crystal plane represented by the {111} plane is preferentially oriented in parallel with the film plane, and thus the antiferromagnetic layer is also formed on the seed layer 22 so that the same crystal plane as the seed layer 22 is preferentially oriented in parallel with the film plane.

For example, when the (−111) plane of the seed layer 11 is preferentially oriented in parallel with the film plane, the (−111) plane of the antiferromagnetic layer 4 formed on the seed layer 22 is also preferentially oriented in parallel with the film plane.

In the pinned magnetic layer 3 formed on the antiferromagnetic layer 4, the same equivalent crystal plane as the antiferromagnetic layer 4 is preferentially oriented in parallel with the film plane.

Namely, in the present invention, in the seed layer 22, the antiferromagnetic layer 4 and the pinned magnetic layer 3, the same equivalent crystal planes represented by the . {111} plane are preferentially oriented in parallel with the film plane.

In the present invention, the crystal planes preferentially oriented in parallel with the film plane are preferably the equivalent crystal planes represented by the {111} plane because the crystal planes are closest-packed planes. For example, when the environmental temperature or the sensing current density in a magnetic head device is increased, particularly thermal stability is required. However, where the equivalent crystal planes represented by the {111} plane, which are the closest-packed planes, are preferentially oriented, atomic diffusion in the thickness direction less occurs to increase the thermal stability at the interface between layers of the film, thereby improving the stability of characteristics.

In the present invention, in the antiferromagnetic layer 4 and the pinned magnetic layer 3, the same equivalent crystal planes are preferentially oriented in parallel with the film plane, and at least some of the same crystal axes present in the crystal planes are oriented in different directions in the antiferromagnetic layer 4 and the pinned magnetic layer 3.

Such crystal orientation possibly depends upon the conditions for depositing the antiferromagnetic layer 4 and the pinned magnetic layer 3 in the deposition step (before heat treatment).

For example, when the material and the composition ratio of the antiferromagnetic layer 4 and the deposition conditions thereof are controlled so that the lattice constant of the antiferromagnetic layer 4 is sufficiently larger than the lattice constant of the pinned magnetic layer 3, the antiferromagnetic layer 4 and the pinned magnetic layer 3 are possibly less epitaxially grown.

Figure 15:
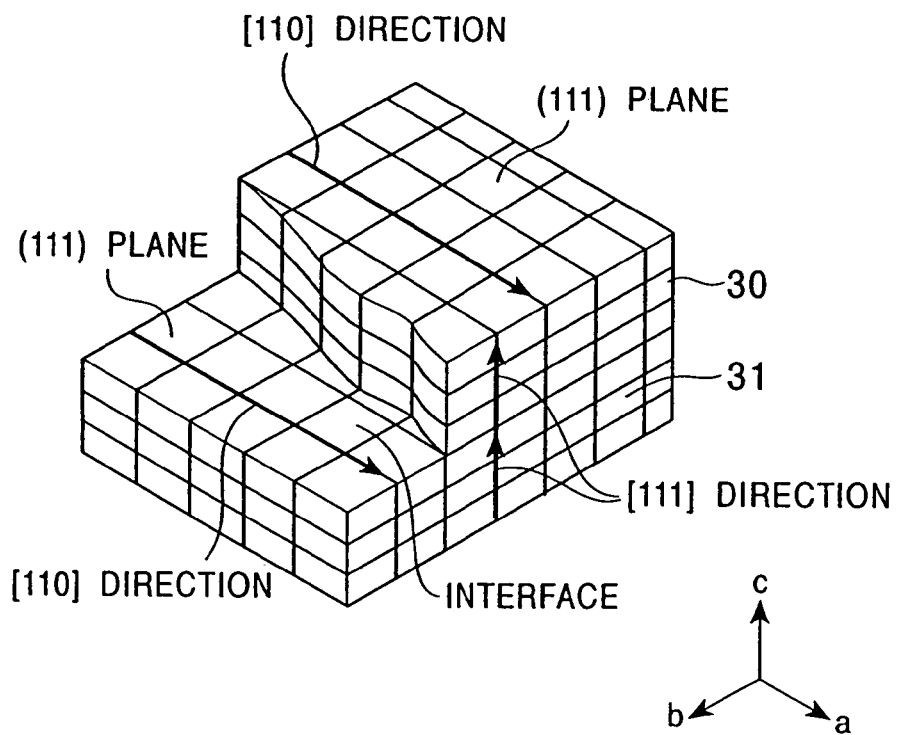
FIG. 15 is a drawing showing the crystal orientations of an antiferromagnetic layer and a ferromagnetic layer of an exchange coupling film of a comparative example.

In epitaxial deposition, the antiferromagnetic layer 4 and the pinned magnetic layer 3 are easily deposited so that all crystal orientations in the antiferromagnetic layer 4 have parallel relation to those in the pinned magnetic layer 3. Therefore, the same equivalent crystal planes are preferentially oriented in parallel with the interface between the antiferromagnetic layer 4 and the pinned magnetic layer 3, and the same equivalent crystal axes present in the crystal plane of the antiferromagnetic layer 4 and the pinned magnetic layer 3 are oriented in the same direction, thereby easily causing one-to-one correspondence between the atomic arrangements of the antiferromagnetic layer 4 and the pinned magnetic layer 3 at the interface between both layers (refer to FIG. 15). FIG. 15 shows an example in which [110] orientations present in the (111) planes of an antiferromagnetic layer 31 and a ferromagnetic layer 30 are in the same direction.

When such crystal orientation occurs in the step before heat treatment, the antiferromagnetic layer 4 is restrained by the crystal structure of the pinned magnetic layer 3 even by performing the heat treatment to fail to cause appropriate ordering transformation, significantly decreasing the exchange coupling magnetic field.

In the present invention, the antiferromagnetic layer 4 and the pinned magnetic layer 3 are possibly deposited without being epitaxially grown, and in this deposition state, heat treatment is performed to cause appropriate ordering transformation of the antiferromagnetic layer 4 without being restrained by the crystal structure of the pinned magnetic layer 3. In observation of the film structure of the spin valve film of the present invention after the heat treatment, the same equivalent crystal planes of the antiferromagnetic layer 4 and the pinned magnetic layer 3 are preferentially oriented in parallel with the film plane, while other crystal planes of the antiferromagnetic layer 4 and the pinned magnetic layer 3, which are not oriented in parallel with the film planes, have no parallel relation. As a result, at least some of the same equivalent crystal axes present in the crystal planes oriented in parallel with the film plane are oriented in different directions in the antiferromagnetic layer 4 and the pinned magnetic layer 3.

In the present invention, as one method for producing the above-described crystal orientation, the seed layer 22 is provided below the antiferromagnetic layer 4. As described above, in the antiferromagnetic layer 4 and the pinned magnetic layer 3 formed on the seed layer 22, the same equivalent crystal planes are preferentially oriented in parallel with the film plane by providing the seed layer 22, and this crystal orientation causes a high rate of change in resistance (ΔR/R).

In the present invention, at least some of the same equivalent crystal axes present in the crystal planes oriented in parallel with the film plane are oriented in different directions in the antiferromagnetic layer 4 and the pinned magnetic layer 3. Such crystal orientation is possibly due to the fact that the antiferromagnetic layer 4 is appropriately transformed from the face-centered cubic lattice as a disordered phase to a CuAu—I type face-centered tetragonal lattice as an ordered phase without being restrained by the crystal structure of the ferromagnetic layer 3. Therefore, a large exchange coupling magnetic field can be obtained, as compared with a conventional element. In the present invention, at least a portion of the crystal structure of the antiferromagnetic layer 4 may be transformed to the CuAuI type face-centered tetragonal ordered lattice by heat treatment.

In the present invention, in order to obtain a large exchange coupling magnetic field, it is important to have the following crystal structure.

Namely, in the above-described section of the spin valve film of the present invention, the crystal grain boundaries observed in the antiferromagnetic layer 4 and the crystal gain boundaries observed in the pinned magnetic layer 3 are discontinuous in at least a portion of the interface between both layers.

The crystal grain boundaries represent boundaries where two crystal grains contact each other while maintaining different crystal orientations, and include boundaries (so-called twin boundaries) where the atomic arrangements of two crystal grains have mirror symmetry. The grain boundaries (1), (2), (3) and (5) shown in FIG. 28 are the former boundaries having no special symmetric relation, and the grain boundaries (4), (8), (9), (10) and (11) shown in FIG. 28 are likely to be the latter twin boundaries.

Figure 26:
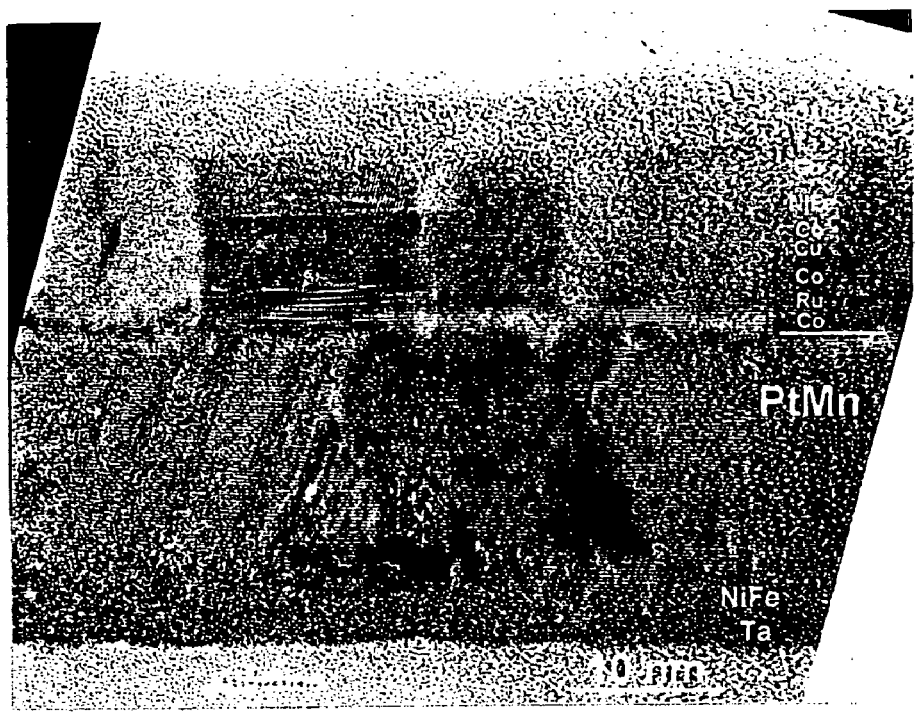
FIG. 26 is a transmission electron microscope photograph of a section of a spin valve thin film element of the present invention, taken along a direction parallel to the thickness direction.
Figure 28:
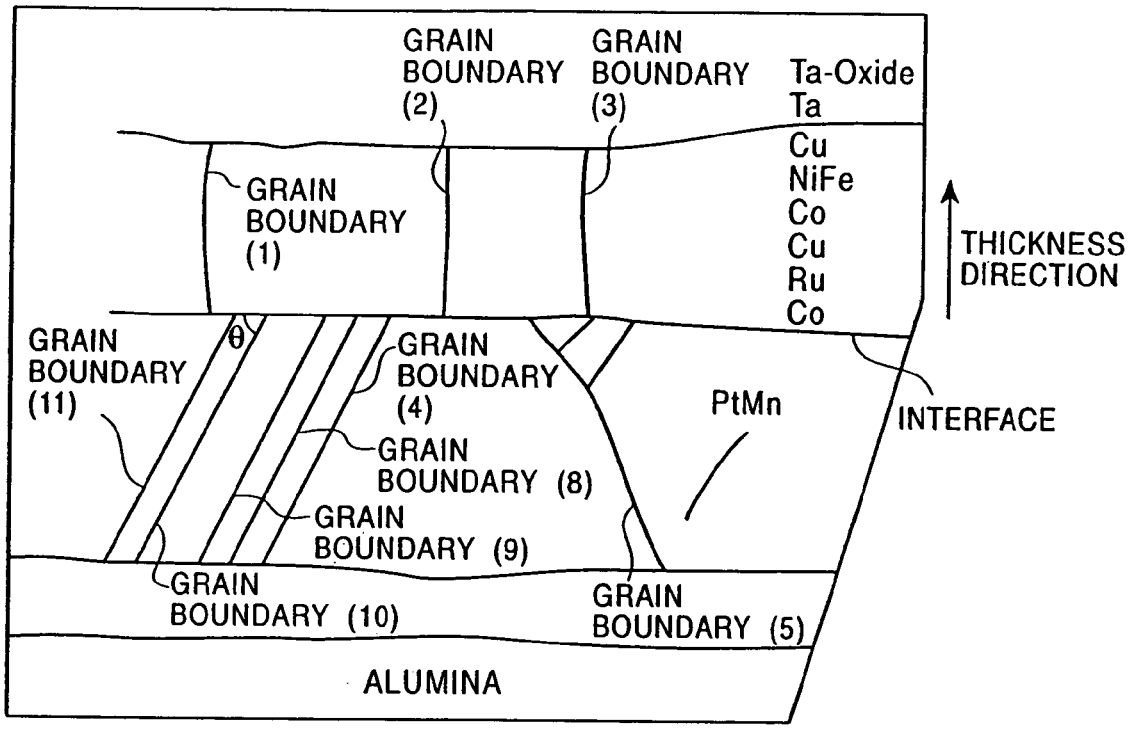
FIG. 28 is a partial schematic drawing of the transmission electron microscope photograph of FIG. 26.

As shown in FIGS. 26 and 28 (FIG. 26 is a transmission electron microscope photograph (TEM photograph), and FIG. 28 is a schematic drawing of the photograph of FIG. 26), the crystal grain boundaries (4), (5), (8), (9), (10), and (11) formed in the PtMn alloy film (the antiferromagnetic layer 4) and the crystal grain boundaries (1), (2) and (3) formed in the layer formed on the antiferromagnetic layer 4 are discontinuous at the interface between both layers. In this discontinuous state, it can be supposed that at least some of the same equivalent crystal axes present in the crystal plane of the antiferromagnetic layer 4 and the crystal plane of the pinned magnetic layer 3 in the direction of the film plane are oriented in different directions. The other example shown in FIGS. 30 and 31 indicates that the grain boundaries without the special symmetric relation and the twin boundaries formed in the antiferromagnetic layer, and the grain boundaries formed in the ferromagnetic layer are also discontinuous at the interface between both layers.

FIG. 26 is a transmission electron microscope (TEM) photograph of a section of a spin valve film according to the present invention, taken along the direction parallel to the thickness direction, and FIG. 28 is a schematic drawing thereof.

The spin valve film shown in FIG. 26 has the structure, from the bottom, Si substrate/$Al_2O_3$/under layer: Ta (3 nm)/seed layer: $Ni_{80}Fe_{20}$/antiferromagnetic layer: $Pt_{54}Mn_{46}$ (15 nm)/pinned magnetic layer: Co (1.5 nm)/Ru (0.8 nm)/Co (2.5 nm)/nonmagnetic intermediate layer: Cu (2.5 nm)/free magnetic layer: Co (1 nm)/$Ni_{80}Fe_{20}$ (3 nm)/backed layer: Cu (1.5 nm)/Ta/Ta oxide film. The numerical value in parentheses of each of the layers represents the thickness. The composition ratios of the seed layer, the antiferromagnetic layer and the free magnetic layer are shown by at %.

The antiferromagnetic layer and the pinned magnetic layer were deposited by a DC magnetron sputtering apparatus at an Ar gas pressure of 3 mTorr. In deposition of the antiferromagnetic layer, the distance between the substrate and a target was 80 nm.

The spin valve film having the above structure was heat-treated after deposition. The heat treatment was performed at a temperature of, for example, 200° C. or more, for 2 hours or more with a degree of vacuum of $10^{-7}$ Torr.

The transmission electron microscope photograph of FIG. 26 shows the state after the heat treatment.

FIG. 26 indicates that no interface is observed between the adjacent layers formed on PtMn (antiferromagnetic layer), and thus a state like a single layer is observed. This is possibly due to the fact that the layers formed on the PtMn alloy film are composed of elements having the atomic numbers close to each other, and have uniform crystal orientation, and thus the layers have similar properties of electron beam absorption and diffraction, causing little difference in contrast between the layers in a transmission electron microscope image.

However, as shown in FIG. 26, the interface between the PtMn alloy film and the layers formed on the PtMn alloy film is clearly observed.

Furthermore, the crystal grain boundaries formed in the PtMn alloy film and the crystal grain boundaries appearing in the layers formed on the PtMn alloy film are clearly observed. The crystal grain boundaries are mostly formed to extend in the thickness direction.

Referring to the schematic drawing of FIG. 28 showing the spin valve film of the present invention, for example, the crystal grain boundary (5) formed in the PtMn alloy film and the crystal grain boundaries (1), (2) and (3) formed in each of the layers formed on the PtMn alloy film are found to be discontinuous at the interface between the PtMn alloy film and the layers formed thereon.

The crystal grain boundaries (1), (2), (3) and (5) are considered as boundaries where two crystal grains contact each other while maintaining different crystal orientations. On the other hand, crystal grain boundaries (4), (8), (9), (10) and (11) are considered as twin boundaries where atomic arrangements have mirror-symmetry in a single crystal grain. The twin boundaries easily occur in parallel with each other.

It is also found that the crystal grain boundaries (4), (8), (9), (10) and (11) are discontinuous at the interface with the crystal grain boundaries (1), (2) and (3) formed in the layers above the PtMn alloy film.

The cause why the crystal grain boundaries formed in the antiferromagnetic layer and the crystal grain boundaries formed in the ferromagnetic layer are discontinuous at the interface between both layers will be described below. However, in the spin valve thin film element shown in FIG. 26 which is a transmission electron microscope photograph, the exchange coupling magnetic field is significantly increased, resulting in the achievement of an exchange coupling magnetic field of about $10.9 \times 10^4$ (A/m).

In the present invention, at least some of the twin grain boundaries of the twin crystal are formed in nonparallel with the interface. This is shown in FIGS. 26 and 28.

Namely, as shown in FIGS. 26 and 28, a twin crystal is formed in the antiferromagnetic layer, and the grain boundaries (4), (8), (9), (10) and (11), which are twin boundaries, occur in the twin crystal. All of the twin boundaries are nonparallel to the interface.

Figure 30:
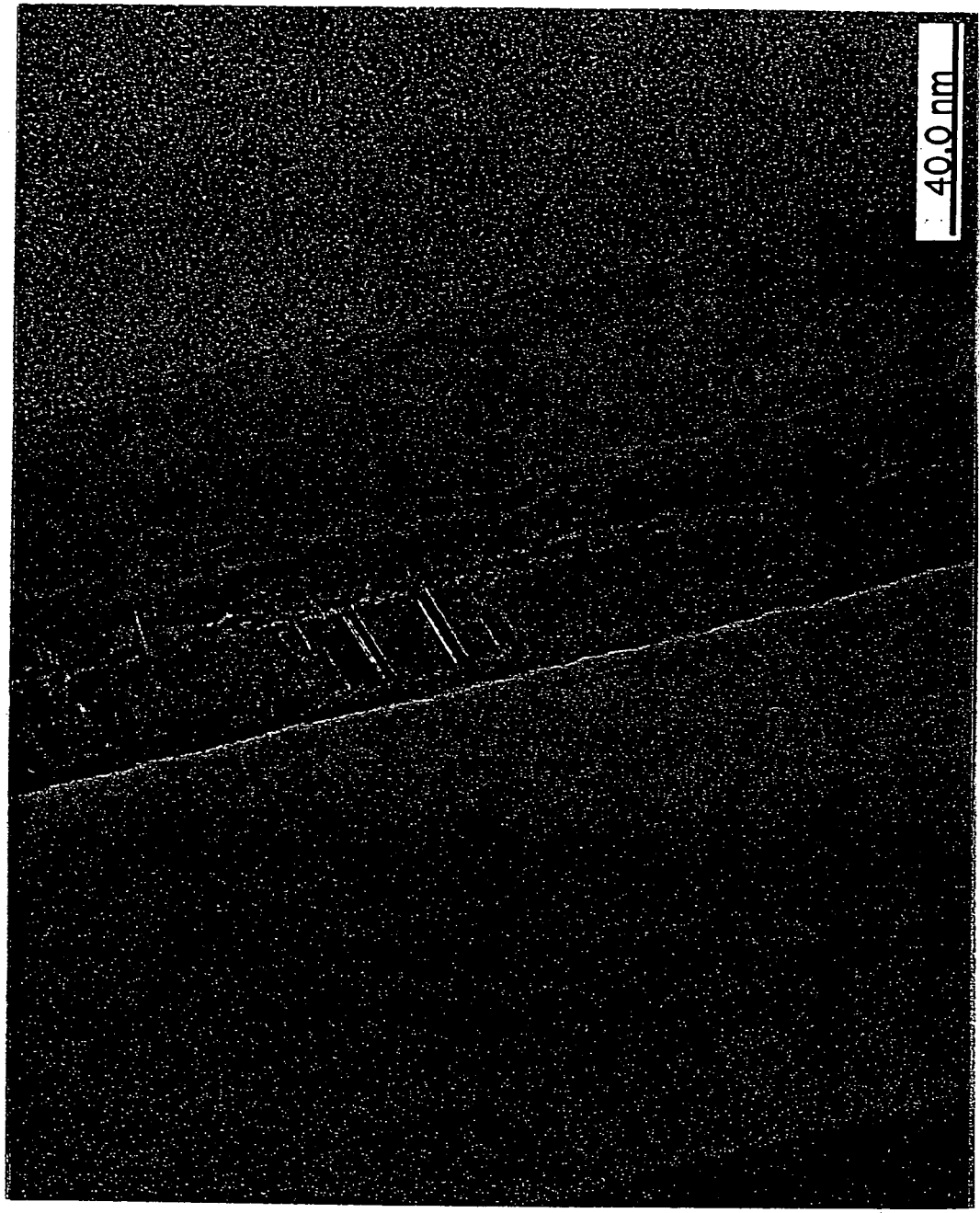
FIG. 30 is a transmission electron microscope photograph of a section of a spin valve thin film element of another example of the present invention, taken along a direction parallel to the thickness direction.

FIG. 30 is a transmission electron microscope (TEM) photograph of a section of a film having a different film structure from that shown in FIG. 26, taken along a direction parallel to the thickness direction.

This film has the structure, from the bottom, Si substrate/ $Al_2O_3$/under layer: Ta (3 nm)/seed layer: $Ni_{80}Fe_{20}$ (2 nm)/ antiferromagnetic layer: $Pt_{49}Mn_{51}$ (16 nm)/pinned magnetic layer: $Co_{90}Fe_{10}$ (1.4 nm)/Ru (0.9 nm)/$Co_{90}Fe_{10}$ (2.2 nm)/ nonmagnetic intermediate layer: Cu (2.2 nm)/free magnetic layer: $Co_{90}Fe_{10}$ (1 nm)/$Ni_{80}Fe_{20}$ (4 nm)/Ta (3 nm). The numerical value in parentheses of each of the layers represents the thickness. The composition ratios of the seed layer, the antiferromagnetic layer and the free magnetic layer are shown by at %.

The antiferromagnetic layer and the pinned magnetic layer were deposited by a DC magnetron sputtering apparatus at an Ar gas pressure of 2.5 mTorr. In deposition of the antiferromagnetic layer, the distance between the substrate and a target was 80 nm.

The spin valve film having the above structure was heat-treated after deposition. The heat treatment was performed at a temperature of, for example, 270° C. or more, for 4 hours with a degree of vacuum of $10^{-7}$ Torr. In this example, the composition ratio, the thickness and the deposition conditions of the PtMn were different from those shown in FIG. 26.

The transmission electron microscope photograph of FIG. 30 shows the state after the heat treatment. An electron beam diffraction image of this film indicates that in the antiferromagnetic layer and the ferromagnetic layer, the {111} plane is preferentially oriented in parallel with the interface.

Figure 31:
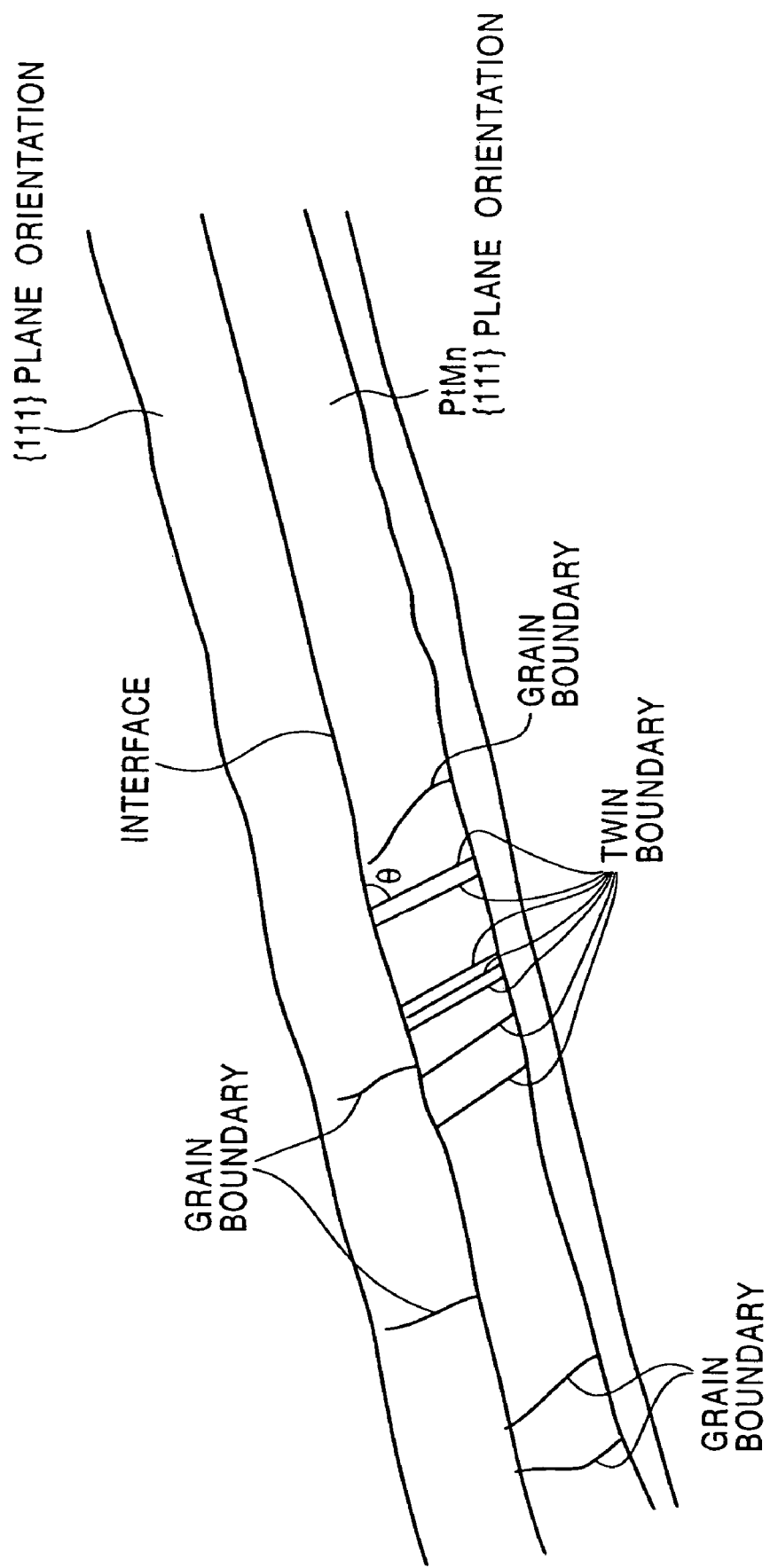
FIG. 31 is a partial schematic drawing of the transmission electron microscope photograph of FIG. 30

FIG. 31 is a schematic drawing of the TEM photograph of FIG. 30. FIG. 31 indicates that a plurality of twin boundaries are formed in the antiferromagnetic layer, and all the twin boundaries are nonparallel to the interface with the ferromagnetic layer.

In a case in which a twin crystal is formed in an antiferromagnetic layer, and twin boundaries are formed in the twin crystal in nonparallel with the interface, as in the present invention, the antiferromagnetic layer is appropriately transformed from a disordered lattice to an ordered lattice by heat treatment, resulting in a large exchange coupling magnetic field. With the film structure shown in FIG. 30, the exchange coupling magnetic field is about $9.3 \times 10^4$ (A/m).

Whether or not the twin boundaries are formed in the deposition step is not important. Even when the twin boundaries are not formed in the deposition step, the twin boundaries according to the present invention are possibly produced by heat treatment.

In the present invention, the atoms of the antiferromagnetic layer are unlikely to be constrained by the crystal structure of the ferromagnetic layer. In this way, with weak force of restraint at the interface, the antiferromagnetic layer is easily transformed from the disordered lattice to the ordered lattice. However, lattice strain occurs during the transformation, and thus the transformation cannot be effectively caused unless the lattice strain is appropriately relieved. In the transformation, possibly, the atoms of the antiferromagnetic layer are rearranged from the disordered lattice to the ordered lattice to produce lattice strain, and at the same time, the atomic arrangement is changed to mirror symmetry at short distance intervals to relieve the lattice strain. After heat treatment, the boundaries of change to mirror symmetry become twin boundaries. The formation of such twin boundaries means that ordering transformation occurs during the heat treatment.

In this case, the twin boundaries are formed in the direction crossing the interface between the antiferromagnetic layer and the ferromagnetic layer near the interface to relieve the lattice strain produced in rearrangement of the atoms in parallel with the interface. Therefore, when appropriate ordering transformation occurs over the entire layer, the twin boundaries are formed in nonparallel with the interface. This is true for the present invention. When the twin boundaries are formed in nonparallel with the interface, as in the present invention, a large exchange coupling magnetic field can be obtained. On the other hand, when the atoms cannot be rearranged in parallel with the interface, i.e., when the atoms of the antiferromagnetic layer are strongly constrained by the crystal structure of the ferromagnetic layer at the interface between both layers, the twin boundaries are not formed across the interface. In this case, the twin boundaries are not formed, or the twin boundaries are formed in parallel with the interface.

Where a plurality of twin boundaries are formed in the same twin crystal, as shown in FIGS. 26 and 30, the twin boundaries are substantially parallel to each other.

In the example shown in FIG. 30, the grain boundaries formed in the antiferromagnetic layer have no special symmetric relation with the grain boundaries formed in the ferromagnetic layer, and the grain boundaries and the twin boundaries formed in the antiferromagnetic layer and the grain boundaries formed in the ferromagnetic layer are found to be discontinuous at the interface between both layers.

Figure 27:
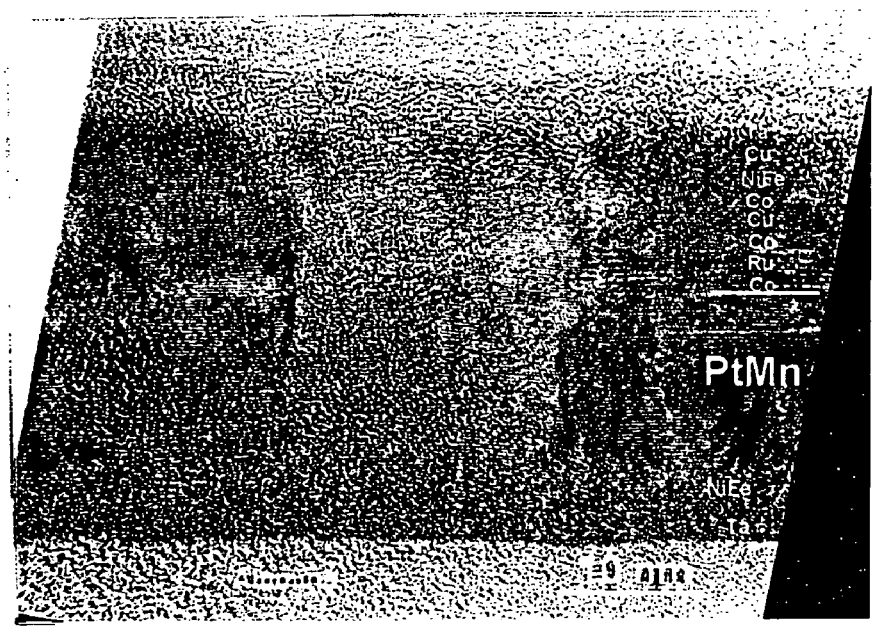
FIG. 27 is a transmission electron microscope photograph of a section of a spin valve thin film element of a comparative example, taken along a direction parallel to the thickness direction.
Figure 29:
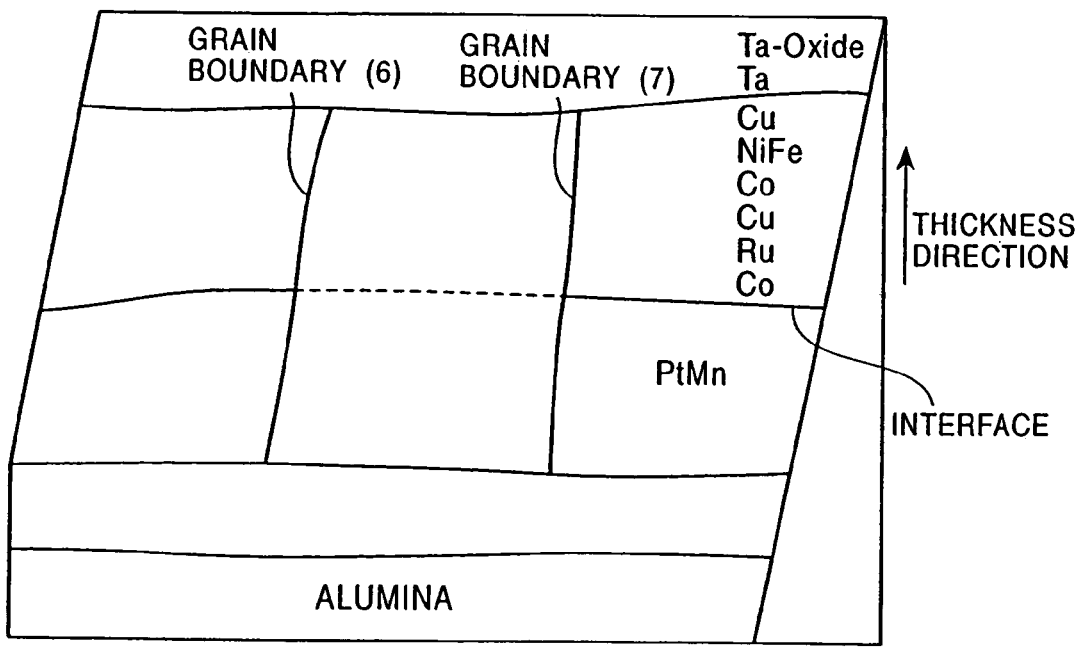
FIG. 29 is a partial schematic drawing of the transmission electron microscope photograph of FIG. 27.

It is thus found that the crystal structures shown in FIGS. 26, 28, 30 and 31 are apparently different from the crystal structure shown in FIGS. 27 and 29 (FIG. 27 is a transmission electron microscope photograph (TEM photograph), and FIG. 29 is a schematic drawing of the photograph of FIG. 27). In FIGS. 27 and 29, the crystal grain boundaries formed in the PtMn alloy film (the antiferromagnetic layer 4) and the crystal grain boundaries formed in the layer formed on the PtMn alloy film are continuous at the interface between both layers, and a large crystal grain is formed to extend across the interface between the antiferromagnetic layer 4 and the layer formed thereon.

FIG. 27 is a transmission electron microscope (TEM) photograph of a section of a conventional spin valve film taken along the direction parallel to the thickness direction, and FIG. 29 is a schematic drawing thereof.

The conventional spin valve film has the structure, from the bottom, Si substrate/$Al_2O_3$/under layer: Ta (3 nm)/seed layer: $Ni_{80}Fe_{20}$ (2 nm)/antiferromagnetic layer: $Pt_{44}Mn_{56}$ (13 nm)/pinned magnetic layer: Co (1.5 nm)/Ru (0.8 nm)/Co (2.5 nm)/nonmagnetic intermediate layer: Cu (2.5 nm)/free magnetic layer: Co (1 nm)/$Ni_{80}Fe_{20}$ (3 nm)/backed layer: Cu (1.5 nm)/Ta/Ta oxide film. The numerical value in parentheses of each of the layers represents the thickness. The composition ratios of the seed layer, the antiferromagnetic layer and the free magnetic layer are shown by at %.

This film structure is different from the structure of the spin valve film of the present invention in the Pt amount and thickness of the PtMn alloy film (antiferromagnetic layer), and deposition conditions.

The antiferromagnetic layer and the pinned magnetic layer were deposited by a DC magnetron sputtering apparatus at an Ar gas pressure of 0.8 mTorr. In deposition of the antiferromagnetic layer, the distance between the substrate and a target was 50 nm.

The spin valve film having the above structure was heat-treated after deposition. The heat treatment was performed at a temperature of, for example, 200° C. or more, for 2 hours or more with a degree of vacuum of $10^{-7}$ Torr.

The transmission electron microscope photograph of FIG. 27 shows the state after the heat treatment.

FIG. 27 indicates that a crystal grain block occurs to extend across the interface between the PtMn alloy film and the layers formed thereon in the thickness direction.

Referring to the schematic drawing of FIG. 29, crystal grain boundaries (6) and (7) are formed to extend across the interface between the PtMn alloy film and the layers formed on the PtMn alloy film. Namely, in the spin valve film as a comparative example, the crystal grain boundaries formed in the PtMn alloy film and the crystal grain boundaries formed in the layers above the PtMn alloy film are continuous at the interface.

The crystal grain boundaries (6) and (7) are considered as crystal grain boundaries where two crystal grains contact each other while maintaining different crystal orientations, and no twin boundary is possibly formed in the antiferromagnetic layer.

In the spin valve thin film element shown in the transmission electron microscope photograph of FIG. 27, the exchange coupling magnetic field is very small, and thus only an exchange coupling magnetic field of about $0.24 \times 10^4$ (A/m) can be obtained.

As described above, the present invention is different from a conventional example in the positions of the crystal grain boundaries formed in the antiferromagnetic layer and the crystal grain boundaries formed in the ferromagnetic layer at the interface between both layers.

In order to make the crystal grain boundaries formed in the antiferromagnetic layer and the crystal grain boundaries formed in the ferromagnetic layer discontinuous at the interface between both layers, as in the present invention, the composition of the antiferromagnetic layer is important, and the deposition conditions are also important. The deposition conditions include the heat treatment temperature, the heat treatment time, and the Ar gas pressure, the distance between the substrate and the target, the substrate temperature, the substrate bias voltage, the deposition rate, etc. during deposition of the antiferromagnetic layer and the ferromagnetic layer.

On the other hand, like in the comparative example shown in FIG. 29, in the antiferromagnetic layer having a different composition and deposited under different deposition conditions from the present invention, the crystal grain boundaries formed in the antiferromagnetic layer and the crystal grain boundaries formed in the ferromagnetic layer are easily in a continuous state at the interface between both layers.

In the present invention in which the crystal grain boundaries are discontinuous at the interface, possibly, the antiferromagnetic layer and the ferromagnetic layer are not epitaxially grown in the deposition step, and thus the constituent atoms of the antiferromagnetic layer are not strongly restricted by the crystal structure of the ferromagnetic layer. Therefore, the antiferromagnetic layer is appropriately transformed from a disordered lattice to an ordered lattice in heat treatment, resulting in a large exchange coupling magnetic field.

On the other hand, in the comparative example in which the crystal grains are continues at the interface, possibly, the antiferromagnetic layer and the ferromagnetic layer are epitaxially grown in the deposition step, and thus the constituent atoms of the antiferromagnetic layer are strongly restricted by the crystal structure of the ferromagnetic layer. Therefore, the antiferromagnetic layer cannot be properly transformed from a disordered lattice to an ordered lattice in heat treatment, resulting in a small exchange coupling magnetic field.

In both the spin valve thin film elements respectively shown in the transmission electron microscope photographs of FIGS. 26 and 27, lattice fringes of the {111} plane are observed in parallel with the film plane. It is thus recognized that in the antiferromagnetic layer and the ferromagnetic layer of each of the present invention and the comparative example, the crystal planes equivalent to the {111} plane are preferentially oriented in parallel with the film plane.

When the same equivalent crystal planes are preferentially oriented in the antiferromagnetic layer and the ferromagnetic layers, as described above, a high rate ($\Delta R/R$) of change in resistance can be obtained.

In the exchange coupling film having the crystal grain boundaries shown in FIGS. 26, 28, 30 and 31, as in the present invention, the antiferromagnetic layer 4 and the pinned magnetic layer 3 are possibly deposited without being epitaxially grown in the deposition step to cause appropriate ordering transformation of the antiferromagnetic layer 4 by heat treatment without being restrained by the crystal structure of the pinned magnetic layer 3. Therefore, a large exchange coupling magnetic field can be obtained.

It is also found that the grain boundaries (4), (8), (9), (10) and (11) shown in FIG. 28, i.e., the twin boundaries, are nonparallel to the interface. It is also found that the twin boundaries in the other example shown in FIGS. 30 and 31 are nonparallel to the interface. In the antiferromagnetic layer in any of the examples of the present invention, the equivalent crystal planes represented by the {111} plane are preferentially oriented in parallel with the interface due to the seed layer provided below the antiferromagnetic layer.

A twin crystal represents a solid material in which at least two single crystals combine with each other according to specified symmetric relation. The twin boundary is formed in the twin crystal so that atomic arrangements are mirror symmetric with respect to the twin boundary as a boundary. Such a twin crystal is produced to relieve internal stress. Even when the twin boundary is formed to promote relief of internal stress, the occurrence of great internal stress in a portion makes it impossible to appropriately relieve the internal stress at the twin boundary. Therefore, grain boundaries like the grain boundary (5) shown in FIG. 28 and the grain boundaries shown in FIG. 30 are formed, in which two crystal grains contact each other while maintaining different crystal orientations. As a result, the great internal stress is possibly relieved.

When the twin boundaries formed in the antiferromagnetic layer are nonparallel to the interface according to the present invention, at least some of the same equivalent crystal axes present in the crystal planes of the antiferromagnetic layer and the pinned magnetic layer 3 in the direction of the film plane are oriented in different directions at the interface between both layers.

The large exchange coupling magnetic field cannot be obtained unless the antiferromagnetic layer 4 is transformed from the disordered lattice to the ordered lattice by heat treatment. However, during transformation, the atomic arrangement is changed to mirror symmetry to form the twin boundaries, relieving lattice strain produced in movement of atoms in the direction parallel to the interface and in the thickness direction. At this time, the twin boundaries are formed in nonparallel with the interface.

In appropriate transformation of the antiferromagnetic layer from the disordered lattice to the ordered lattice, the twin boundaries nonparallel to the interface are formed in the antiferromagnetic layer to produce the large exchange coupling magnetic field. In this case, a plurality of twin boundaries may be formed in a twin crystal so that the twin boundaries are substantially parallel to each other.

On the other hand, in the comparative example shown in FIGS. 27 and 29, no twin boundary is formed in the antiferromagnetic layer. This is because the atoms in the antiferromagnetic layer are not rearranged by transformation during heat treatment. Therefore, transformation from the disordered lattice to the ordered lattice less proceeds, and only a small exchange coupling magnetic field can be obtained.

Even when the twin boundaries are formed in the antiferromagnetic layer, with the twin boundaries parallel to the interface, lattice strain in the thickness direction is supposed to be relieved to some extent. However, the atoms are not rearranged in parallel with the interface, and thus the antiferromagnetic layer is not appropriately transformed from the disordered lattice to the ordered lattice at the interface. Therefore, the exchange coupling magnetic field is decreased.

In the present invention, the inner angle θ (refer to FIGS. 28 and 31) between each of the twin boundaries and the interface is preferably 68° to 76°. The inner angle θ shown in FIG. 28 is about 68°, and the inner angle θ shown in FIG. 31 is about 75°. With the inner angle in this range, the equivalent crystal plane represented by the {111} plane of the antiferromagnetic layer is preferentially oriented in parallel with the interface. In the pinned magnetic layer 3, preferably, the equivalent crystal plane represented by the {111} plane is preferentially oriented in parallel with the interface. This permits effective improvement in the rate of change in resistance.

In the present invention, when the diffraction pattern described below is observed in a transmission electron beam diffraction image of the crystal orientation of each of the antiferromagnetic layer 4 and the pinned magnetic layer 3 after deposition and heat treatment, the crystal orientations of the antiferromagnetic layer 4 and the pinned magnetic layer 3 can be supposed to be as follows. The same equivalent crystal planes are preferentially oriented in parallel with the interface between the antiferromagnetic layer 4 and the pinned magnetic layer 3, and at least some of the crystal axes present in the crystal planes are oriented in different directions in the antiferromagnetic layer 4 and the pinned magnetic layer 3.

In the present invention, an electron beam is incident from the direction parallel to the interface between the antiferromagnetic layer 4 and the pinned magnetic layer 3 to obtain a transmission electron beam diffraction image of each of the antiferromagnetic layer 4 and the pinned magnetic layer 3.

In the transmission electron beam diffraction image of each of the antiferromagnetic layer 4 and the pinned magnetic layer 3, a diffraction spot corresponding to a reciprocal lattice point corresponding to each of the crystal planes appear. The reciprocal lattice point (=diffraction spot) represents a crystal plane by Miller indices, for example, such as the (110) plane.

The diffraction spot is indexed. Since the distance r between the origin and the diffraction spot is inversely proportional to the lattice spacing d, the spacing d can be determined by measuring the distance r. The spacing of each crystal plane {hkl} of PTMn, CoFe, NiFe or the like is known to some extent, and thus each diffraction spot can be indexed by {hkl}. A general document of transmission electron beam diffraction images shows a transmission electron beam diffraction pattern of each of single crystal structures in which each diffraction spot is indexed by specified {hk1} observed or calculated in each of directions of a crystal grain. The document is used to determine which diffraction spot of a crystal plane in a single crystal structure is the same as or similar to each of the diffraction spots obtained in the transmission electron beam diffraction image of each of the antiferromagnetic layer 4 and the pinned magnetic layer 3. The same {hkl} indexing as the single crystal is performed for each of the diffraction spots.

The transmission electron beam diffraction image of the antiferromagnetic layer 4 is superposed on the transmission electron beam diffraction image of the pinned magnetic layer 3 so that the beam origins are caused to coincide with each other.

Alternatively, a transmission electron beam diffraction image is obtained in a range in which an electron beam is simultaneously applied to both the antiferromagnetic layer 4 and the pinned magnetic layer 3.

Figure 16:
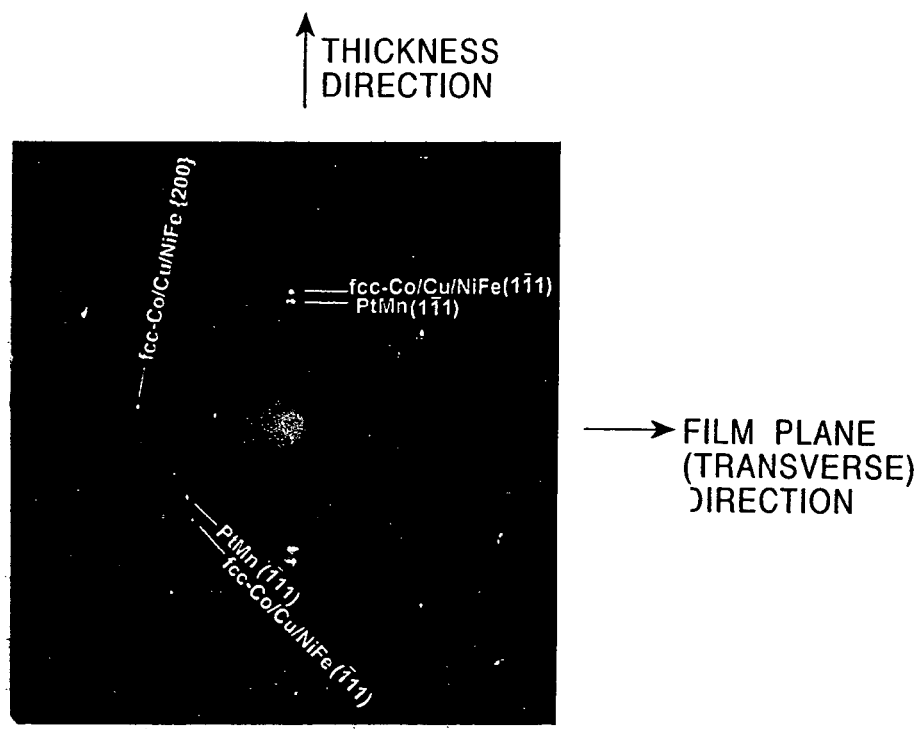
FIG. 16 is a transmission electron beam diffraction image of a spin valve film of the present invention from the direction parallel to the film plane.
Figure 18:
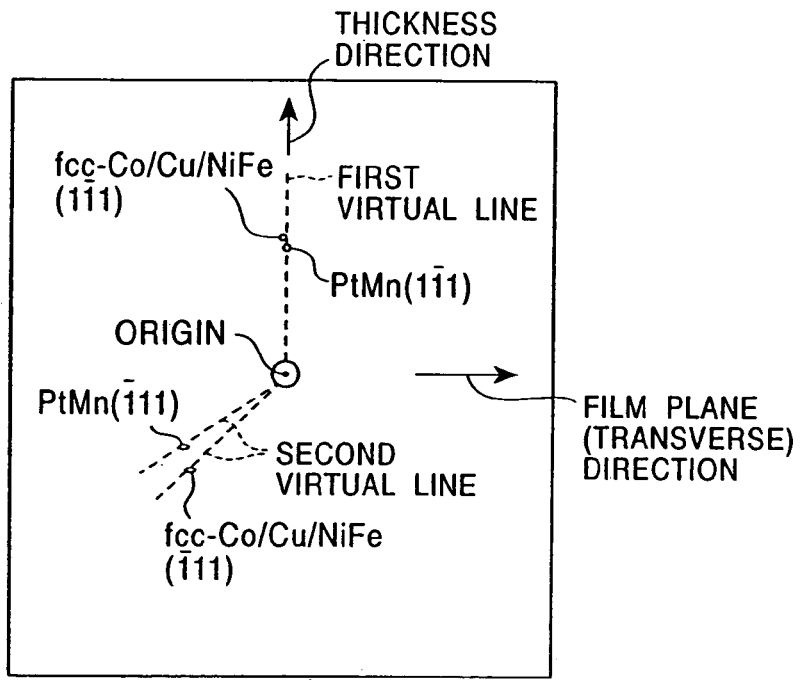
FIG. 18 is a partial schematic drawing of the transmission electron beam diffraction image shown in FIG. 16.

In the present invention, a first virtual line connecting the beam origin and a diffraction spot indicating a crystal plane and located in the thickness direction as viewed from the beam origin in the diffraction image of the antiferromagnetic layer 4 coincides with a first virtual line connecting the beam origin and a diffraction spot having the same indices as the antiferromagnetic layer 4 in the diffraction image of the pinned magnetic layer 3 (refer to FIGS. 16 and 18; FIG. 16 is a transmission electron beam diffraction image, and FIG. 18 is a schematic drawing of the diffraction image of FIG. 16). This means that in the antiferromagnetic layer 4 and the pinned magnetic layer 3, the same equivalent crystal planes are preferentially oriented in the direction of the film plane.

In the present invention, a second virtual line connecting the beam origin and a diffraction spot indicating a crystal plane and located in a direction other than the thickness direction as viewed from the beam origin in the diffraction image of the antiferromagnetic layer 4 deviates from a second virtual line connecting the beam origin and a diffraction spot having the same indices as the antiferromagnetic layer in the diffraction image of the pinned magnetic layer 3 (refer to FIGS. 16 and 18). This means that the crystal planes of the antiferromagnetic layer 4 and the pinned magnetic layer 3, which are not oriented in parallel with the film plane, are not parallel to each other. Alternatively, when a diffraction spot indicating a crystal plane and located in a direction other than the thickness direction as viewed from the beam origin is observed only in the diffraction image of one of the antiferromagnetic layer 4 and the ferromagnetic layer, the crystal planes of the antiferromagnetic layer 4 and the pinned magnetic layer 3, which are not oriented in parallel with the film plane, are not parallel to each other.

Figure 17:
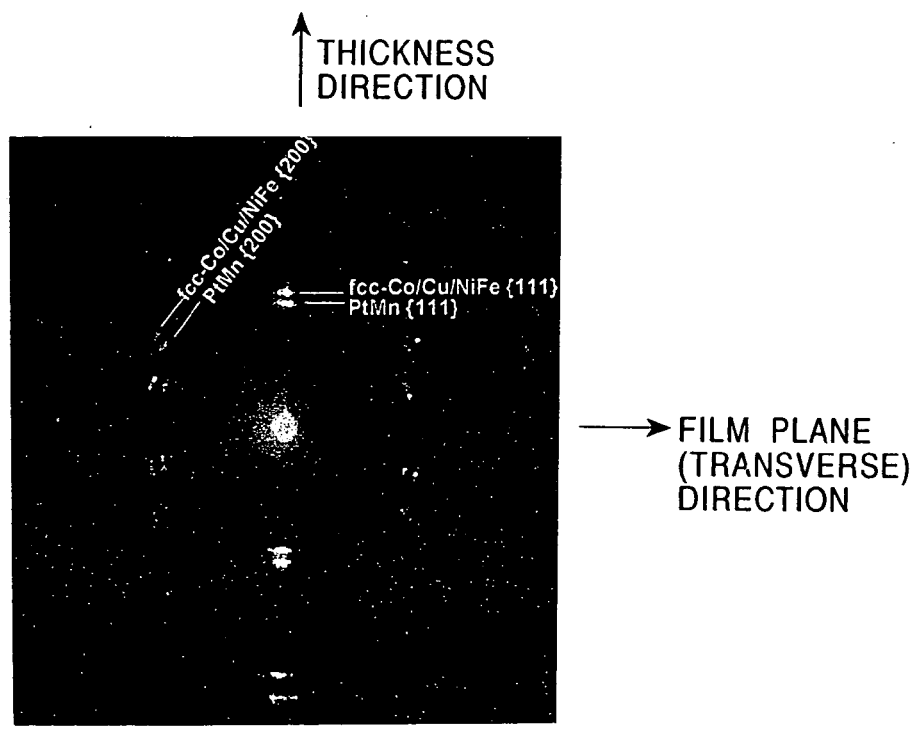
FIG. 17 is a transmission electron beam diffraction image of a spin valve film of a comparative example from the direction parallel to the film plane.
Figure 19:
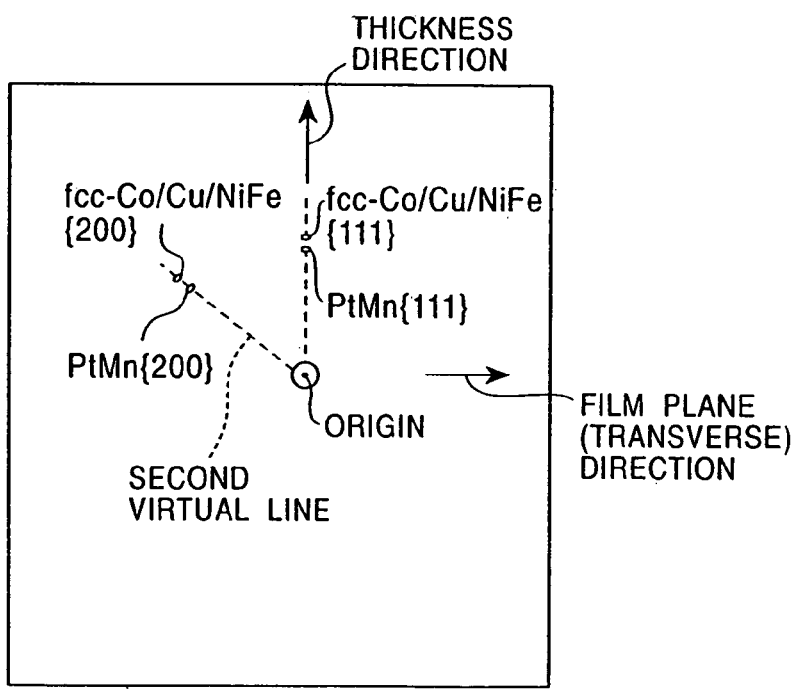
FIG. 19 is a partial schematic drawing of the transmission electron beam diffraction image shown in FIG. 17.

In the present invention, it is possible to obtain a diffraction image apparently different from that of the comparative example shown in FIGS. 17 and 19 (FIG. 17 is a transmission electron beam diffraction image, and FIG. 19 is a schematic drawing of the diffraction image of FIG. 17). In the comparative example shown in FIGS. 17 and 19, the second virtual line connecting the beam origin and a diffraction spot indicating a crystal plane and located in a direction other than the thickness direction as viewed from the beam origin in the diffraction image of the antiferromagnetic layer 4 coincides with the second virtual line connecting the beam origin and a diffraction spot having the same indices as the antiferromagnetic layer in the diffraction image of the pinned magnetic layer 3.

When such a transmission electron beam diffraction image as shown in FIG. 16 is obtained, the same equivalent crystal planes of the antiferromagnetic layer 4 and the pinned magnetic layer 3 are preferentially oriented in parallel with the film plane, and at least some of the same equivalent crystal axes present in the crystal planes are oriented in different directions in the antiferromagnetic layer 4 and the pinned magnetic layer 3.

Each of FIGS. 16 and 17 shows a transmission electron beam diffraction image of a section of a laminated film (spin valve film) taken along the thickness direction thereof, the image being obtained by applying an electron beam vertically to the section (the direction parallel to the film plane). The transmission electron beam diffraction image shown in FIG. 16 was obtained with an electron beam aperture which permits simultaneous irradiation of both the antiferromagnetic layer and another layer with the electron beam.

FIGS. 18 and 19 are schematic drawings of the transmission electron beam diffraction mages shown in FIGS. 16 and FIG. 17, respectively.

FIG. 16 shows the transmission electron beam diffraction image obtained by measuring a spin valve film of the present invention having the following film structure:

$Al_2O_3$ (3 nm)/Ta (3 nm)/seed layer: $Ni_{80}Fe_{20}$ (2 nm)/antiferromagnetic layer: $Pt_{54}Mn_{46}$ (15 nm)/pinned magnetic layer: [Co (1.5 nm)/Ru (0.8 mn)/Co (2.5 nm)]/nonmagnetic intermediate layer: Cu (2.5 nm)/free magnetic layer: [Co (1 nm)/$Ni_{80}Fe_{20}$ (3 nm)]/backed layer: Cu (1.5 nm)/protecting layer: Ta (1.5 nm)/Ta oxide film FIG. 17 shows the transmission electron beam diffraction image obtained by measuring a spin valve film of a comparative example having the following film structure:

$Al_2O_3$ (3 nm)/Ta (3 nm)/seed layer: $Ni_{80}Fe_{20}$ (2 nm)/antiferromagnetic layer: $Pt_{44}Mn_{56}$ (13 nm)/pinned magnetic layer: [Co (1.5 nm)/Ru (0.8 mn)/Co (2.5 nm)]/nonmagnetic intermediate layer: Cu (2.5 nm)/free magnetic layer: [Co (1 nm)/$Ni_{80}Fe_{20}$ (3 nm)]/backed layer: Cu (1.5 nm)/protecting layer: Ta (1.5 nm)/Ta oxide film Referring to FIG. 16, the diffraction spot indicating the {111} plane of PtMn and the diffraction spot indicating the {111} plane of fcc-Co/Cu/CiFe are located on the same line extending in the layer thickness direction. When these diffraction spots are specifically labeled, for example, (1–11) planes, the diffraction spots (–111) indicative of the crystal plane which is not parallel to the layer surface but forms 70.5 degrees angle with the (1–11) plane, are not on the same line extending from the center of the diffraction diagram. In other words, the crystal planes not parallel to the layer surface do not enter a parallel relationship between the PtMn layer and the pinned magnetic layer (ferromagnetic layer).

Referring to FIG. 17, the diffraction points indicative of {111} planes of PtMn and fcc-Co/Cu/NiFe (fcc-Co pinned magnetic layer is included) are on the same line extending in the layer thickness direction. Moreover, the diffraction points indicative of {200} planes are on the same line extending from the center of the diagram. The same can be observed for the diffraction spots other than the above-described diffraction spots. The diffraction diagrams of the PtMn and the fcc-Co/Cu/NiFe have every direction analogous. The reason that the diffraction diagram of PtMn is smaller than that of the fcc-Co/Cu/NiFe is that the lattice constant of PtMn is larger than that of the fcc-Co/Cu/NiFe by approximately 10 percent. PtMn and fcc-Co/Cu/NiFe exhibit perfect lattice matching, i.e., an epitaxial relationship.

In the above film structures, the numerical value in parentheses in each of the layers represents the thickness. In the electron beam diffraction image shown in FIG. 16, numeral "1" with "–" (bar) placed above it in the notation of a crystal plane with Miller indices means "–1" (minus 1) and is thus described as "–1" in the specification.

In the transmission electron beam diffraction image of an example shown in FIG. 16, a diffraction spot of the antiferromagnetic layer (PtMn), which is indexed as (1–11), appears in the thickness direction. Similarly, a diffraction spot of a layer (denoted by fcc-Co/Cu/NiFe in the electron beam diffraction image) other than the antiferromagnetic layer (PtMn), which is indexed as (1–11), appears in the thickness direction.

The schematic drawing of FIG. 18 showing these diffraction spots indicates that a first virtual line connecting the beam origin and the diffraction spot indexed as (1–11) in the diffraction image of the antiferromagnetic layer coincides with a first virtual line connecting the beam origin and the diffraction spot indexed as (1–11) in the diffraction image of a layer other than the antiferromagnetic layer.

In the transmission electron beam diffraction image of the example shown in FIG. 16, a diffraction spot of the antiferromagnetic layer (PtMn), which is indexed as (−111), also appears in a direction other than the thickness direction. Similarly, a diffraction spot of a layer (denoted by fcc-Co/Cu/NiFe in the electron beam diffraction image) other than the antiferromagnetic layer (PtMn), which is indexed as (−111), also appears in the thickness direction.

However, as shown in FIG. 18, a second virtual line connecting the beam origin and the above diffraction spot of PtMn indexed as (−111) deviates from that of fcc-Co/Cu/NiFe.

Namely, the electron beam diffraction image of the example reveals that the same equivalent crystal planes represented by {111} planes of the antiferromagnetic layer and the ferromagnetic layer are preferentially oriented in parallel with the thickness direction, while the crystal planes of the antiferromagnetic layer and the ferromagnetic layer, other than the crystal planes oriented in parallel with the film plane, are not parallel to each other.

In the example shown in FIGS. 16 and 18, the diffraction spots (−111) of both the antiferromagnetic layer and the ferromagnetic layer, i.e., the diffraction spots present in a direction other than the thickness direction, appear in the diffraction image, but either of both layers possibly shows no diffraction spot (−111) in the diffraction image. In this case, crystal planes of the antiferromagnetic layer and the ferromagnetic layer, other than the crystal planes oriented in parallel with the film plane, are not parallel to each other.

On the other hand, in the transmission electron beam diffraction image of the comparative example shown in FIG. 17, a diffraction spot of the {111} plane of the antiferromagnetic layer (PtMn) appears in the thickness direction. Similarly, a diffraction spot of the {111} plane of a layer (denoted by fcc-Co/Cu/NiFe in the electron beam diffraction image) other than the antiferromagnetic layer (PtMn) appears in the thickness direction.

The diffraction spots observed in the transmission electron beam diffraction image shown in FIG. 17 are denoted by the {111} plane including all equivalent crystal planes, not by the equivalent crystal planes such as (111) plane, (11−1) plane, etc. This is because unlike in FIG. 16, other {111} diffraction spots (for example, (−111)) present in directions other than the thickness direction need not be described here.

In the transmission electron beam diffraction image of the comparative example shown in FIG. 17, a diffraction spot of the {200} plane of the antiferromagnetic layer (PtMn) appears in a direction other the thickness direction. Similarly, a diffraction spot of the {200} plane of a layer (denoted by fcc-Co/Cu/NiFe in the electron beam diffraction image) other than the antiferromagnetic layer (PtMn) appears in a direction other than the thickness direction.

Referring to the schematic drawing of FIG. 19, in the transmission electron beam diffraction image of the comparative example, the diffraction spots of the {111} planes of the antiferromagnetic layer and the ferromagnetic layer appear in the thickness direction as viewed from the beam origin, and the first virtual lines connecting the beam origin and the respective diffraction spots {111} of both layers coincide with each other. Also, the second virtual lines connecting the beam origin and the respective diffraction spots {200} of the antiferromagnetic layer and the ferromagnetic layer appearing in the direction other than the thickness direction as viewed from the beam origin coincide with each other.

Namely, in the comparative example, crystal planes of the antiferromagnetic layer and the ferromagnetic layer in a direction other than the film plane direction are parallel to each other. This is possibly due to that the antiferromagnetic layer and the ferromagnetic layer are epitaxially grown, thereby easily causing a so-called coherent state in which the atomic arrangements of the antiferromagnetic layer and the ferromagnetic layer have one-to-one correspondence at the interface between both layers. In the coherent state, the ferromagnetic layer cannot be appropriately transformed to the ordered lattice by heat treatment, and thus a large exchange coupling magnetic field cannot be exhibited.

As a result of measurement of an exchange coupling magnetic field (Hex) of a spin valve film having the film structure of the comparative example, an exchange coupling magnetic filed of as low as about $0.24 \times 10^4$ (A/m) could be obtained.

On the other hand, in the present invention, the same equivalent crystal planes of the antiferromagnetic layer and the ferromagnetic layer are preferentially oriented in parallel with the interface between both layers, but the other crystal planes of both layers are not parallel to each other. This means that the crystal orientations of the antiferromagnetic layer and the ferromagnetic layer have rotational relation with respect to an axis vertical to the interface, and that at least some of the same equivalent crystal axes present in the crystal planes preferentially oriented in parallel with the interface are oriented in different directions in the antiferromagnetic layer and the ferromagnetic layer.

It is thus thought that the atomic arrangements of the antiferromagnetic layer and the ferromagnetic layer do not have one-to-one correspondence at the interface between both layers, and the antiferromagnetic layer is appropriately transformed to the ordered lattice without being restrained by the crystal structure of the ferromagnetic layer during heat treatment of the antiferromagnetic layer. Therefore, a larger exchange coupling magnetic field can be obtained, as compared with a conventional spin valve film.

As a result of actual measurement of an exchange coupling magnetic field (Hex) of the spin valve film used in the above-described experiment in the present invention, an exchange coupling magnetic filed of as large as about $10.9 \times 10^4$ (A/m) could be obtained.

With the spin valve film showing the above-described transmission electron beam diffraction image, appropriate ordering transformation of the antiferromagnetic layer 4 occurs in the heat treatment step to obtain a large exchange coupling magnetic field.

In the present invention, the diffraction spots located in the thickness direction preferably show the equivalent crystal planes represented by the {111} plane.

In the present invention, when the diffraction pattern described below is obtained in a transmission electron beam diffraction image for observing the crystal orientation of each of the antiferromagnetic layer 4 and the pinned magnetic layer 3 from a direction other than the above-described direction, the crystal orientations of the antiferromagnetic layer 4 and the pinned magnetic layer 3 can be supposed to be as follows. The same equivalent crystal planes of the antiferromagnetic layer 4 and the pinned magnetic layer 3 are preferentially oriented in parallel with the film plane, and at least some of the crystal axes present in the crystal planes are oriented in different directions in the antiferromagnetic layer 4 and the pinned magnetic layer 3.

Figure 20:
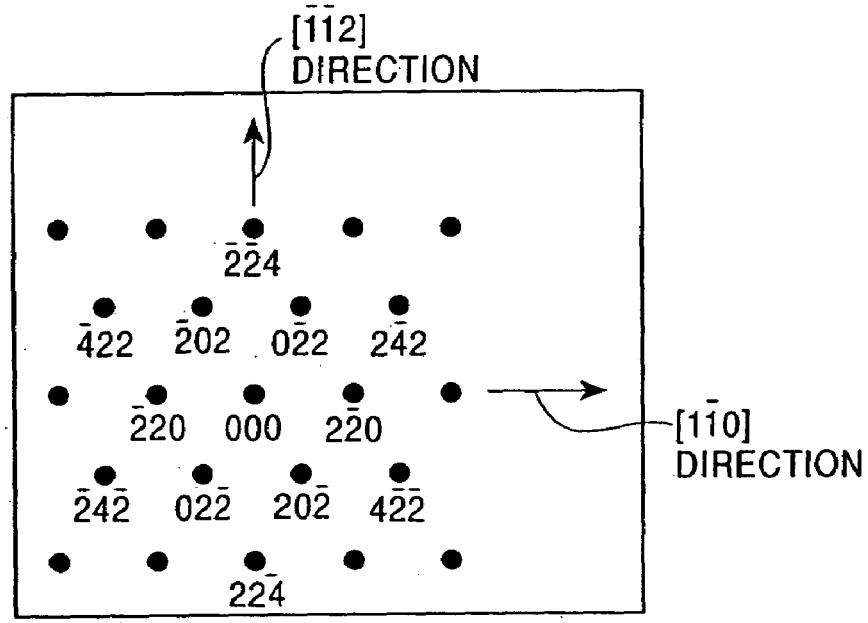
FIG. 20 is a schematic drawing of a transmission electron beam diffraction image of an antiferromagnetic layer of the present invention from the direction perpendicular to the film plane.
Figure 21:
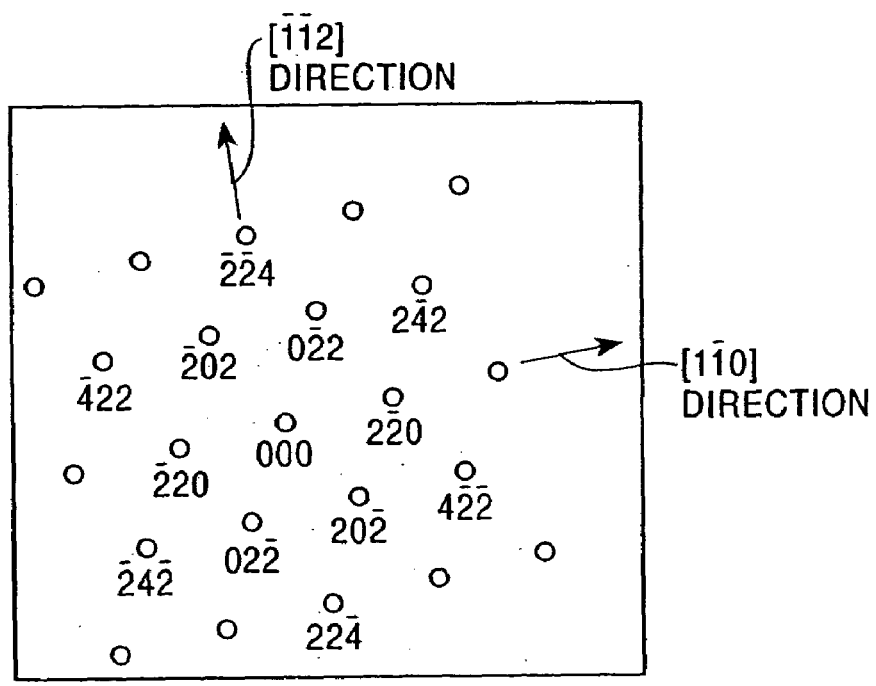
FIG. 21 is a schematic drawing of a transmission electron beam diffraction image of a ferromagnetic layer of the present invention from the direction perpendicular to the film plane.

Namely, an electron beam is incident from the direction perpendicular to the interface between the antiferromagnetic layer 4 and the pinned magnetic layer 3 to simultaneously obtain transmission electron beam diffraction images of the antiferromagnetic layer 4 and the pinned magnetic layer 3 (refer to FIGS. 20 and 21; FIG. 20 is a schematic drawing of a diffraction image of the antiferromagnetic layer 4, and FIG. 21 is a schematic drawing of a diffraction image of the pinned magnetic layer 3).

In the transmission electron beam diffraction images of the antiferromagnetic layer 4 and the pinned magnetic layer 3, the diffraction spots of the same reciprocal lattice planes are observed. The reciprocal lattice plane, i.e., the projection plane of an electron beam diffraction mage, is parallel to a crystal plane perpendicular to the incident electron beam, and for example, crystal planes parallel to the reciprocal lattice planes include the (111) plane, etc. In the present invention, the direction perpendicular to the interface is preferably the direction of the equivalent crystal axes represented by the <111> direction, or the crystal planes parallel to the interface between the antiferromagnetic layer and the ferromagnetic layer are preferably equivalent crystal planes represented by the {111} plane.

Next, the diffraction spots are indexed with reference to the document of transmission electron beam diffraction images of single crystal structures. Since the antiferromagnetic layer 4 and the pinned magnetic layer 3 have different lattice constants, i.e., different lattice spacings, the transmission electron beam diffraction spots of the antiferromagnetic layer 4 can be easily distinguished from the transmission electron beam diffraction spots of the pinned magnetic layer 3 by the difference in the distance between each of the spots and the origin (refer to FIG. 22).

Figure 22:
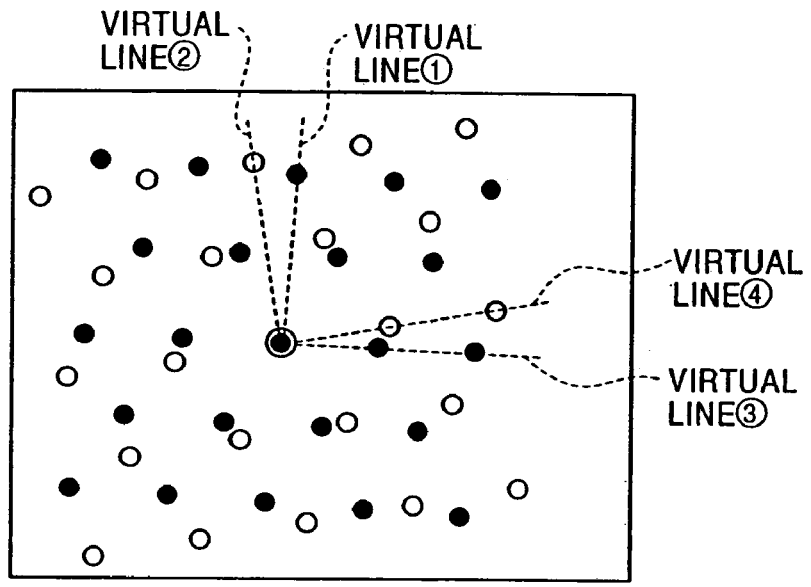
FIG. 22 is a schematic drawing of the state in which the transmission electron beam diffraction images shown in FIGS. 20 and 21 are superposed.

In the present invention, in the diffraction images of the antiferromagnetic layer 4 and the pinned magnetic layer 3, a virtual line (virtual line (1) or (3)) connecting the beam origin and a diffraction spot of the antiferromagnetic layer 4 deviates from a virtual line (virtual line (2) or (4)) connecting the beam origin and a diffraction spot of the pinned magnetic layer 3 with the same indices as the antiferromagnetic layer 4 (refer to FIG. 22). This means that the same equivalent crystal orientations present in the crystal planes oriented in parallel with the film plane are in different directions in the antiferromagnetic layer 4 and the pinned magnetic layer 3. Alternatively, when an indexed diffraction spot is observed only in the diffraction image of one of the antiferromagnetic layer 4 and the ferromagnetic layer, the same equivalent crystal orientations of the antiferromagnetic layer 4 and the pinned magnetic layer 3 are in different directions.

Figure 23:
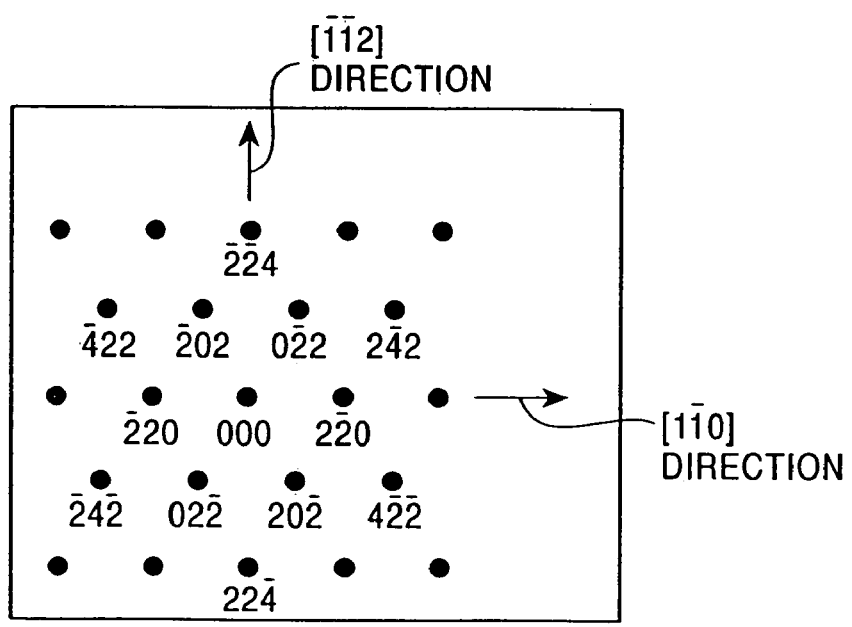
FIG. 23 is a schematic drawing of a transmission electron beam diffraction image of an antiferromagnetic layer of a comparative example from the direction perpendicular to the film plane.
Figure 24:
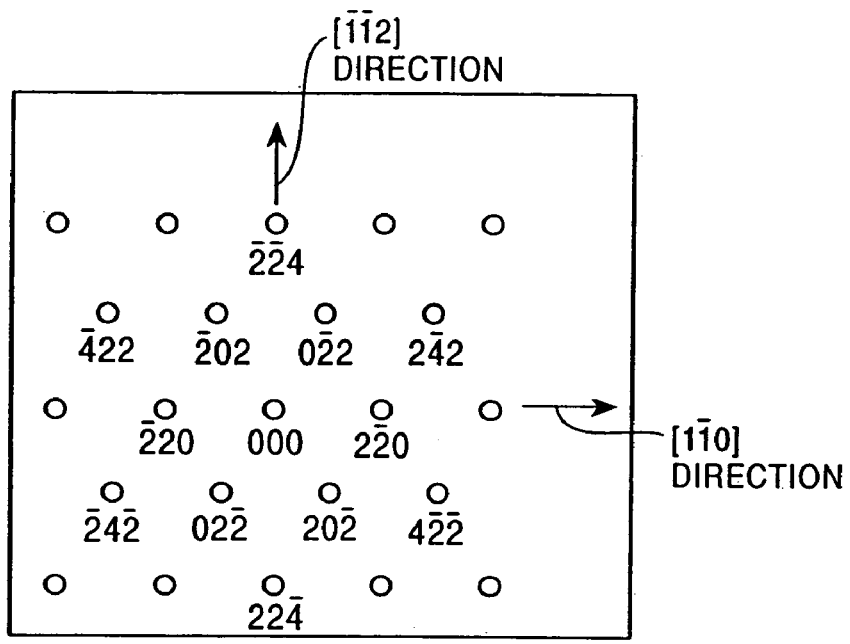
FIG. 24 is a schematic drawing of a transmission electron beam diffraction image of a ferromagnetic layer of a comparative example from the direction perpendicular to the film plane.
Figure 25:
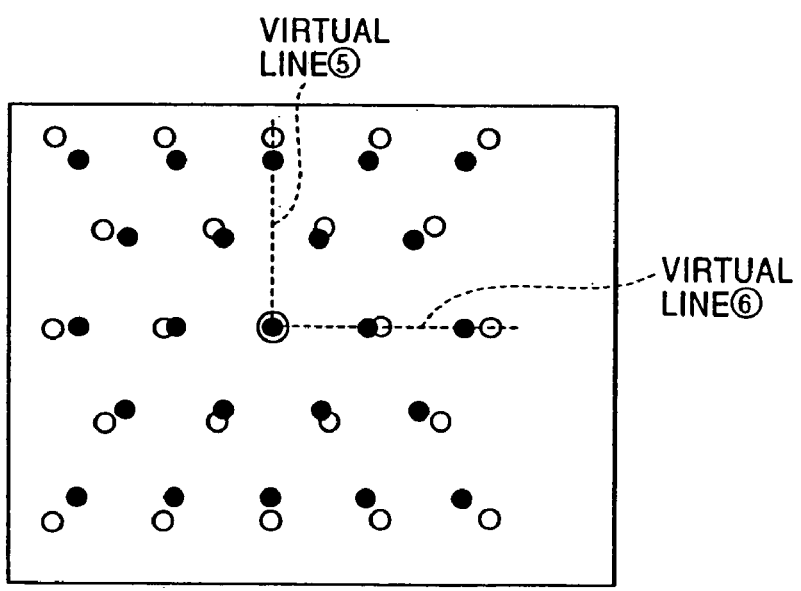
FIG. 25 is a schematic drawing of the state in which the transmission electron beam diffraction images shown in FIGS. 23 and 24 are superposed.

The transmission electron beam diffraction image of the present invention is found to be apparently different from a transmission electron beam diffraction image of the comparative example shown in FIGS. 23 to 25 (FIG. 23 is a schematic drawing of a diffraction image of the antiferromagnetic layer, FIG. 24 is a schematic drawing of a diffraction image of the pinned magnetic layer, and FIG. 25 is a schematic drawing in which the diffraction images of FIGS. 23 and 24 are superposed).

As shown in FIG. 25, a virtual line (5) or (6) connecting a diffraction spot and the beam origin in the diffraction image of the antiferromagnetic layer coincides with the same virtual line in the diffraction image of the ferromagnetic layer.

In the present invention, when the transmission electron beam diffraction images shown in FIGS. 20 to 22 are obtained, it is supposed that the same equivalent crystal planes of the antiferromagnetic layer 4 and the pinned magnetic layer 3 are preferentially oriented in parallel with the film plane, and at least some of the same equivalent crystal axes present are oriented in different directions in the crystal planes of the antiferromagnetic layer 4 and the pinned magnetic layer 3.

Therefore, with the spin valve film exhibiting the above transmission electron beam diffraction images, the antiferromagnetic layer 4 is appropriately transformed to the ordered lattice in the heat treatment step, thereby obtaining a large exchange coupling magnetic field.

The characteristics of the crystal orientations, the grain boundaries and the twin boundaries of the spin valve thin film element according to the present invention are described above. However, in order to obtain the above-described crystal orientations, grain boundaries and twin boundaries, it is necessary to prevent the atoms of the antiferromagnetic layer 4 from being strongly restrained by the crystal structure of the pined magnetic layer 3 in deposition of the antiferromagnetic layer 4 and the pinned magnetic layer 3. In order to weaken the force of restraint, the interface between the antiferromagnetic layer 4 and the pinned magnetic layer 3 is preferably in the incoherent state.

The incoherent state means that the atomic arrangements of the antiferromagnetic layer 4 and the pinned magnetic layer 3 do not have one-to-one correspondence at the interface between both layers. In order to form such an incoherent state, the difference between the lattice constants of the antiferromagnetic layer 4 and the pinned magnetic layer 3 must be increased.

In addition, the antiferromagnetic layer 4 must be appropriately transformed to the ordered lattice by heat treatment. Even when the interface with the pinned magnetic layer 3 is in the incoherent state, the absence of ordering transformation of the antiferromagnetic layer 4 decreases the exchange coupling magnetic field.

The occurrence of the incoherent state in the deposition step, and the occurrence of ordering transformation greatly depend upon the composition ratio of the components and the deposition conditions of the antiferromagnetic layer 4.

In the present invention, the ratio of the element X or elements X+X' of the antiferromagnetic layer 4 is preferably set to 45 to 60 at %. This is supposed to bring the interface into the incoherent state during the deposition step, and cause appropriate ordering transformation of the antiferromagnetic layer 4 during heat treatment.

By using the antiferromagnetic layer 4 having a composition in the above range for a spin valve thin film element, it is possible to preferentially orient the same equivalent crystal planes of the antiferromagnetic layer 4 and the pinned magnetic layer 3 in parallel with the film plane after heat treatment, and orient at least some of the same equivalent crystal axes present in the crystal planes in different directions in the antiferromagnetic layer 4 and the pinned magnetic layer 3. Also, the crystal grain boundaries in the antiferromagnetic layer 4 and the crystal grain boundaries in the pinned magnetic layer 3 can be made discontinuous at least a portion of the interface. Furthermore, the {111} plane of the antiferromagnetic layer 4 can be oriented, and the twin boundaries formed in the antiferromagnetic layer 4 can be formed in nonparallel with the interface. The experimental results described below indicate that with the composition in the above range, an exchange coupling magnetic field of $1.58 \times 10^4$ (A/m) or more can be obtained.

In the present invention, the ratio of the element X or elements X+X' is more preferably set to 49 to 56.5 at %.

With this component ratio, an exchange coupling magnetic field of $7.9 \times 10^4$ (A/m) or more can be obtained.

The deposition conditions important for forming the incoherent state include the Ar gas pressure used for depositing the antiferromagnetic layer 4 and the pinned magnetic layer 3, the heat treatment conditions, and the distance between the substrate and the target, substrate temperature, substrate bias voltage, and deposition rate of deposition of the antiferromagnetic layer 4, etc.

In the present invention, the Ar gas pressure is set to, for example, 3 mTorr. The heat treatment is performed in a magnetic field at a temperature of 200 to 300° C. under a vacuum of $10^{-6}$ Torr or less for 2 hours or more. The distance between the substrate and the target is 80 nm.

In the spin valve thin film element having the above-described crystal orientations according to the present invention, at least a portion of the interface between the antiferromagnetic layer 4 and the pinned magnetic layer 3 can be made incoherent after heat treatment.

The relation between the crystal orientations and the relation between the transmission electron beam diffraction images of the antiferromagnetic layer 4 and the pinned magnetic layer are also observed between the seed layer 22 and the antiferromagnetic layer 4. Namely, the same equivalent crystal planes of the seed layer 22 and the antiferromagnetic layer 4 are preferentially oriented in parallel with the film plane, and at least some of the same equivalent crystal axes present in the crystal planes are oriented in different directions in the seed layer 22 and the antiferromagnetic layer 4.

In a section parallel to the thickness direction, the crystal grain boundaries in the seed layer 22 and the crystal grain boundaries in the antiferromagnetic layer 4 are at least partially discontinuous.

In the seed layer 22 and the antiferromagnetic layer 4 having such crystal orientations and crystal grain boundaries, the incoherent state is easily maintained in at least a portion of the interface between the seed layer 22 and the antiferromagnetic layer 4, thereby causing appropriate ordering transformation of the antiferromagnetic layer 4 without being restrained by the crystal structure of the seed layer 2. Therefore, a larger exchange coupling magnetic field can be obtained.

In the present invention, the thickness of the antiferromagnetic layer 4 is preferably in the range of 7 nm to 30 nm. In this way, even when the thickness of the antiferromagnetic layer 4 is decreased, an appropriate exchange coupling magnetic field can be produced.

Figure 2:
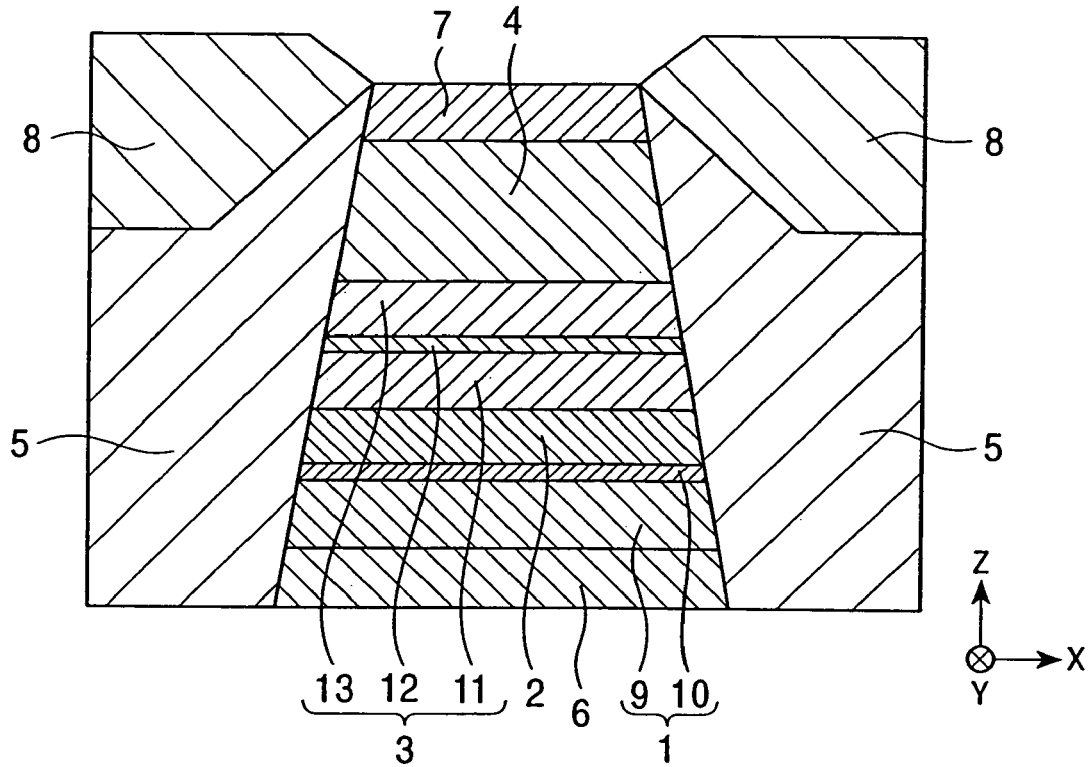
FIG. 2 is a sectional view of the structure of a single spin valve magnetoresistive element in accordance with a second embodiment of the present invention, as viewed from the ABS side.

FIG. 2 is a partial sectional view showing the structure of a spin valve thin film element according to another embodiment of the present invention.

In this spin valve thin film element, an underlying layer 6, a free magnetic layer 1 comprising a NiFe alloy film 9 and a Co film 10, a nonmagnetic intermediate layer 2, a pinned magnetic layer 3 comprising a Co film 11, a Ru film 12 and a Co film 13, an antiferromagnetic layer 4 and a protecting layer 7 are laminated in turn from the bottom to form a laminated film. Furthermore, hard bias layers 5 and conductive layers 8 are formed on both sides of the laminated film.

The material of each of the layers is the same as the spin valve thin film element shown in FIG. 1.

In the spin valve thin film element shown in FIG. 2, the same equivalent crystal planes of the antiferromagnetic layer 4 and the pinned magnetic layer 3 are preferentially oriented in parallel with the film plane, and at least some of the same equivalent crystal axes present in the crystal planes are oriented in different directions in the antiferromagnetic layer 4 and the pinned magnetic layer 3.

In a section of each of the antiferromagnetic layer 4 and the pinned magnetic layer 3 taken along the direction (the Z direction shown in the drawing) parallel to the thickness direction, the crystal grain boundaries in the antiferromagnetic layer 4 and the crystal grain boundaries in the pinned magnetic layer 3 are discontinuous in at least a portion of the interface.

Therefore, at least a portion of the interface holds the incoherent state, and the antiferromagnetic layer 4 is appropriately transformed to the ordered lattice by heat treatment, thereby producing a large exchange coupling magnetic field.

In the antiferromagnetic layer 4 and the pinned magnetic layer 3, the equivalent crystal planes represented by the {111} plane are preferably preferentially oriented in parallel with the film plane. In addition, in the crystal planes, the equivalent crystal orientations represented by <110> orientation are preferably in different directions in the antiferromagnetic layer 4 and the pinned magnetic layer 3.

Where the antiferromagnetic layer 4 is formed on the pinned magnetic layer 3, as in this embodiment, the {111} plane of the antiferromagnetic layer 4 is oriented with difficulty, as compared with the case in which the seed layer, the antiferromagnetic layer 4 and the pinned magnetic layer 3 are laminated in this order. However, the {111} plane of the antiferromagnetic layer 4 can be oriented by controlling the deposition conditions. In this case, a twin crystal is formed in at least a portion of the antiferromagnetic layer 4 so that the twin boundaries of the twin crystal are partially nonparallel to the interface. As a result, the rate of change in resistance can be improved, and the antiferromagnetic layer 4 is appropriately transformed from the disordered lattice to the ordered lattice to obtain a large exchange coupling magnetic field. The inner angle between each of the twin boundaries and the interface is preferably 68° to 76°.

In a transmission electron beam diffraction image of each of the antiferromagnetic layer 4 and the pinned magnetic layer 3 of the spin valve thin film element shown in FIG. 2, obtained by applying an electron beam in the direction parallel to the interface, a diffraction spot corresponding to a reciprocal lattice point which indicates each crystal plane is observed in each of the layers. In these images, a first virtual line connecting the beam origin and a diffraction spot indicating a crystal plane and positioned in the thickness direction as viewed from the beam origin in the diffraction image of the antiferromagnetic layer 4 coincides with a first virtual line connecting the beam origin and a diffraction spot having the same indices in the diffraction image of the pinned magnetic layer 3.

Furthermore, in the diffraction images, a second virtual line connecting the beam origin and a diffraction spot indicating a crystal plane and positioned in a direction other than the thickness direction as viewed from the beam origin in the diffraction image of the antiferromagnetic layer 4 deviates from a second virtual line connecting the beam origin and a diffraction spot having the same indices as the antiferromagnetic layer 4 in the diffraction image of the pinned magnetic layer 3. Alternatively, a diffraction spot indicating a crystal plane and positioned in a direction other than the thickness direction as viewed from the beam origin is observed only in the diffraction image of one of the antiferromagnetic layer 4 and the ferromagnetic layer.

In this case, the diffraction spots positioned in the thickness direction preferably indicate the equivalent crystal planes represented by the {111} plane.

In a transmission electron beam diffraction image of each of the antiferromagnetic layer 4 and the pinned magnetic layer 3 of the spin valve thin film element shown in FIG. 2, obtained by applying an electron beam from the direction perpendicular to the interface, a diffraction spot corresponding to a reciprocal lattice point which indicates each crystal plane is observed in each of the layers. In these images, a virtual line connecting the beam origin and a diffraction spot in the diffraction image of the antiferromagnetic layer 4 deviates from a virtual line connecting the beam origin and a diffraction spot having the same indices as the antiferromagnetic layer 4 in the diffraction image of the pinned magnetic layer 3. Alternatively, a diffraction spot having indices among the diffraction spots is observed only in the diffraction image of one of the antiferromagnetic layer 4 and the ferromagnetic layer.

In this case, the direction perpendicular to the interface is preferably the direction of the equivalent crystal orientations represented by <111> direction, or the crystal planes parallel to the interface between the antiferromagnetic layer and the ferromagnetic layer are preferably the equivalent crystal planes represented by the {111} plane.

In the present invention, when the above-described transmission electron beam diffraction images are obtained, it is supposed that the same equivalent crystal planes of the antiferromagnetic layer 4 and the pinned magnetic layer 3 are preferentially oriented in parallel with the film plane, and at least some of the same equivalent crystal axes present in the crystal planes are oriented in different directions in the antiferromagnetic layer 4 and the pinned magnetic layer 3.

With the spin valve film exhibiting the above transmission electron beam diffraction images, the antiferromagnetic layer 4 is appropriately transformed to the ordered lattice by heat treatment, thereby obtaining a larger exchange coupling magnetic field than a conventional film.

In the spin valve thin film element shown in FIG. 2, the composition ratio of the element X or elements X+X' which constitute the antiferromagnetic layer 4 is preferably set to 45 to 60 at %. With this component ratio, an exchange coupling magnetic field of $1.58 \times 10^4$ (A/m) or more can be obtained.

In the present invention, the composition ratio of the element X or elements X+X' is more preferably set to 49 to 57 at %. With this component ratio, an exchange coupling magnetic field of $7.9 \times 10^4$ (A/m) or more can be obtained.

Figure 3:
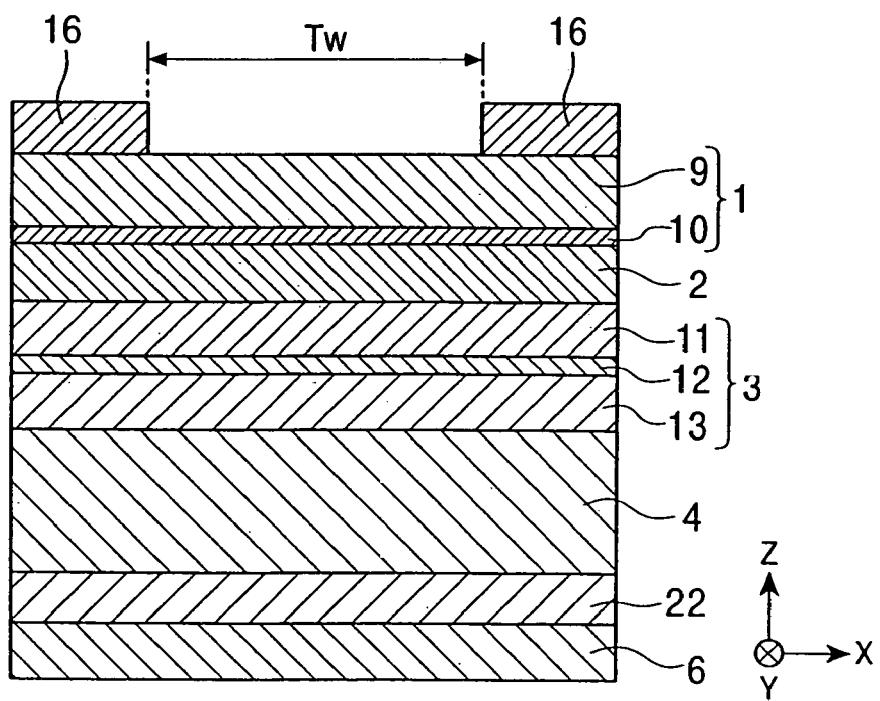
FIG. 3 is a sectional view of the structure of a single spin valve magnetoresistive element in accordance with a third embodiment of the present invention, as viewed from the ABS side.

FIG. 3 is a partial sectional view showing the structure of a spin valve thin film element according to a further embodiment of the present invention.

Referring to FIG. 3, an underlying layer 6, a seed layer 22, an antiferromagnetic layer 4, a pinned magnetic layer 3, a nonmagnetic intermediate layer 2 and a free magnetic layer 1 are laminated in turn from the bottom.

The underlying layer 6 is preferably made of at least one element of Ta, Hf, Nb, Zr, Ti, Mo, and W.

The seed layer 22 preferably has a crystal structure comprising a face-centered cubic crystal in which an equivalent crystal plane represented by the {111} plane is preferentially oriented in parallel with the interface with the antiferromagnetic layer 4. The material of the seed layer 22 is the same as the spin valve thin film element shown in FIG. 1.

By forming the seed layer 22 below the antiferromagnetic layer 4, the same equivalent crystal plane as the seed layer 22 is preferentially oriented in parallel with the film plane in the antiferromagnetic layer 4, the pinned magnetic layer 3, the nonmagnetic intermediate layer 2 and the free magnetic layer 1 formed on the seed layer 22.

Although the pinned magnetic layer 3 shown in FIG. 3 comprises a three-layer film comprising Co films 11 and 13, and a Ru film 12, other materials may be used, and for example, a single layer film may be formed in place of the three-layer film.

Although the free magnetic layer 1 comprises a two-layer film comprising a NiFe alloy film 9 and a Co film 10, other materials may be used, and for example, a single layer film may be formed in place of the two-layer film.

In the spin valve thin film element shown in FIG. 3, the same equivalent crystal planes of the antiferromagnetic layer 4 and the pinned magnetic layer 3 are preferentially oriented in parallel with the film plane, and at least some of the same equivalent crystal axes present in the crystal planes are oriented in different directions in the antiferromagnetic layer 4 and the pinned magnetic layer 3.

In a section of each of the antiferromagnetic layer 4 and the pinned magnetic layer 3 taken along the direction (the Z direction shown in the drawing) parallel to the thickness direction, the crystal grain boundaries in the antiferromagnetic layer 4 and the crystal grain boundaries in the pinned magnetic layer 3 are discontinuous in at least a portion of the interface.

Therefore, at least a portion of the interface holds the incoherent state, and the antiferromagnetic layer 4 is appropriately transformed to the ordered lattice by heat treatment, thereby producing a large exchange coupling magnetic field.

In the antiferromagnetic layer 4 and the pinned magnetic layer 3, the equivalent crystal planes represented by the {111} plane are preferably preferentially oriented in parallel with the film plane. In addition, in the crystal planes, the equivalent crystal orientations represented by <110> orientation are preferably in different directions in the antiferromagnetic layer 4 and the pinned magnetic layer 3.

In the present invention, the equivalent crystal planes represented by the {111} plane of the antiferromagnetic layer 4 and the pinned magnetic layer 3 are preferably preferentially oriented in parallel with the film plane, and a twin crystal is formed in at least a portion of the antiferromagnetic layer 4 so that the twin boundaries of the twin crystal are nonparallel to the interface. Therefore, the rate of change in resistance can be increased, and the antiferromagnetic layer 4 can be appropriately transformed from the disordered lattice to the ordered lattice, thereby producing a large exchange coupling magnetic field. The inner angle between each of the twin boundaries and the interface is preferably 68° to 76°.

In a transmission electron beam diffraction image of each of the antiferromagnetic layer 4 and the pinned magnetic layer 3 of the spin valve thin film element shown in FIG. 3, obtained by applying an electron beam in the direction parallel to the interface, a diffraction spot corresponding to a reciprocal lattice point which indicates each crystal plane is observed in each of the layers. In these images, a first virtual line connecting the beam origin and a diffraction spot indicating a crystal plane and positioned in the thickness direction as viewed from the beam origin in the diffraction image of the antiferromagnetic layer 4 coincides with a first virtual line connecting the beam origin and a diffraction spot having the same indices as the antiferromagnetic layer 4 in the diffraction image of the pinned magnetic layer 3.

Furthermore, in the diffraction images, a second virtual line connecting the beam origin and a diffraction spot indicating a crystal plane and positioned in a direction other than the thickness direction as viewed from the beam origin in the diffraction image of the antiferromagnetic layer 4 deviates from a second virtual line connecting the beam origin and a diffraction spot having the same indices as the diffraction image of the antiferromagnetic layer 4 in the diffraction image of the pinned magnetic layer 3. Alternatively, a diffraction spot indicating a crystal plane and positioned in a direction other than the thickness direction as viewed from the beam origin is observed only in the diffraction image of one of the antiferromagnetic layer 4 and the ferromagnetic layer.

In this case, the diffraction spots positioned in the thickness direction preferably indicate the equivalent crystal planes represented by the {111} plane.

In a transmission electron beam diffraction image of each of the antiferromagnetic layer 4 and the pinned magnetic layer 3 of the spin valve thin film element shown in FIG. 3, obtained by applying an electron beam from the direction perpendicular to the interface, a diffraction spot corresponding to a reciprocal lattice point which indicates each crystal plane is observed in each of the layers. In these images, a virtual line connecting the beam origin and a diffraction spot in the diffraction image of the antiferromagnetic layer 4 deviates from a virtual line connecting the beam origin and a diffraction spot having the same indices as the antiferromagnetic layer 4 in the diffraction image of the pinned magnetic layer 3. Alternatively, a diffraction spot having indices among the diffraction spots is observed only in the diffraction image of one of the antiferromagnetic layer 4 and the ferromagnetic layer.

In this case, the direction perpendicular to the interface is preferably the direction of the crystal orientations represented by <111> orientation, or the crystal planes parallel to the interface between the antiferromagnetic layer and the ferromagnetic layer are preferably equivalent crystal planes represented by the {111} plane.

In the present invention, when the above-described transmission electron beam diffraction images are obtained, it is supposed that the same equivalent crystal planes of the antiferromagnetic layer 4 and the pinned magnetic layer 3 are preferentially oriented in parallel with the film plane, and at least some of the same equivalent crystal axes present in the crystal planes are oriented in different directions in the antiferromagnetic layer 4 and the pinned magnetic layer 3. With the spin valve film exhibiting the above transmission electron beam diffraction images, the antiferromagnetic layer 4 is appropriately transformed to the ordered lattice by heat treatment, thereby obtaining a larger exchange coupling magnetic field than a conventional film.

In the spin valve thin film element shown in FIG. 3, the composition ratio of the element X or elements X+X' which constitute the antiferromagnetic layer 4 is preferably set to 45 to 60 at %. With this component ratio, an exchange coupling magnetic field of $1.58 \times 10^4$ (A/m) or more can be obtained.

In the present invention, the composition ratio of the element X or elements X+X' is more preferably set to 49 to 56.5 at %. With this component ratio, an exchange coupling magnetic field of $7.9 \times 10^4$ (A/m) or more can be obtained.

Referring to FIG. 3, exchange bias layers (antiferromagnetic layers) 16 are further formed on the free magnetic layer 1 with a space corresponding to a track width Tw in the track width direction (the X direction shown in the drawing).

Each of the exchange bias layers 16 is made of a X—Mn alloy (wherein X is at least one element of Pt, Pd, Ir, Rh, Ru, and Os), and preferably a PtMn alloy or X—Mn—X' alloy (wherein X' is at least one element of Ne, Ar, Kr, Xe, Be, B, C, N, Mg, Al, Si, P, Ti, V, Cr, Fe, Co, Ni, Cu, Zn, Ga, Ge, Zr, Nb, Mo, Ag, Cd, Ir, Sn, Hf, Ta, W, Re, Au, Pb, and the rare earth elements).

In the present invention, in the exchange bias layers 16 and the free magnetic layer 1, the same equivalent crystal planes are preferentially oriented in parallel with the film plane, and at least some of the same equivalent crystal axes present in the crystal planes are oriented in different directions in the exchange bias layers 16 and the free magnetic layer 1.

In a section of each of the exchange bias layers 16 and the free magnetic layer 1 taken along the direction (the Z direction shown in the drawing) parallel to the thickness direction, the crystal grain boundaries in the exchange bias layers 16 and the crystal grain boundaries in the free magnetic layer 1 are discontinuous in at least a portion of the interface.

Therefore, at least a portion of the interface holds the incoherent state, and the exchange bias layers 16 are appropriately transformed to the ordered lattice by heat treatment, thereby producing a large exchange coupling magnetic field.

In the exchange bias layers 16 and the free magnetic layer 1, the equivalent crystal planes represented by the {111} plane are preferably preferentially oriented in parallel with the film plane. In addition, in the crystal planes, the equivalent crystal orientations represented by <110> orientation are preferably in different directions in the exchange bias layers 16 and the free magnetic layer 1.

In the present invention, the equivalent crystal planes represented by the {111} plane of the exchange bias layers 16 and the free magnetic layer 1 are preferably preferentially oriented in parallel with the film plane, and a twin crystal is formed in at least a portion of the exchange bias layers 16 so that the twin boundaries of the twin crystal are nonparallel to the interface. Therefore, the exchange bias layers 16 can be appropriately transformed from the disordered lattice to the ordered lattice, thereby producing a large exchange coupling magnetic field. The inner angle between each of the twin boundaries and the interface is preferably 68° to 76°.

In a transmission electron beam diffraction image of each of the exchange bias layers 16 and the free magnetic layer 1 of the spin valve thin film element shown in FIG. 3, obtained by applying an electron beam in the direction parallel to the interface, a diffraction spot corresponding to a reciprocal lattice point which indicates each crystal plane is observed in each of the layers. In these images, a first virtual line connecting the beam origin and a diffraction spot indicating a crystal plane and positioned in the thickness direction as viewed from the beam origin in the diffraction image of the exchange bias layers 16 coincides with a first virtual line connecting the beam origin and a diffraction spot having the same indices as the exchange bias layers 16 in the diffraction image of the free magnetic layer 1.

Furthermore, in the diffraction images, a second virtual line connecting the beam origin and a diffraction spot indicating a crystal plane and positioned in a direction other than the thickness direction as viewed from the beam origin in the diffraction image of the exchange bias layers 16 deviates from a second virtual line connecting the beam origin and a diffraction spot having the same indices as the diffraction image of the exchange bias layers 16 in the diffraction image of the free magnetic layer 1. Alternatively, a diffraction spot indicating a crystal plane and positioned in a direction other than the thickness direction as viewed from the beam origin is observed only in the diffraction image of one of the exchange bias layers 16 and the ferromagnetic layer.

In this case, the diffraction spots positioned in the thickness direction preferably indicate the equivalent crystal planes represented by the {111} plane.

In a transmission electron beam diffraction image of each of the exchange bias layers 16 and the free magnetic layer 1 of the spin valve thin film element shown in FIG. 3, obtained by applying an electron beam from the direction perpendicular to the interface, a diffraction spot corresponding to a reciprocal lattice point which indicates each crystal plane is observed in each of the layers. In these images, a virtual line connecting the beam origin and a diffraction spot in the diffraction image of the exchange bias layers 16 deviates from a virtual line connecting the beam origin and a diffraction spot having the same indices as the exchange bias layers 16 in the diffraction image of the free magnetic layer 1. Alternatively, a diffraction spot having indices among the diffraction spots is observed only in the diffraction image of one of the antiferromagnetic layer and the ferromagnetic layer.

In this case, the direction perpendicular to the interface is preferably the direction of the equivalent crystal orientations represented by <111> direction, or the crystal planes parallel to the interface between the antiferromagnetic layer and the ferromagnetic layer are preferably the equivalent crystal planes represented by the {111} plane.

In the spin valve thin film element having the above-described transmission electron beam diffraction images, it is supposed that the same equivalent crystal planes of the exchange bias layers 16 and the free magnetic layer 1 are preferentially oriented in parallel with the film plane, and at least some of the same equivalent crystal axes present in the crystal planes are oriented in different directions in the exchange bias layers 16 and the free magnetic layer 1. With the spin valve film exhibiting the above transmission electron beam diffraction images, the exchange bias layers 16 are appropriately transformed to the ordered lattice by heat treatment, thereby obtaining a larger exchange coupling magnetic field than a conventional film.

The free magnetic layer 1 is put into a single domain state in the X direction shown in the drawing by exchange coupling magnetic fields between the free magnetic layer 1 and the exchange bias layers 16 at both sides of the free magnetic layer 1. Therefore, magnetization of the track width Tw region of the free magnetic layer 1 is oriented in the X direction shown in the drawing to an extent depending upon an external magnetic field.

In the thus-formed single spin valve magnetoresistive element, magnetization of the track width Tw region of the free magnetic layer 1 is changed from the X direction to the Y direction by the external magnetic field in the Y direction. The electric resistance changes based on the change in the magnetization direction of the free magnetic layer 1 and the relation to the pinned magnetization direction (the Y direction) of the pinned magnetic layer 3 so that a leakage magnetic field from a recording medium is detected by a voltage change based on the change in the electric resistance.

Figure 4:
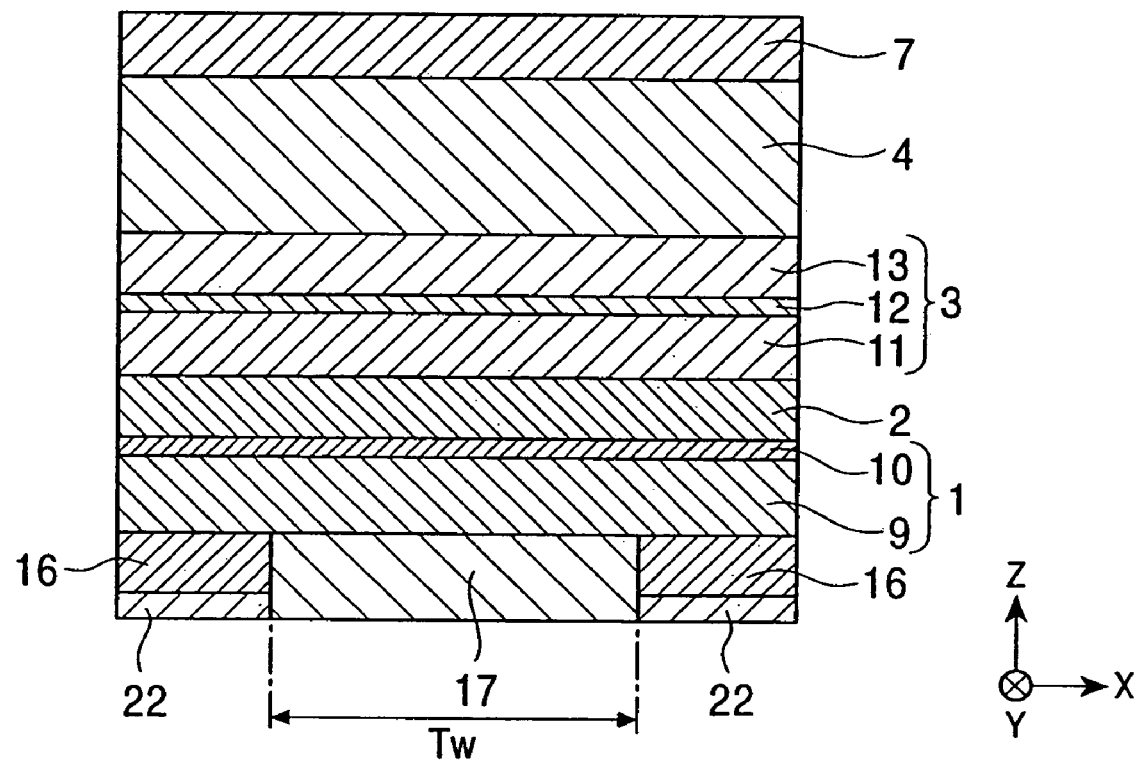
FIG. 4 is a sectional view of the structure of a single spin valve magnetoresistive element in accordance with a fourth embodiment of the present invention, as viewed from the ABS side.

FIG. 4 is a partial sectional view showing the structure of a spin valve thin film element according to a still further embodiment of the present invention.

In the spin valve thin film element shown in FIG. 4, a pair of seed layers 22 is formed with a space corresponding to the track width Tw in the track width direction (the X direction shown in the drawing), and exchange bias layers 16 are respectively formed on the seed layers 22.

The space between a pair of the seed layers 22 and the exchange bias layers 16 is filled with an insulating layer 17 made of an insulating material such as $SiO_2$, $Al_2O_3$ or the like.

A free magnetic layer 1 is formed on the exchange bias layers 16 and the insulating layer 17.

Each of the exchange bias layers 16 is preferably made of a X—Mn alloy or X—Mn—X' alloy wherein the composition ratio of the element X or X+X' is preferably 45 to 60 at %, and more preferably 49 to 56.5 at %.

The exchange bias layers 16 are appropriately transformed to the ordered lattice by heat treatment without being restrained by the crystal structure of the free magnetic layer 1, thereby producing a larger exchange coupling magnetic field than a conventional element.

In the present invention, in the exchange bias layers 16 and the free magnetic layer 1 after heat treatment, the same equivalent crystal planes are preferentially oriented in parallel with the film plane, and at least some of the same equivalent crystal axes present in the crystal planes are oriented in different directions in the exchange bias layers 16 and the free magnetic layer 1.

In a section of each of the exchange bias layers 16 and the free magnetic layer 1 taken along the direction (the Z direction shown in the drawing) parallel to the thickness direction, the crystal grain boundaries in the exchange bias layers 16 and the crystal grain boundaries in the free magnetic layer 1 are discontinuous in at least a portion of the interface.

Therefore, at least a portion of the interface holds the incoherent state, and the exchange bias layers 16 are appropriately transformed to the ordered lattice by heat treatment, thereby producing a large exchange coupling magnetic field.

In the exchange bias layers 16 and the free magnetic layer 1, the equivalent crystal planes represented by the {111} plane are preferably preferentially oriented in parallel with the film plane. In addition, in the crystal planes, the equivalent crystal orientations represented by <110> orientation are preferably in different directions in the exchange bias layers 16 and the free magnetic layer 1.

In the present invention, the equivalent crystal planes represented by the {111} plane of the exchange bias layers 16 and the free magnetic layer 1 are preferably preferentially oriented in parallel with the film plane, and a twin crystal is formed in at least a portion of the exchange bias layers 16 so that the twin boundaries of the twin crystal are nonparallel to the interface. Therefore, the exchange bias layers 16 can be appropriately transformed from the disordered lattice to the ordered lattice, thereby producing a large exchange coupling magnetic field. The inner angle between each of the twin boundaries and the interface is preferably 68° to 76°.

In a transmission electron beam diffraction image of each of the exchange bias layers 16 and the free magnetic layer 1 of the spin valve thin film element shown in FIG. 4, obtained by applying an electron beam in the direction parallel to the interface, a diffraction spot corresponding to a reciprocal lattice point which indicates each crystal plane is observed in each of the layers. In these images, a first virtual line connecting the beam origin and a diffraction spot indicating a crystal plane and positioned in the thickness direction as viewed from the beam origin in the diffraction image of the exchange bias layers 16 coincides with a first virtual line connecting the beam origin and a diffraction spot having the same indices as the exchange bias layers 16 in the diffraction image of the free magnetic layer 1.

Furthermore, in the diffraction images, a second virtual line connecting the beam origin and a diffraction spot indicating a crystal plane and positioned in a direction other than the thickness direction as viewed from the beam origin in the diffraction image of the exchange bias layers 16 deviates from a second virtual line connecting the beam origin and a diffraction spot having the same indices as the exchange bias layers 16 in the diffraction image of the free magnetic layer 1. Alternatively, a diffraction spot indicating a crystal plane and positioned in a direction other than the thickness direction as viewed from the beam origin is observed only in the diffraction image of one of the exchange bias layers 16 and the ferromagnetic layer.

In this case, the diffraction spots positioned in the thickness direction preferably indicate the equivalent crystal planes represented by the {111} plane.

In a transmission electron beam diffraction image of each of the exchange bias layers 16 and the free magnetic layer 1 of the spin valve thin film element shown in FIG. 4, obtained by applying an electron beam from the direction perpendicular to the interface, a diffraction spot corresponding to a reciprocal lattice point which indicates each crystal plane is observed in each of the layers. In these images, a virtual line connecting the beam origin and a diffraction spot in the diffraction image of the exchange bias layers 16 deviates from a virtual line connecting the beam origin and a diffraction spot having the same indices as the exchange bias layers 16 in the diffraction image of the free magnetic layer 1. Alternatively, a diffraction spot having indices among the diffraction spots is observed only in the diffraction image of one of the antiferromagnetic layer and the ferromagnetic layer.

In this case, the direction perpendicular to the interface is preferably the direction of the equivalent crystal orientations represented by the <111> direction, or the crystal planes parallel to the interface between the antiferromagnetic layer and the ferromagnetic layer are preferably the equivalent crystal planes represented by the {111} plane.

When the above-described transmission electron beam diffraction images are obtained, it is supposed that the same equivalent crystal planes of the exchange bias layers 16 and the free magnetic layer 1 are preferentially oriented in parallel with the film plane, and at least some of the same equivalent crystal axes present in the crystal planes are oriented in different directions in the exchange bias layers 16 and the free magnetic layer 1. With the spin valve film exhibiting the above transmission electron beam diffraction images, the exchange bias layers 16 are appropriately transformed to the ordered lattice by heat treatment, thereby obtaining a larger exchange coupling magnetic field than a conventional element.

The free magnetic layer 1 is put into a single domain state in the X direction shown in the drawing by exchange coupling magnetic fields between the free magnetic layer 1 and the exchange bias layers 16 at both sides of the free magnetic layer 1. Therefore, magnetization of the track width Tw region of the free magnetic layer 1 is oriented in the X direction shown in the drawing to an extent depending upon an external magnetic field.

Referring to FIG. 4, a nonmagnetic intermediate layer 2 is formed on the free magnetic layer 1, and a pinned magnetic layer 3 is further formed on the nonmagnetic intermediate layer 2. Furthermore, an antiferromagnetic layer 4 is formed on the pinned magnetic layer 3.

In the present invention, after heat treatment, the same equivalent crystal planes of the antiferromagnetic layer 4 and the pinned magnetic layer 3 are preferentially oriented in parallel with the film plane, and at least some of the same equivalent crystal axes present in the crystal planes are oriented in different directions in the antiferromagnetic layer 4 and the pinned magnetic layer 3.

In a section of each of the antiferromagnetic layer 4 and the pinned magnetic layer 3 taken along the direction (the Z direction shown in the drawing) parallel to the thickness direction, the crystal grain boundaries in the antiferromagnetic layer 4 and the crystal grain boundaries in the pinned magnetic layer 3 are discontinuous in at least a portion of the interface.

Therefore, at least a portion of the interface holds the incoherent state, and the antiferromagnetic layer 4 is appropriately transformed to the ordered lattice by heat treatment, thereby producing a large exchange coupling magnetic field.

In the antiferromagnetic layer 4 and the pinned magnetic layer 3, the equivalent crystal planes represented by the {111} plane are preferably preferentially oriented in parallel with the film plane. In addition, in the crystal planes, the equivalent crystal orientations represented by <110> orientation are preferably in different directions in the antiferromagnetic layer 4 and the pinned magnetic layer 3.

In the present invention, the equivalent crystal plane represented by the {111} plane of the antiferromagnetic layer 4 is preferably preferentially oriented in parallel with the film plane, and a twin crystal is formed in at least a portion of the antiferromagnetic layer 4 so that the twin boundaries of the twin crystal are nonparallel to the interface. Therefore, the rate of change in resistance can be increased, and the antiferromagnetic layer 4 can be appropriately transformed from the disordered lattice to the ordered lattice, thereby producing a large exchange coupling magnetic field. The inner angle between each of the twin boundaries and the interface is preferably 68° to 76°.

In a transmission electron beam diffraction image of each of the antiferromagnetic layer 4 and the pinned magnetic layer 3 of the spin valve thin film element shown in FIG. 4, obtained by applying an electron beam in the direction parallel to the interface, a diffraction spot corresponding to a reciprocal lattice point which indicates each crystal plane is observed in each of the layers. In these images, a first virtual line connecting the beam origin and a diffraction spot indicating a crystal plane and positioned in the thickness direction as viewed from the beam origin in the diffraction image of the antiferromagnetic layer 4 coincides with a first virtual line connecting the beam origin and a diffraction spot having the same indices as the antiferromagnetic layer 4 in the diffraction image of the pinned magnetic layer 3.

Furthermore, in the diffraction images, a second virtual line connecting the beam origin and a diffraction spot indicating a crystal plane and positioned in a direction other than the thickness direction as viewed from the beam origin in the diffraction image of the antiferromagnetic layer 4 deviates from a second virtual line connecting the beam origin and a diffraction spot having the same indices as the antiferromagnetic layer 4 in the diffraction image of the pinned magnetic layer 3. Alternatively, a diffraction spot indicating a crystal plane and positioned in a direction other than the thickness direction as viewed from the beam origin is observed only in the diffraction image of one of the antiferromagnetic layer and the ferromagnetic layer.

In this case, the diffraction spots positioned in the thickness direction preferably indicate the equivalent crystal planes represented by the {111} plane.

In a transmission electron beam diffraction image of each of the antiferromagnetic layer 4 and the pinned magnetic layer 3 of the spin valve thin film element shown in FIG. 4, obtained by applying an electron beam from the direction perpendicular to the interface, a diffraction spot corresponding to a reciprocal lattice point which indicates each crystal plane is observed in each of the layers. In these images, a virtual line connecting the beam origin and a diffraction spot in the diffraction image of the antiferromagnetic layer 4 deviates from a virtual line connecting the beam origin and a diffraction spot having the same indices as the antiferromagnetic layer 4 in the diffraction image of the pinned magnetic layer 3. Alternatively, a diffraction spot having indices among the diffraction spots is observed only in the diffraction image of one of the antiferromagnetic layer and the ferromagnetic layer.

In this case, the direction perpendicular to the interface is preferably the direction of the equivalent crystal orientations represented by the <111> direction, or the crystal planes parallel to the interface between the antiferromagnetic layer and the ferromagnetic layer are preferably the equivalent crystal planes represented by the {111} plane.

When the above-described transmission electron beam diffraction images are obtained, it is supposed that the same equivalent crystal planes of the antiferromagnetic layer 4 and the pinned magnetic layer 3 are preferentially oriented in parallel with the film plane, and at least some of the same equivalent crystal axes present in the crystal planes are oriented in different directions in the antiferromagnetic layer 4 and the pinned magnetic layer 3. With the spin valve film exhibiting the above transmission electron beam diffraction images, the antiferromagnetic layer 4 is appropriately transformed to the ordered lattice by heat treatment, thereby obtaining a larger exchange coupling magnetic field than a conventional element.

Figure 5:
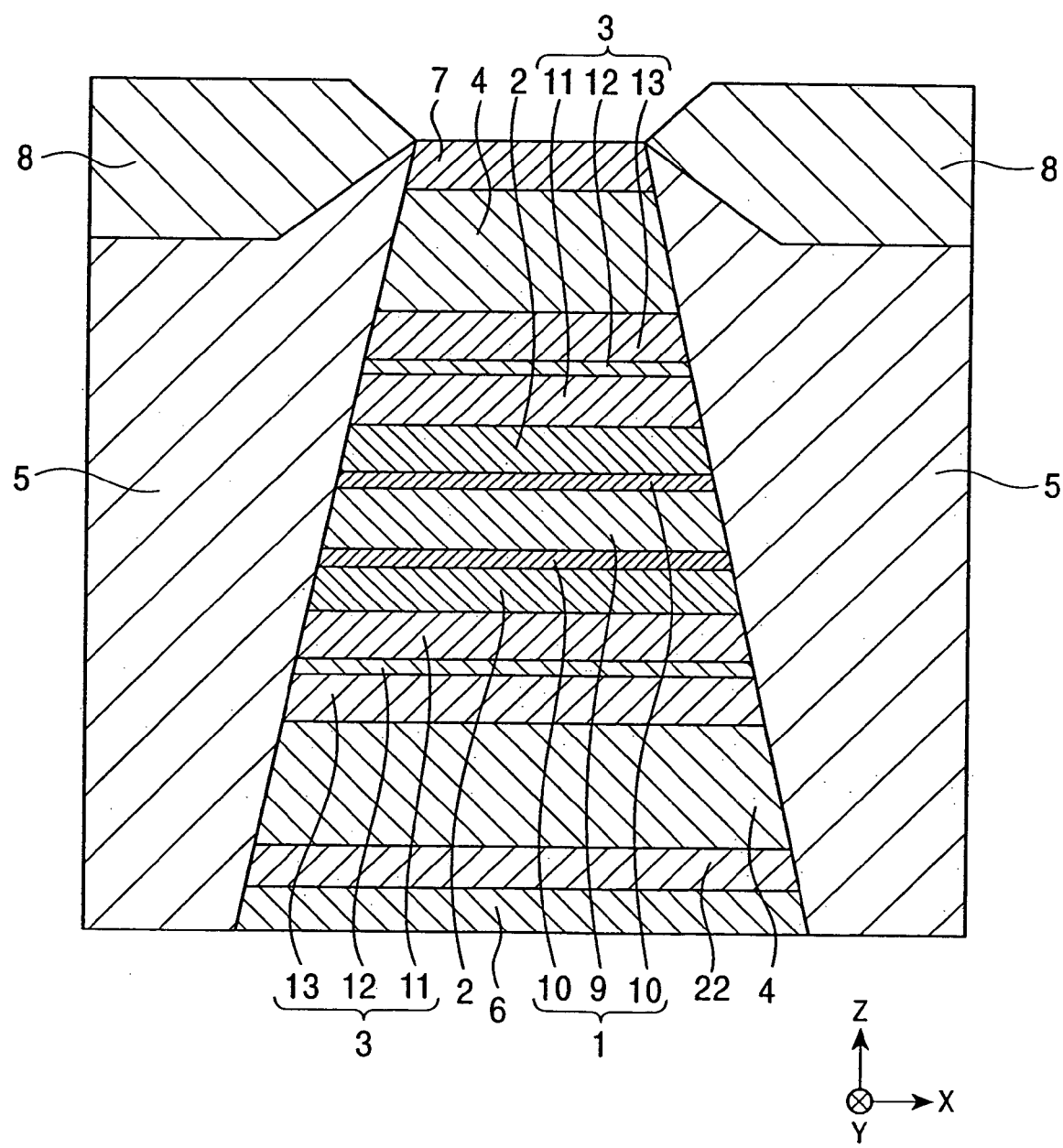
FIG. 5 is a sectional view of the structure of a dual spin valve magnetoresistive element in accordance with a fifth embodiment of the present invention, as viewed from the ABS side.

FIG. 5 is a partial sectional view showing the structure of a dual spin valve thin film element according to the present invention.

Referring to FIG. 5, an underlying layer 6, a seed layer 22, an antiferromagnetic layer 4, a pinned magnetic layer 3, a nonmagnetic intermediate layer 2, and a free magnetic layer 1 are continuously laminated. The free magnetic layer 1 comprises a tree-layer film comprising, for example, Co films 10 and a NiFe alloy film 9. Furthermore, a nonmagnetic intermediate layer 2, a pinned magnetic layer 3, an antiferromagnetic layer 4 and a protecting layer 7 are continuously laminated on the free magnetic layer 1.

Furthermore, hard bias layers 5 and conductive layers 8 are formed on both sides of the laminated film ranging from the underlying layer 6 to the protecting layer 7.

In this embodiment, the seed layer 22 is formed below the antiferromagnetic layer 4 located below the free magnetic layer 1 shown in the drawing. The composition ratio of the element X or elements X+X' which constitute the antiferromagnetic layer 4 is preferably 45 to 60 at %, and more preferably 49 to 56.5 at %.

In the present invention, after heat treatment, the same equivalent crystal planes of the antiferromagnetic layer 4 and the pinned magnetic layer 3 are preferentially oriented in parallel with the film plane, and at least some of the same equivalent crystal axes present in the crystal planes are oriented in different directions in the antiferromagnetic layer 4 and the pinned magnetic layer 3.

In a section of each of the antiferromagnetic layer 4 and the pinned magnetic layer 3 taken along the direction (the Z direction shown in the drawing) parallel to the thickness direction, the crystal grain boundaries in the antiferromagnetic layer 4 and the crystal grain boundaries in the pinned magnetic layer 3 are discontinuous in at least a portion of the interface.

Therefore, at least a portion of the interface holds the incoherent state, and the antiferromagnetic layer 4 is appropriately transformed to the ordered lattice by heat treatment, thereby producing a large exchange coupling magnetic field.

In the antiferromagnetic layer 4 and the pinned magnetic layer 3, the equivalent crystal planes represented by the {111} plane are preferably preferentially oriented in parallel with the film plane. In addition, in the crystal planes, the equivalent crystal orientations represented by <110> orientation are preferably in different directions in the antiferromagnetic layer 4 and the pinned magnetic layer 3.

In the antiferromagnetic layer 4, the equivalent crystal plane represented by the {111} plane is preferentially oriented in parallel with the film plane, and a twin crystal is formed in at least a portion of the antiferromagnetic layer 4 so that the twin boundaries of the twin crystal are partially nonparallel to the interface. As a result, the rate of change in resistance can be improved, and the antiferromagnetic layer 4 is appropriately transformed from the disordered lattice to the ordered lattice to obtain a large exchange coupling magnetic field. The inner angle between each of the twin boundaries and the interface is preferably 68° to 76°.

In the dual spin valve thin film element shown in FIG. 5, not only the pined magnetic layer 3 and the antiferromagnetic layer 4 formed below the free magnetic layer 1, but also the entire laminated film have the same crystal orientations as described above.

Namely, in the antiferromagnetic layer 4 and the pinned magnetic layer 3 formed above the free magnetic layer 1, the same equivalent crystal planes are preferentially oriented in parallel with the film plane, and at least some of the same equivalent crystal axes present in the crystal planes are oriented in different directions in the antiferromagnetic layer 4 and the pinned magnetic layer 3.

In a section of each of the antiferromagnetic layer 4 and the pinned magnetic layer 3 taken along the direction (the Z direction shown in the drawing) parallel to the thickness direction, the crystal grain boundaries in the antiferromagnetic layer 4 and the crystal grain boundaries in the pinned magnetic layer 3 are discontinuous in at least a portion of the interface.

Therefore, at least a portion of the interface holds the incoherent state, and the antiferromagnetic layer 4 is appropriately transformed to the ordered lattice by heat treatment, thereby producing a large exchange coupling magnetic field.

In the antiferromagnetic layer 4 and the pinned magnetic layer 3, the equivalent crystal planes represented by the {111} plane are preferably preferentially oriented in parallel with the film plane. In addition, in the crystal planes, the equivalent crystal orientations represented by <110> orientation are preferably in different directions in the antiferromagnetic layer 4 and the pinned magnetic layer 3.

In the antiferromagnetic layer 4, the equivalent crystal plane represented by the {111} plane is preferentially oriented in parallel with the film plane, and a twin crystal is formed in at least a portion of the antiferromagnetic layer 4 so that the twin boundaries of the twin crystal are partially nonparallel to the interface. As a result, the rate of change in resistance can be improved, and the antiferromagnetic layer 4 is appropriately transformed from the disordered lattice to the ordered lattice to obtain a large exchange coupling magnetic field. The inner angle between each of the twin boundaries and the interface is preferably 68° to 76°.

In a transmission electron beam diffraction image of each of the antiferromagnetic layer 4 and the pinned magnetic layer 3 of the spin valve thin film element shown in FIG. 5, obtained by applying an electron beam in the direction parallel to the interface, a diffraction spot corresponding to a reciprocal lattice point which indicates each crystal plane is observed in each of the layers. In these images, a first virtual line connecting the beam origin and a diffraction spot indicating a crystal plane and positioned in the thickness direction as viewed from the beam origin in the diffraction image of the antiferromagnetic layer 4 coincides with a first virtual line connecting the beam origin and a diffraction spot having the same indices as the antiferromagnetic layer 4 in the diffraction image of the pinned magnetic layer 3.

Furthermore, in the diffraction images, a second virtual line connecting the beam origin and a diffraction spot indicating a crystal plane and positioned in a direction other than the thickness direction as viewed from the beam origin in the diffraction image of the antiferromagnetic layer 4 deviates from a second virtual line connecting the beam origin and a diffraction spot having the same indices as the antiferromagnetic layer 4 in the diffraction image of the pinned magnetic layer 3. Alternatively, a diffraction spot indicating a crystal plane and positioned in a direction other than the thickness direction as viewed from the beam origin is observed only in the diffraction image of one of the antiferromagnetic layer 4 and the ferromagnetic layer.

In this case, the diffraction spots positioned in the thickness direction preferably indicate the equivalent crystal planes represented by the {111} plane.

In a transmission electron beam diffraction image of each of the antiferromagnetic layer 4 and the pinned magnetic layer 3 of the spin valve thin film element shown in FIG. 5, obtained by applying an electron beam from the direction perpendicular to the interface, a diffraction spot corresponding to a reciprocal lattice point which indicates each crystal plane is observed in each of the layers. In these images, a virtual line connecting the beam origin and a diffraction spot in the diffraction image of the antiferromagnetic layer 4 deviates from a virtual line connecting the beam origin and a diffraction spot having the same indices ass the antiferromagnetic layer 4 in the diffraction image of the pinned magnetic layer 3. Alternatively, a diffraction spot having indices among the diffraction spots is observed only in the diffraction image of one of the antiferromagnetic layer 4 and the ferromagnetic layer.

In this case, the direction perpendicular to the interface is preferably the direction of the equivalent crystal orientations represented by the <111> direction, or the crystal planes parallel to the interface between the antiferromagnetic layer and the ferromagnetic layer are preferably the equivalent crystal planes represented by the {111} plane.

In the present invention, when the above-described transmission electron beam diffraction images are obtained, it is supposed that the same equivalent crystal planes of the antiferromagnetic layer 4 and the pinned magnetic layer 3 are preferentially oriented in parallel with the film plane, and at least some of the same equivalent crystal axes present in the crystal planes are oriented in different directions in the antiferromagnetic layer 4 and the pinned magnetic layer 3. With the spin valve film exhibiting the above transmission electron beam diffraction images, the antiferromagnetic layer 4 is appropriately transformed to the ordered lattice by heat treatment, thereby obtaining a larger exchange coupling magnetic field than a conventional element.

Figure 6:
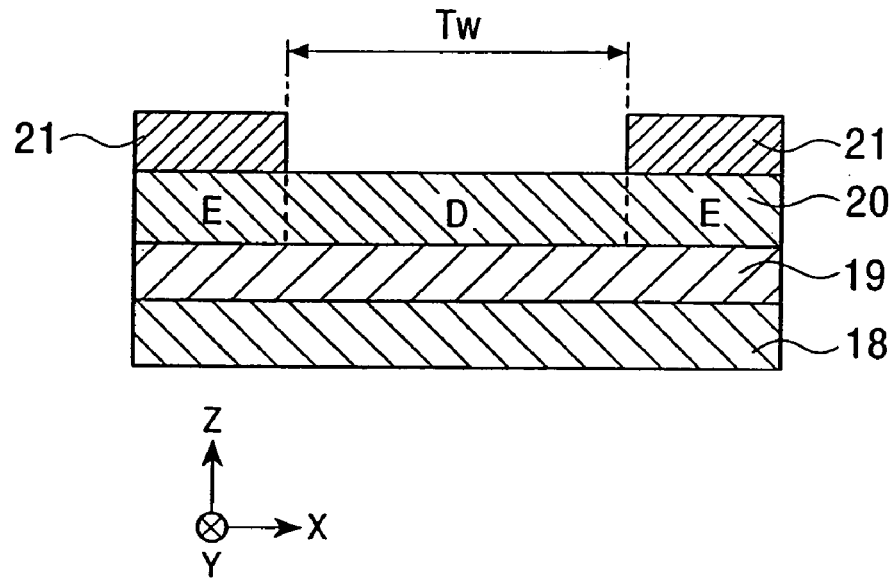
FIG. 6 is a sectional view of the structure of an AMR magnetoresistive element in accordance with a sixth embodiment of the present invention, as viewed from the ABS side.
Figure 7:
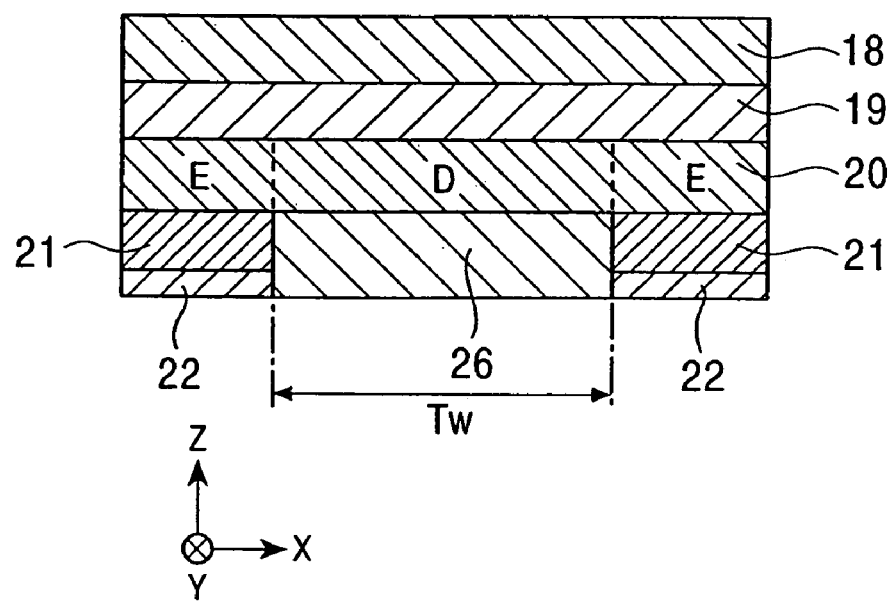
FIG. 7 is a sectional view of the structure of an AMR magnetoresistive element in accordance with a seventh embodiment of the present invention, as viewed from the ABS side.

FIGS. 6 and 7 are sectional views each showing the structure of an AMR magnetoresistive element according to the present invention.

Referring to FIG. 6, a soft magnetic layer (SAL layer) 18, a nonmagnetic layer (SHUNT layer) 19, and a magnetoresistive layer (MR layer) 20 are continuously laminated in turn from the bottom.

For example, the soft magnetic layer 18 comprises a Fe—Ni—Nb alloy, the nonmagnetic layer 19 comprises a Ta film, and the magnetoresistive layer 20 comprises a NiFe alloy.

Furthermore, exchange bias layers (antiferromagnetic layers) 21 are formed on the magnetoresistive layer 20 with a space corresponding to the track width Tw in the track width direction (the X direction). Although conductive layers are not shown, the conductive layers are formed, for example, on the exchange bias layers 21.

Referring to FIG. 7, a pair of seed layers 22 are formed with a space corresponding to the track width Tw in the track width direction (the X direction shown in the drawing). Exchange bias layers 21 are formed on the seed layers 22, and the space between the seed layers 22 and the exchange bias layers 21 is filled with an insulating layer 26 made of an insulating material such as $SiO_2$, $Al_2O_3$, or the like.

Furthermore, a magnetoresistive layer (MR layer) 20, a nonmagnetic layer (SHUNT layer) 19 and a soft magnetic layer (SAL layer) are laminated on the exchange bias layers 21 and the insulating layer 26.

In the exchange bias layers 21 and the magnetoresistive layer 20 shown in each of FIGS. 6 and 7, the same equivalent crystal planes are preferentially oriented in parallel with the film plane, and at least some of the same equivalent crystal axes present in the crystal planes are oriented in different directions in the exchange bias layers and the magnetoresistive layer 20.

In a section of each of the exchange bias layers 21 and the magnetoresistive layer 20 taken along the direction (the Z direction shown in the drawing) parallel to the thickness direction, the crystal grain boundaries in the exchange bias layers 21 and the crystal grain boundaries in the magnetoresistive layer 20 are discontinuous in at least a portion of the interface.

Therefore, at least a portion of the interface holds the incoherent state, and the exchange bias layers 21 are appropriately transformed to the ordered lattice by heat treatment, thereby producing a large exchange coupling magnetic field.

In the exchange bias layers 21 and the magnetoresistive layer 20, the equivalent crystal planes represented by the {111} plane are preferably preferentially oriented in parallel with the film plane. In addition, in the crystal planes, the equivalent crystal orientations represented by <110> orientation are preferably in different directions in the exchange bias layers 21 and the magnetoresistive layer 20.

In the present invention, the equivalent crystal planes represented by the {111} plane of the exchange bias layers 21 are preferably preferentially oriented in parallel with the film plane, and a twin crystal is formed in at least a portion of the exchange bias layers 21 so that the twin boundaries of the twin crystal are nonparallel to the interface. Therefore, the exchange bias layers 21 can be appropriately transformed from the disordered lattice to the ordered lattice, thereby producing a high exchange coupling magnetic field. The inner angle between each of the twin boundaries and the interface is preferably 68° to 76°.

In a transmission electron beam diffraction image of each of the exchange bias layers 21 and the magnetoresistive layer 20 of the AMR thin film element shown in each of FIGS. 6 and 7, obtained by applying an electron beam in the direction parallel to the interface, a diffraction spot corresponding to a reciprocal lattice point which indicates each crystal plane is observed in each of the layers. In these images, a first virtual line connecting the beam origin and a diffraction spot indicating a crystal plane and positioned in the thickness direction as viewed from the beam origin in the diffraction image of the exchange bias layers 21 coincides with a first virtual line connecting the beam origin and a diffraction spot having the same indices as the exchange bias layers 21 in the diffraction image of the magnetoresistive layer 20.

Furthermore, in the diffraction images, a second virtual line connecting the beam origin and a diffraction spot indicating a crystal plane and positioned in a direction other than the thickness direction as viewed from the beam origin in the diffraction image of the exchange bias layers 21 deviates from a second virtual line connecting the beam origin and a diffraction spot having the same indices as the exchange bias layers 21 in the diffraction image of the magnetoresistive layer 20. Alternatively, a diffraction spot indicating a crystal plane and positioned in a direction other than the thickness direction as viewed from the beam origin is observed only in the diffraction image of one of the antiferromagnetic layer and the ferromagnetic layer.

In this case, the diffraction spots positioned in the thickness direction preferably indicate the equivalent crystal planes represented by the {111} plane.

In a transmission electron beam diffraction image of each of the exchange bias layers 21 and the magnetoresistive layer 20 of the AMR thin film element shown in each of FIGS. 6 and 7, obtained by applying an electron beam from the direction perpendicular to the interface, a diffraction spot corresponding to a reciprocal lattice point which indicates each crystal plane is observed in each of the layers. In these images, a virtual line connecting the beam origin and a diffraction spot in the diffraction image of the exchange bias layers 21 deviates from a virtual line connecting the beam origin and a diffraction spot having the same indices as the exchange bias layers 21 in the diffraction image of the magnetoresistive layer 20. Alternatively, a diffraction spot having indices among the diffraction spots is observed only in the diffraction image of one of the antiferromagnetic layer and the ferromagnetic layer.

In this case, the direction perpendicular to the interface is preferably the direction of the equivalent crystal orientations represented by the <111> direction, or the crystal planes parallel to the interface between the antiferromagnetic layer and the ferromagnetic layer are preferably equivalent crystal planes represented by the {111} plane.

When the above-described transmission electron beam diffraction images are obtained, it is supposed that the same equivalent crystal planes of the exchange bias layers 21 and the magnetoresistive layer 20 are preferentially oriented in parallel with the film plane, and at least some of the same equivalent crystal axes present in the crystal planes are oriented in different directions in the exchange bias layers 21 and the magnetoresistive layer 20. With the spin valve film exhibiting the above transmission electron beam diffraction images, the exchange bias layers 21 are appropriately transformed to the ordered lattice by heat treatment, thereby obtaining a larger exchange coupling magnetic field than a conventional element.

In the AMR thin film element shown in each of FIGS. 6 and 7, E regions of the magnetoresistive layer 20 shown in each of FIGS. 6 and 7 are put into the single domain state in the X direction by the exchange coupling magnetic fields produced in the interfaces between the exchange bias layers 21 and the magnetoresistive layer 20. This induces magnetization orientation of the D region of the magnetoresistive layer 20 in the X direction. Also, a current magnetic field produced by a sensing current flowing through the magnetoresistive layer 20 is applied to the soft magnetic layer 18 in the Y direction, and a lateral bias magnetic field is applied to the D region of the magnetoresistive layer 20 in the Y direction due to the magnetostatic coupling energy produced by the soft magnetic layer 18. When the lateral bias magnetic field is applied to the D region of the magnetoresistive layer 20 put into the single domain state, a change in resistance (magnetoresistive effect property: H-R effect property) with a change in the magnetic field of the D region of the magnetoresistive layer 20 is set to a linear state.

When a recording medium is moved in the Z direction, and a leakage magnetic field from the recording medium is applied in the Y direction, the resistance value of the D region of the magnetoresistive layer 20 changes so that this change is detected as a voltage change.

The method of manufacturing each of the magnetoresistive elements shown in FIGS. 1 to 7 will be described below. Particularly, the antiferromagnetic layer 4 is preferably formed as follows.

As described above, the composition ratio of the element X or elements X+X' of the antiferromagnetic layer 4 is preferably 45 to 60 at %, and more preferably 49 to 56.5 at %. The experimental results described below indicate that with the composition ratio in this range, a large exchange coupling magnetic field can be obtained.

Therefore, a preferred manufacturing method comprises forming the antiferromagnetic layer 4 having the composition in the above range and the other layers in the deposition step, and then performing heat treatment.

In the present invention, at least parts of the interfaces between the antiferromagnetic layer 4 and the pinned magnetic layer 3, between the exchange bias layers 16 and the free magnetic layer 1, and between the exchange bias layers 21 and the magnetoresistive layer 20 are preferably in the incoherent state, and when the seed layer 22 is formed, at least parts of the interfaces between the seed layer 22 and the antiferromagnetic layer 4 and between the seed layer 22 and the exchange bias layers 16 or 21 are preferably in the incoherent state. The incoherent state is preferably maintained from the deposition step. This is possibly because when the interfaces are in the coherent state in the deposition step, the antiferromagnetic layer 4, etc. are less transformed to the ordered state even by heat treatment.

In order to bring the interface in the incoherent state in the deposition step, the antiferromagnetic layer 4, etc. are preferably formed by the following method.

Figure 8:
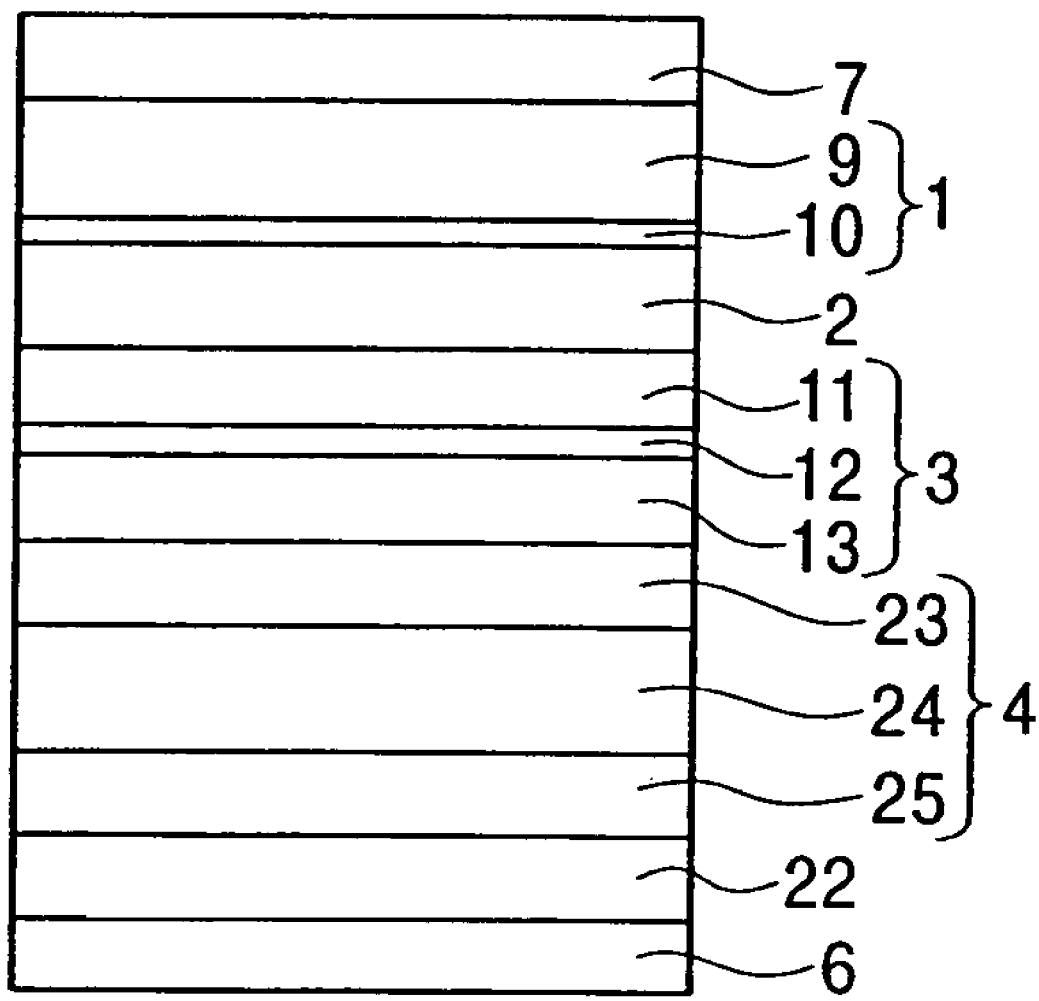
FIG. 8 is a schematic drawing showing the deposition state of the magnetoresistive element shown in FIG. 1.

FIG. 8 is a schematic drawing showing the state in which the layers of the laminated film shown in FIG. 1 are deposited. As shown in FIG. 8, the seed layer 22 is formed on the underlying layer 6, and then the antiferromagnetic layer 4 comprising a three-layer film is formed. Each of first, second and third antiferromagnetic layers 23, 24 and 25, which constitute the antiferromagnetic layer 4, is made of the X—Mn alloy or X—Mn—X' alloy.

In the deposition step, the composition ratio of the element X or elements X+X' which constitute the first and third antiferromagnetic layers 23 and 25 is set to be higher than that of the second antiferromagnetic layer 24.

The second antiferromagnetic layer 24 formed between the first and third antiferromagnetic layers 23 and 25 is made of an antiferromagnetic material having a composition close to an ideal composition for easily transforming the layer from the disordered lattice to the ordered lattice by heat treatment.

The reason for setting the composition ratio of the element X or elements X+X' of the first and third antiferromagnetic layers 23 and 25 to be higher than that of the second antiferromagnetic layer 24 is that in order to easily transform the antiferromagnetic layer 4 from the disordered lattice to the ordered lattice by heat treatment, the antiferromagnetic layer 4 must be prevented from being restrained by the crystal structure of the pinned magnetic layer 3 or the seed layer 22 at the interface.

The composition ratio of the element X or elements X+X' of the first and third antiferromagnetic layers 23 and 25 is preferably 53 to 65 at %, and more preferably 55 to 60 at %. Each of the first and third antiferromagnetic layers 23 and 25 preferably has a thickness of 3 Å to 30 Å. For example, in the case shown in FIG. 8, the first and third antiferromagnetic layers 23 and 25 are formed to a thickness of about 10 Å.

The composition ratio of the element X or elements X+X' of the second antiferromagnetic layer 24 is 44 to 57 at %, and preferably 46 to 55 at %. With the composition ratio of the element X or elements X+X' in this range, the second antiferromagnetic layer 24 is easily transformed from the disordered lattice to the ordered lattice by heat treatment. The second antiferromagnetic layer 24 preferably has a thickness of 70 Å or more. In the case shown in FIG. 8, the second antiferromagnetic layer 24 is formed to a thickness of about 100 Å.

Each of the antiferromagnetic layers 23, 24 and 25 is preferably formed by a sputtering process. In this process, the first and third antiferromagnetic layers 23 and 25 are preferably formed under lower sputtering gas pressure than that for the second antiferromagnetic layer 24. This can set the composition ratio of the element X or elements X+X' of the first and third antiferromagnetic layers 23 and 25 to be higher than that of the second antiferromagnetic layer 24.

When the antiferromagnetic layer 4 comprising a single layer film, not the three-layer film, is formed in the deposition step, the composition ratio of the element X or elements X+X' can be appropriately changed in the thickness direction.

When the antiferromagnetic layer 4 is formed by sputtering using an antiferromagnetic material containing the element X and Mn or a target composed of the elements X, X' and Mn, during deposition of the antiferromagnetic layer 4, the sputtering gas pressure is gradually increased as the distance from the seed layer 22 increases. After about a half of the antiferromagnetic layer 4 is deposited, the sputtering gas pressure is gradually decreased to deposit the remainder of the antiferromagnetic layer 4.

This method gradually decreases the composition ratio (atomic %) of the element X or elements X+X' from the interface with the seed layer 22 to the near center of the antiferromagnetic layer 4 in the thickness direction, and gradually increases the composition ratio (atomic %) from the near center to the interface with the pinned magnetic layer 3.

It is thus possible to form the antiferromagnetic layer 4 in which the composition ratio (atomic %) of the element X or elements X+X' is highest near the interfaces with the seed layer 22 and with the pinned magnetic layers 3, and lowest near the center of the layer in the thickness direction.

When the composition ratio of total component elements of the antiferromagnetic layer 4 is 100% near the interfaces with the pinned magnetic layer 3 and with the seed layer 22, the composition ratio of the element X or elements X+X' is preferably 53 to 65 at %, and more preferably 55 to 60 at %, near the interfaces.

Also, the composition ratio of the element X or elements X+X' is preferably 44 to 57 at %, and more preferably 46 to 55 at %, near the center of the antiferromagnetic layer 4 in the thickness direction thereof. The antiferromagnetic layer 4 is preferably formed to a thickness of 76 Å or more.

Figure 9:
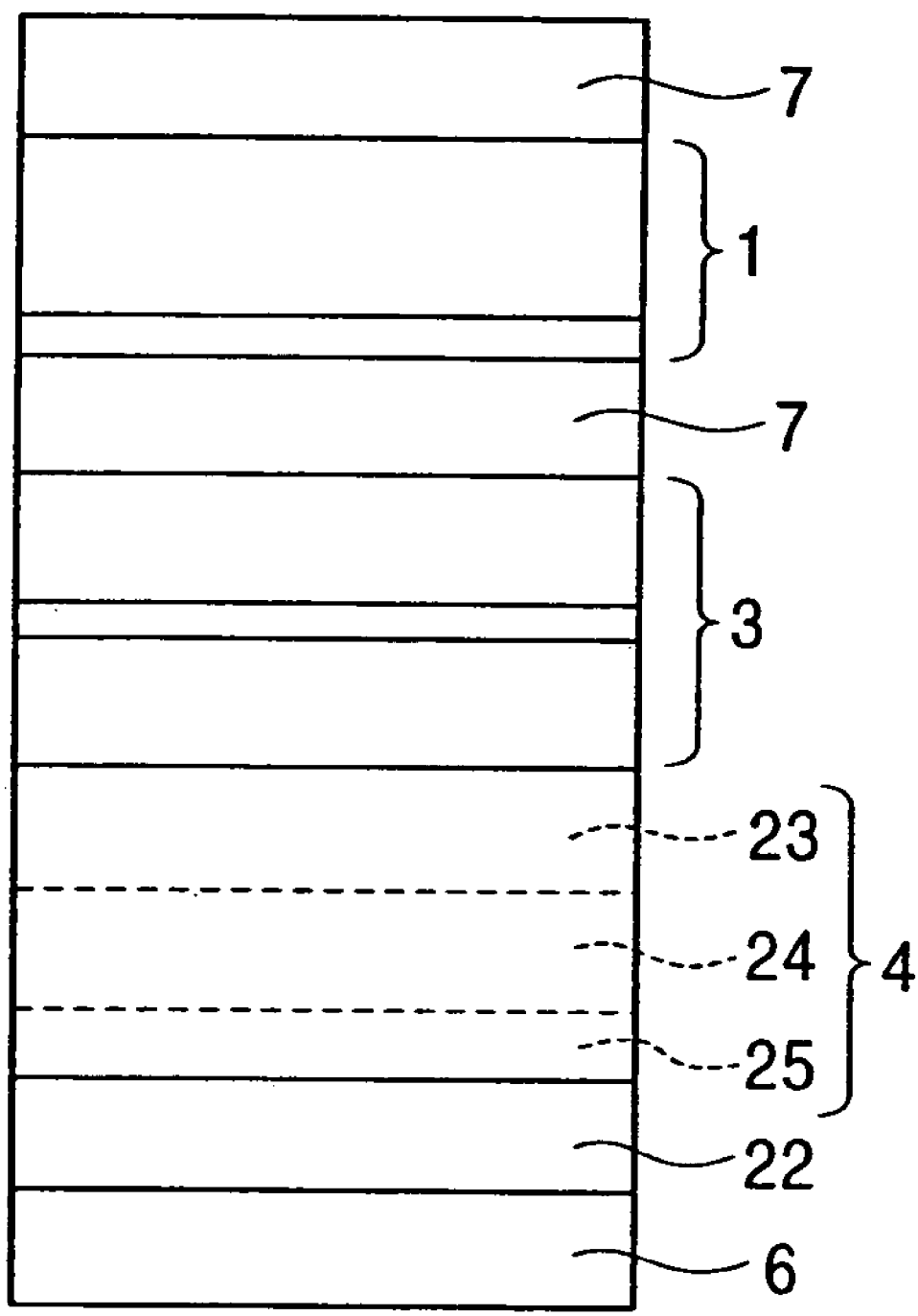
FIG. 9 is a schematic drawing showing the structure of the laminated film shown in FIG. 8 after heat treatment.

FIG. 9 is a schematic drawing of the spin valve thin film element showing the state after heat treatment of the laminated film shown in FIG. 8.

In the present invention, the first and third antiferromagnetic layers 23 and 25 each having a high composition ratio of the element X or elements X+X' are formed in contact with the pinned magnetic layer 3 and the seed layer 22, respectively, and the second antiferromagnetic layer 24 having a composition which is easily appropriately transformed from the disordered lattice to the ordered lattice by heat treatment is provided between the first and third antiferromagnetic layers 23 and 25. Therefore, composition diffusion possibly occurs between the first and third antiferromagnetic layers and the second antiferromagnetic layer 24 at the same time as transformation of the second antiferromagnetic layer 24 proceeds by heat treatment. As a result, transformation from the disordered lattice to the ordered lattice also occurs in the first and third antiferromagnetic layers 23 and 25 while maintaining the incoherent state at the interfaces with the seed layer 22 and with the pinned magnetic layer 3, thereby causing appropriate transformation over the entire antiferromagnetic layer 4.

In the spin valve thin film element after heat treatment, the same equivalent crystal planes of the antiferromagnetic layer 4 and the pinned magnetic layer 3 are preferentially oriented in parallel with the film plane, and at least some of the same equivalent crystal axes present in the crystal planes are oriented in different directions in the antiferromagnetic layer 4 and the pinned magnetic layer 3.

In a section of each of the antiferromagnetic layer 4 and the pinned magnetic layer 3 taken along the direction (the Z direction shown in the drawing) parallel to the thickness direction, the crystal grain boundaries in the antiferromagnetic layer 4 and the crystal grain boundaries in the pinned magnetic layer 3 are discontinuous in at least a portion of the interface.

In the present invention, since the seed layer is formed below the antiferromagnetic layer 4, the equivalent crystal plane represented by the {111} plane of the antiferromagnetic layer 4 is preferentially oriented in parallel with the interface, and a twin crystal is formed in at least a portion of the antiferromagnetic layer 4 so that the twin boundaries of the twin crystal are nonparallel to the interface. The inner angle between each of the twin boundaries and the interface is preferably 68° to 76°. In the pinned magnetic layer 3, the equivalent crystal plane represented by the {111} plane is preferably preferentially oriented.

The antiferromagnetic layer 4 after heat treatment possibly has a region in which the ratio by atomic % of the element X or elements X+X' to Mn increases toward the seed layer 22 and the pinned magnetic layer 3.

In the spin valve thin film element show in FIG. 2, the antiferromagnetic layer 4 may comprise the above-described three films, or a two-layer structure comprising, for example, the first antiferromagnetic layer 23 in contact with the pinned magnetic layer 3 and the second antiferromagnetic layer 24 in contact with the protecting layer 7. This is because the seed layer 22 shown in FIG. 1 is not provided in the element shown in FIG. 2.

With the antiferromagnetic layer 4 comprising the two-layer film, the antiferromagnetic layer 4 after heat treatment possibly has a region in which the ratio by atomic % of the element X or elements X+X' to Mn increases toward the pinned magnetic layer 3.

In the spin valve thin film element shown in FIG. 3, each of the exchange bias layers 16 comprises the same two-layer film as in FIG. 2. The first antiferromagnetic layer 23 is formed in contact with the free magnetic layer 1, and the second antiferromagnetic layer 24 is formed apart from the free magnetic layer 1.

The antiferromagnetic layer 4 shown in FIG. 3 comprises the same three-layer film as in FIG. 1. Therefore, the exchange bias layers 16 and the antiferromagnetic layer 4 are appropriately transformed to the ordered lattice by heat treatment, thereby obtaining a large exchange coupling magnetic field.

Each of the exchange bias layers 16 after heat treatment possibly has a region in which the ratio by atomic % of the element X or elements X+X' to Mn increases toward the free magnetic layer 1.

The antiferromagnetic layer 4 after heat treatment possibly has a region in which the ratio by atomic % of the element X or element X+X' to Mn increases toward the pinned magnetic layer 3 and the seed layer 22.

In the method of manufacturing the spin valve thin film element shown in FIG. 4, the antiferromagnetic layer 4 comprises the same two-layer film as that shown in FIG. 2. The first antiferromagnetic layer 23 is formed in contact with the pinned magnetic layer 3, and the second antiferromagnetic layer 24 is formed apart from the pinned magnetic layer 3.

Also, each of the exchange bias layers 16 comprises the same three-layer film as the antiferromagnetic layer 4 shown in FIG. 1. Therefore, the exchange bias layers 16 and the antiferromagnetic layer 4 are appropriately transformed to the ordered lattice by heat treatment, thereby obtaining a high exchange coupling magnetic field.

Each of the exchange bias layers 16 after heat treatment possibly has a region in which the ratio by atomic % of the element X or element X+X' to Mn increases toward the free magnetic layer 1 and the seed layer 22.

The antiferromagnetic layer 4 after heat treatment possibly has a region in which the ratio by atomic % of the element X or element X+X' to Mn increases toward the pinned magnetic layer 3.

Figure 10:
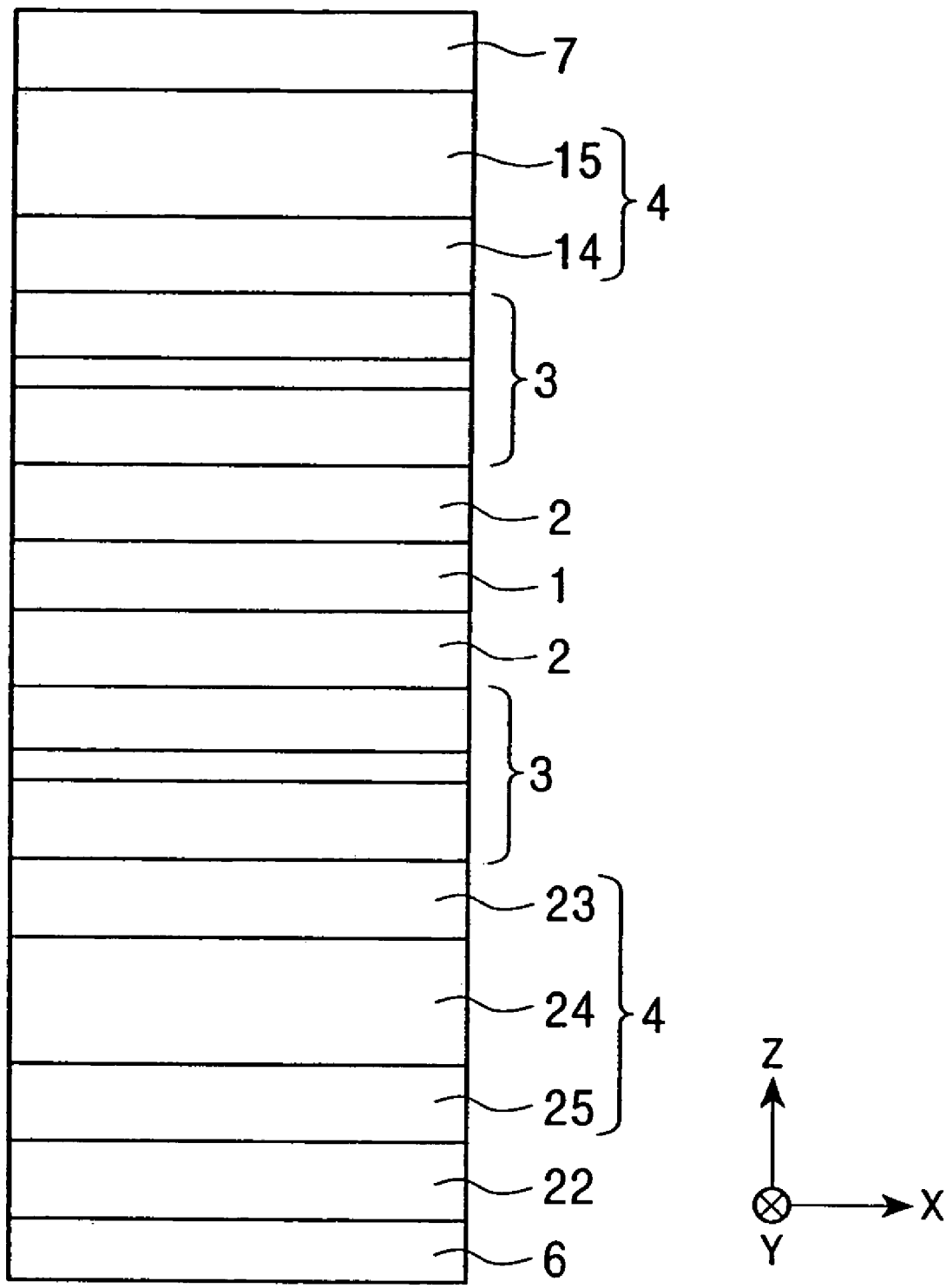
FIG. 10 is a schematic drawing showing the deposition state of the magnetoresistive element shown in FIG. 5.

In the method of manufacturing the dual spin valve thin film element shown in FIG. 5, as shown in FIG. 10, the antiferromagnetic layer 4 located below the free magnetic layer 1 comprises a three-layer film comprising a first antiferromagnetic layer 23, a second antiferromagnetic layer 24 and a third antiferromagnetic layer 25, and the antiferromagnetic layer 4 located above the free magnetic layer 1 comprises a two-layer film comprising a first antiferromagnetic layer 14 and a second antiferromagnetic layer 15.

The thicknesses and compositions of the first antiferromagnetic layer 23, the second antiferromagnetic layer 24 and the third antiferromagnetic layer 25 are the same as described above with reference to FIG. 1.

Figure 11:
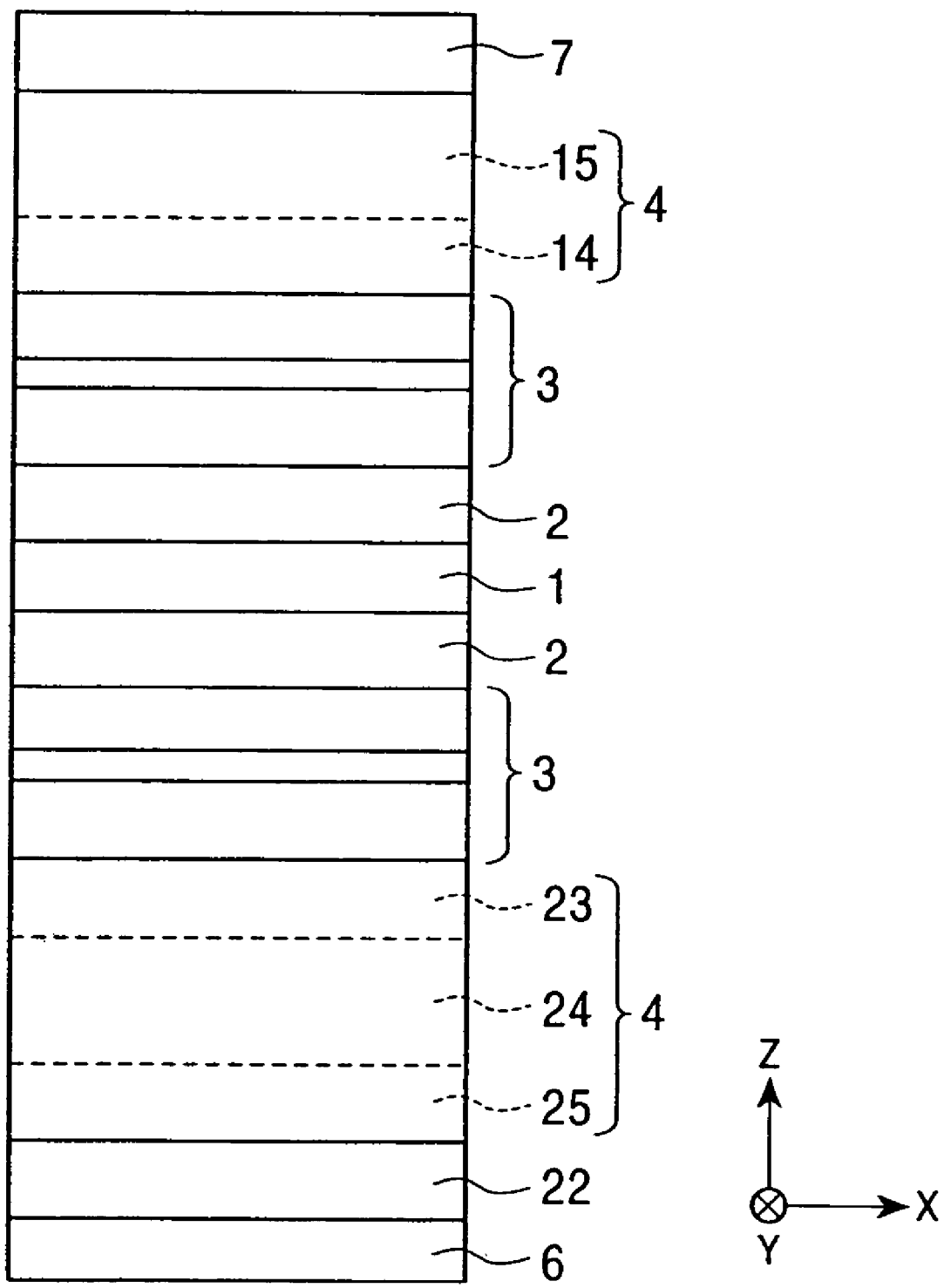
FIG. 11 is a schematic drawing showing the structure of the laminated film shown in FIG. 10 after heat treatment.

After the layers are deposited as shown in FIG. 10, heat treatment is performed. FIG. 11 shows the state after heat treatment. In FIG. 11, composition diffusion possibly occurs in the three-layer film of the antiferromagnetic layer 4 formed below the free magnetic layer 1 to provide a region in the antiferromagnetic layer 4 after heat treatment in which the ratio by atomic % of the element X or elements X+X' to Mn increases toward the pinned magnetic layer 3 and the seed layer 22.

Also, composition diffusion possibly occurs in the two-layer film of the antiferromagnetic layer 4 formed above the free magnetic layer 1 to provide a region in the antiferromagnetic layer 4 after heat treatment in which the ratio by atomic % of the element X or elements X+X' to Mn increases toward the pinned magnetic layer 3.

In the method of manufacturing the AMR thin film element shown in FIG. 6, each of the exchange bias layers 21 comprises the same two-layer film as the antiferromagnetic layer 4 formed above the free magnetic layer 1 shown in FIG. 10. Each of the exchange bias layers 21 comprises the first antiferromagnetic layer 14 formed in contact with the magnetoresistive layer 20, and the second antiferromagnetic layer 15 formed apart from the magnetoresistive layer 20.

After heat treatment, the exchange bias layers 21 are appropriately transformed to the ordered lattice to produce a large exchange coupling magnetic field between the exchange bias layers 21 and the magnetoresistive layer 20.

Each of the exchange bias layers 21 after heat treatment possibly has a region in which the ratio by atomic % of the element X or elements X+X' to Mn increases toward the magnetoresistive layer 20.

In the method of manufacturing the AMR thin film element shown in FIG. 7, each of the exchange bias layers 21 comprises the same three-layer film as the antiferromagnetic layer 4 shown in FIG. 8. Each of the exchange bias layers 21 comprises the first antiferromagnetic layer 23 formed in contact with the magnetoresistive layer 20, the third antiferromagnetic layer 25 formed in contact with the seed layer 22, and the second antiferromagnetic layer 24 formed between the first and third antiferromagnetic layers 23 and 25.

After heat treatment, the exchange bias layers 21 are appropriately transformed to the ordered lattice to produce a large exchange coupling magnetic field between the exchange bias layers 21 and the magnetoresistive layer 20.

Each of the exchange bias layers 21 after heat treatment possibly has a region in which the ratio by atomic % of the element X or element X+X' to Mn increases toward the magnetoresistive layer 20 and the seed layer 22.

Figure 12:
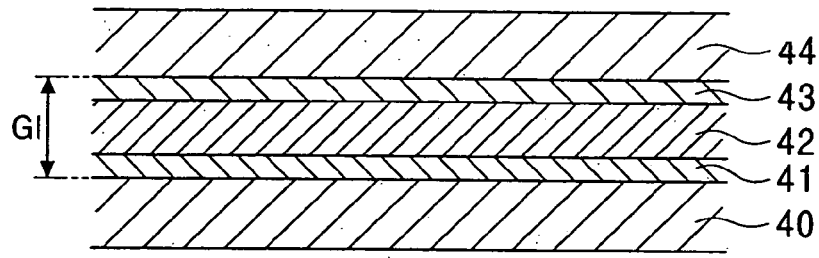
FIG. 12 is a partial sectional view showing the structure of a thin film head (reproducing head) of the present invention.

FIG. 12 is a sectional view of the structure of a reading head comprising any one of the magnetoresistive elements shown in FIGS. 1 to 11, as viewed from the side facing a recording medium.

In FIG. 12, reference numeral 40 denotes a lower shield layer made of, for example, a NiFe alloy, and an upper gap layer 41 is formed on the lower shield layer 40. Furthermore, any one of the magnetoresistive elements shown in FIGS. 1 to 7 is formed on the lower gap layer 41, an upper gap layer 43 is formed on the magnetoresistive element 42, and an upper shield layer 44 made of a NiFe alloy is formed on the upper gap layer 43.

Each of the lower gap layer 41 and the upper gap layer 43 is made of an insulating material, for example, $SiO_2$, $Al_2O_3$ (alumina), or the like. As shown in FIG. 12, the length from the lower gap layer 41 to the upper gap layer 43 corresponds to a gap length G1 which can cope with a higher recording density as the length G1 decreases.

In the present invention, a large exchange coupling magnetic field can be produced even when the thickness of the antiferromagnetic layer 4 is decreased. Therefore, the thickness of a magnetoresistive element can be decreased, as compared with a conventional element, and thus a thin film magnetic head adaptable to an increase in recording density due to gap narrowing can be manufactured.

Although each of FIGS. 1, 3, 4, 5 and 7 shows the embodiment in which the seed layer 22 is formed below the antiferromagnetic layer (or the exchange bias layers 26 or the magnetoresistive layer 20), the present invention is not limited to these embodiments.

Although, in a section taken along the direction parallel to the thickness direction, the crystal grain boundaries in the antiferromagnetic layer 4 and the crystal grain boundaries in the ferromagnetic layer are discontinuous in at least a portion of the interface between both layers, different crystal planes of the antiferromagnetic layers and the ferromagnetic layer may be preferentially oriented in parallel to the film plane. In this case, the antiferromagnetic layer can be appropriately transformed to the ordered lattice by heat treatment, thereby obtaining a high exchange coupling magnetic field.

EXAMPLES

A spin valve thin having the film structure below was formed, and the relation between the Pt content of a PtMn alloy film constituting an antiferromagnetic layer and the exchange coupling magnetic field (Hex) was examined by changing the Pt content.

The film structure was as follows, from the bottom.

Si substrate/alumina/under layer: Ta (3 nm)/seed layer: NiFe (3 nm)/antiferromagnetic layer: $Pt_xMn_{100-x}$, (15 nm)/pinned magnetic layer: Co (1.5 nm)/Ru (0.8 nm)/Co (2.5 nm)/nonmagnetic intermediate layer: Cu (2.3 nm)/free magnetic layer: Co (1 nm)/NiFe (3 nm)/backed layer: Cu (1.5 nm)/protecting layer: Ta (3 nm)

The numerical value in parentheses in each of the layers represents the thickness.

The antiferromagnetic layer and the pinned magnetic layer were deposited by a DC magnetron sputtering process. In deposition of the antiferromagnetic layer and the pinned magnetic layer, the Ar gas pressure was 1 to 3 mTorr. In deposition of the antiferromagnetic layer, the distance between the substrate and a target was 70 to 80 mm. After the spin valve film having the above structure was deposited, heat treatment was performed at 200° C. or more for 2 hours or more to measure an exchange coupling magnetic field. The experimental results are shown in FIG. 13.

Figure 13:
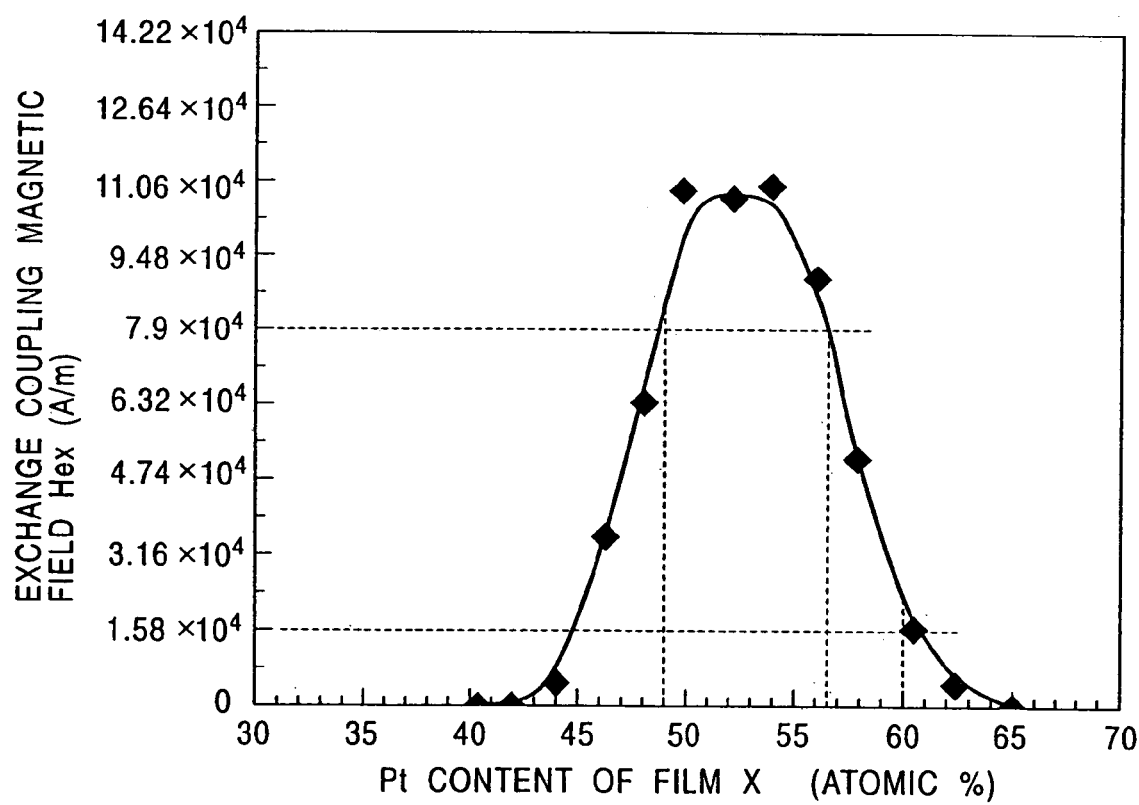
FIG. 13 is a graph showing the relation between the Pt amount and exchange coupling magnetic field (Hex) of an antiferromagnetic layer (PtMn alloy film) obtained by changing the Pt amount.
Figure 14:
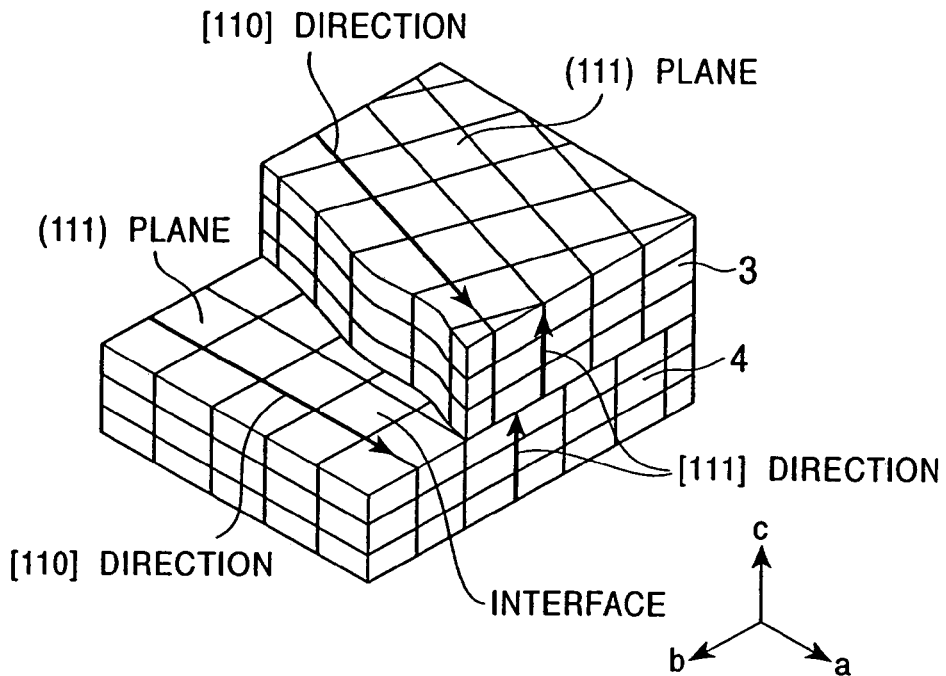
FIG. 14 is a drawing schematically showing the crystal orientations of an antiferromagnetic layer and a ferromagnetic layer of an exchange coupling film of the present invention.

FIG. 13 indicates that the exchange coupling magnetic field (Hex) increases as the Pt content X increases from about 50 at % to 55 at %. It is also found that the exchange coupling magnetic field (Hex) gradually decreases as the Pt content X increases from about 55 at %.

In the present invention, a preferred Pt content is considered as a content with which an exchange coupling magnetic field of $1.58 \times 10^4$ (A/m) can be obtained, and the Pt content is preferably set to 45 to 60 at % based on the experimental results shown in FIG. 13.

A more preferred Pt content is considered as a content with which an exchange coupling magnetic field of $7.9 \times 10^4$ (A/m) can be obtained, and the Pt content is more preferably set to 49 to 56.5 at % based on the experimental results shown in FIG. 13.

The possible reason why the exchange coupling magnetic field changes with the Pt content as described above is that the condition of the interface between the antiferromagnetic layer and the ferromagnetic layer (pinned magnetic layer) changes with changes in the Pt content.

The lattice constant of the antiferromagnetic layer is found to increase as the Pt content increases. Therefore, the difference between the lattice constants of the antiferromagnetic layer and the ferromagnetic layer can be increased by increasing the Pt content, thereby easily bringing the interface between the antiferromagnetic layer and the ferromagnetic layer into the incoherent state.

On the other hand, by forming the seed layer below the antiferromagnetic layer, as in the above film construction, the {111} plane in each of the layers formed on the seed layers, such as the antiferromagnetic layer, can easily preferentially be oriented in parallel to the film plane in the same manner as the seed layer.

It is not always preferred that the Pt content is as high as possible. This is because with an excessively high Pt content, the antiferromagnetic layer cannot be appropriately transformed to the ordered lattice by heat treatment.

In the present invention, the seed layer is provided below the antiferromagnetic layer, the Pt content of the composition of the antiferromagnetic layer is controlled to easily cause ordering transformation and maintain the interface with the ferromagnetic layer in the incoherent state, and the deposition conditions are appropriately controlled. Therefore, the antiferromagnetic layer is appropriately transformed to the ordered lattice by heat treatment while maintaining the incoherent state at the interface with the ferromagnetic layer. In the antiferromagnetic layer and the ferromagnetic layer after heat treatment, the same equivalent crystal planes are preferentially oriented in parallel to the film plane, and at least some of the same equivalent crystal axes present in the crystal planes are oriented in different directions in the antiferromagnetic layer and the ferromagnetic layer.

In observation of a section of each of the antiferromagnetic layer and the ferromagnetic layer taken along the direction parallel to the thickness direction, the crystal grain boundaries in the antiferromagnetic layer and the crystal grain boundaries in the ferromagnetic layer are discontinuous in at least a portion of the interface between the antiferromagnetic layer and the ferromagnetic layer.

Furthermore, the equivalent crystal planes represented by the {111} plane of the antiferromagnetic layer and the ferromagnetic layer are preferentially oriented in parallel to the interface, and a twin crystal is formed in at least a portion of the antiferromagnetic layer so that the twin boundaries of the twin crystal are nonparallel to the interface.

As described above, in a section of an exchange coupling film of the present invention taken along the direction parallel to the thickness direction, the crystal grain boundaries formed in the antiferromagnetic layer, and the crystal grain boundaries formed in the ferromagnetic layer are discontinuous in at least a portion of the interface.

Furthermore, the equivalent crystal plane represented by the {111} plane of the antiferromagnetic layer is preferentially oriented in parallel to the interface, and a twin crystal is formed in at least a portion of the antiferromagnetic layer so that the twin boundaries of the twin crystal are nonparallel to the interface. In the present invention, the inner angle between each of the twin boundaries and the interface is preferably 68° to 76°.

When the above film structure is obtained after heat treatment, the antiferromagnetic layer can be appropriately transformed from the disordered lattice to the ordered lattice to obtain a high exchange coupling magnetic field.

The above-described exchange coupling film can be applied to various magnetoresistive elements, and a magnetoresistive element comprising the exchange coupling film can appropriately cope with higher recording densities in future.

What is claimed is:

1. An exchange coupling film comprising an antiferromagnetic layer and a ferromagnetic layer, which are formed in contact with each other so that a magnetization direction of the ferromagnetic layer is pinned in a predetermined direction by an exchange coupling magnetic field produced at an interface between both layers, wherein the antiferromagnetic layer is made of an antiferromagnetic material comprising an element X (at least one element selected from Pt, Pd, Ir, Rh, Ru, and Os) and Mn;

in a section of the exchange coupling film in parallel with a thickness direction thereof, crystal grain boundaries formed in the antiferromagnetic layer and a crystal grain boundaries formed in the ferromagnetic layer are discontinuous in at least a portion of the interface; and wherein the antiferromagnetic layer and the ferromagnetic layer are laminated in this order from the bottom, and a seed layer is disposed below the ferromagnetic layer and has a crystal structure mainly composed of a face-centered cubic crystal in which equivalent crystal planes represented by the {111} plane are preferentially oriented in parallel with the interface.

2. An exchange coupling film according to claim 1, wherein in the antiferromagnetic layer and the ferromagnetic layer, equivalent crystal planes represented by a {111} plane are preferentially oriented in parallel with the interface.

3. An exchange coupling film according to claim 1, wherein the seed layer is made of a NiFe alloy, Ni, a Ni—Fe—Y alloy (wherein Y is at least one element selected from Cr, Rh, Ta, Hf, Nb, Zr, and Ti), or a Ni—Y alloy.

4. An exchange coupling film according to claim 3, wherein the seed layer is represented by the composition formula $(Ni_{1-x}Fe_x)_{1-y}Y_y$ (x and y are atomic ratios) wherein the atomic ratio x is 0 to 0.3, and the atomic ratio y is 0 to 0.5.

5. An exchange coupling film according to claim 1, wherein the seed layer is nonmagnetic at normal temperature.

6. An exchange coupling film according to claim 1, further comprising an underlying layer formed below the seed layer and comprising at least one element selected from Ta, Hf, Nb, Zr, Ti, Mo and W.

7. An exchange coupling film according to claim 1, wherein at least a portion of the interface between the antiferromagnetic layer and the seed layer is in an incoherent state.

8. An exchange coupling film according to claim 1, wherein the seed layer is disposed below the antiferromagnetic layer.

* * * * *